(12) United States Patent
Niu

(10) Patent No.: US 7,939,218 B2
(45) Date of Patent: May 10, 2011

(54) NANOWIRE STRUCTURES COMPRISING CARBON

(75) Inventor: Chunming Niu, Palo Alto, CA (US)

(73) Assignee: Nanosys, Inc., Palo Alto, CA (US)

( * ) Notice: Subject to any disclaimer, the term of this patent is extended or adjusted under 35 U.S.C. 154(b) by 1206 days.

(21) Appl. No.: 11/601,842

(22) Filed: Nov. 20, 2006

(65) Prior Publication Data

US 2007/0212538 A1    Sep. 13, 2007

Related U.S. Application Data

(63) Continuation-in-part of application No. 11/295,133, filed on Dec. 6, 2005, now Pat. No. 7,179,561.

(60) Provisional application No. 60/801,377, filed on May 19, 2006, provisional application No. 60/738,100, filed on Nov. 21, 2005, provisional application No. 60/634,472, filed on Dec. 9, 2004.

(51) Int. Cl.
  *H01M 4/96* (2006.01)
  *C01B 31/00* (2006.01)
  *B01D 5/12* (2006.01)

(52) U.S. Cl. ............... 429/532; 423/445 R; 423/447.3; 427/115; 427/122; 502/101

(58) Field of Classification Search ............ 429/44, 429/231.8, 532; 502/101; 427/115, 122, 427/215; 423/447.3, 445 R
See application file for complete search history.

(56) References Cited

U.S. PATENT DOCUMENTS

| | | |
|---|---|---|
| 4,849,311 A | 7/1989 | Itoh et al. |
| 5,338,430 A | 8/1994 | Parsonage et al. |
| 5,399,184 A | 3/1995 | Harada |
| 5,505,928 A | 4/1996 | Alivisatos et al. |
| 5,635,041 A | 6/1997 | Bahar et al. |
| 5,677,082 A | 10/1997 | Greinke et al. |
| 5,690,807 A | 11/1997 | Clark, Jr. et al. |
| 5,751,018 A | 5/1998 | Alivisatos et al. |
| 5,879,827 A | 3/1999 | Debe et al. |
| 5,879,828 A | 3/1999 | Debe et al. |
| 5,897,945 A | 4/1999 | Lieber et al. |

(Continued)

FOREIGN PATENT DOCUMENTS

EP    1553052    7/2005

(Continued)

OTHER PUBLICATIONS

Björk, M.T. et al. "One-dimensional Steeplechase for Electron Realized" Nano Lett (2002) 2:86-90.

(Continued)

*Primary Examiner* — Stephen J. Kalafut
(74) *Attorney, Agent, or Firm* — Sterne, Kessler, Goldstein & Fox P.L.L.C.

(57) ABSTRACT

The present invention is directed to nanowire structures and interconnected nanowire networks comprising such structures, as well as methods for their production. The nanowire structures comprise a nanowire core, a carbon-based layer, and in additional embodiments, carbon-based structures such as nanographitic plates consisting of graphenes formed on the nanowire cores, interconnecting the nanowire structures in the networks. The networks are porous structures that can be formed into membranes or particles. The nanowire structures and the networks formed using them are useful in catalyst and electrode applications, including fuel cells, as well as field emission devices, support substrates and chromatographic applications.

24 Claims, 43 Drawing Sheets

U.S. PATENT DOCUMENTS

| | | | |
|---|---|---|---|
| 5,910,378 A | 6/1999 | Debe et al. | |
| 5,916,642 A * | 6/1999 | Chang | 29/509 |
| 5,990,479 A | 11/1999 | Weiss et al. | |
| 5,997,832 A | 12/1999 | Lieber et al. | |
| 6,036,774 A | 3/2000 | Lieber et al. | |
| 6,048,616 A | 4/2000 | Gallagher et al. | |
| 6,136,156 A | 10/2000 | El-Shall et al. | |
| 6,225,198 B1 | 5/2001 | Alivisatos et al. | |
| 6,248,674 B1 | 6/2001 | Kamins et al. | |
| 6,303,266 B1 | 10/2001 | Okino et al. | |
| 6,306,736 B1 | 10/2001 | Alivisatos et al. | |
| 6,361,861 B2 | 3/2002 | Gao et al. | |
| 6,413,489 B1 | 7/2002 | Ying et al. | |
| 6,479,030 B1 | 11/2002 | Firsich | |
| 6,504,292 B1 | 1/2003 | Choi et al. | |
| 6,582,673 B1 | 6/2003 | Chow et al. | |
| 6,589,682 B1 | 7/2003 | Fleckner et al. | |
| 6,610,355 B2 | 8/2003 | Yadav et al. | |
| 6,648,712 B2 * | 11/2003 | Choi et al. | 445/51 |
| 6,741,019 B1 | 5/2004 | Filas et al. | |
| 6,749,827 B2 | 6/2004 | Smalley et al. | |
| 6,749,892 B2 | 6/2004 | Chang | |
| 6,755,956 B2 | 6/2004 | Lee et al. | |
| 6,756,026 B2 * | 6/2004 | Colbert et al. | 423/445 R X |
| 6,781,166 B2 | 8/2004 | Lieber et al. | |
| 6,875,537 B2 | 4/2005 | Tani et al. | |
| 6,911,767 B2 | 6/2005 | Takai | |
| 6,926,985 B2 | 8/2005 | Wariishi et al. | |
| 6,933,033 B1 | 8/2005 | Forsyth et al. | |
| 6,949,206 B2 | 9/2005 | Whiteford et al. | |
| 6,962,823 B2 | 11/2005 | Empedocles et al. | |
| 6,976,897 B2 | 12/2005 | Choi et al. | |
| 7,009,331 B2 | 3/2006 | Sheu et al. | |
| 7,105,428 B2 | 9/2006 | Pan et al. | |
| 7,115,971 B2 * | 10/2006 | Stumbo et al. | 257/600 |
| 7,129,554 B2 | 10/2006 | Lieber et al. | |
| 7,132,188 B2 | 11/2006 | Masel et al. | |
| 7,135,728 B2 | 11/2006 | Duan et al. | |
| 7,179,561 B2 | 2/2007 | Niu et al. | |
| 7,189,472 B2 | 3/2007 | Suenaga et al. | |
| 7,553,371 B2 * | 6/2009 | Dubrow et al. | 117/90 |
| 2002/0130311 A1 | 9/2002 | Lieber et al. | |
| 2002/0142202 A1 | 10/2002 | Li et al. | |
| 2002/0172820 A1 | 11/2002 | Majumdar et al. | |
| 2002/0179434 A1 | 12/2002 | Dai et al. | |
| 2003/0044608 A1 * | 3/2003 | Yoshizawa et al. | 423/447.2 X |
| 2003/0073573 A1 | 4/2003 | Baker et al. | |
| 2003/0089899 A1 | 5/2003 | Lieber et al. | |
| 2003/0091891 A1 | 5/2003 | Yoshida et al. | |
| 2004/0018416 A1 | 1/2004 | Choi et al. | |
| 2004/0026684 A1 | 2/2004 | Empedocles | |
| 2004/0118698 A1 | 6/2004 | Lu et al. | |
| 2004/0167014 A1 | 8/2004 | Yan et al. | |
| 2004/0202599 A1 | 10/2004 | Xu et al. | |
| 2004/0224217 A1 | 11/2004 | Toops | |
| 2004/0234841 A1 | 11/2004 | Yoshitake et al. | |
| 2005/0053826 A1 | 3/2005 | Wang et al. | |
| 2005/0064185 A1 | 3/2005 | Buretea et al. | |
| 2005/0066883 A1 | 3/2005 | Dubrow et al. | |
| 2005/0112451 A1 | 5/2005 | Lee et al. | |
| 2005/0181195 A1 | 8/2005 | Dubrow | |
| 2005/0181209 A1 | 8/2005 | Karandikar | |
| 2005/0221072 A1 | 10/2005 | Dubrow et al. | |
| 2005/0238810 A1 | 10/2005 | Scaringe et al. | |
| 2005/0287418 A1 | 12/2005 | Noh et al. | |
| 2006/0003212 A1 | 1/2006 | Kim et al. | |
| 2006/0008942 A1 | 1/2006 | Romano et al. | |
| 2006/0009003 A1 | 1/2006 | Romano et al. | |
| 2006/0066217 A1 | 3/2006 | Son | |
| 2006/0115711 A1 | 6/2006 | Kim et al. | |
| 2006/0116284 A1 | 6/2006 | Pak et al. | |
| 2006/0159916 A1 | 7/2006 | Dubrow et al. | |
| 2007/0026293 A1 | 2/2007 | Kim et al. | |
| 2007/0190880 A1 | 8/2007 | Dubrow et al. | |

FOREIGN PATENT DOCUMENTS

| | | |
|---|---|---|
| JP | 59-127372 | 7/1984 |
| JP | 64-014873 | 1/1989 |
| JP | 1994203840 | 7/1994 |
| JP | 1996017440 | 1/1996 |
| JP | 2003353528 | 12/2000 |
| JP | 2006-131499 | 5/2006 |
| WO | WO-02080280 | 10/2002 |
| WO | WO-2004099068 | 11/2004 |
| WO | WO-2005075048 | 8/2005 |

OTHER PUBLICATIONS

Cao, Y.W. et al. "Growth and Properties of Semiconductor Core/Shell Nanocrystals with InAs Cores" J. Am. Chem. Soc. (2000) 122:9692-9702.

Choi, W.C. et al., "Bimetallic Pt-Ru nanowire network for anode material in a direct-methanol fuel cell" J. Power Sources (2003) 124(2):420-425.

Cui, Y. et al. "Doping and electrical transport in silicon wires" J. Phys. Chem. B. (2000) 104:5213-5216.

Cui, Y. et al. "Diameter-controlled synthesis of single-crystal silicon nanowires" Appl. Phys. Lett (2001) 78(15):2214-2216.

Dabbousi et al., "(CdSe)ZnS core-shell quantum dots: Synthesis and characterization of a size series of highly luminescent nanocrystallites" J. Phys. Chem. B (1997) 101:9463-9475.

Duan, X. et al. "General synthesis of compound semiconductor nanowires" Adv. Mater. (2000) 12:298-302.

Duan, X. et al. "High-performance thin-film transistors using semiconductor nanowires and nanoribbons" Nature (2003) 425:274-278.

Greene, L. et al., "Low-temperature wafer scale production of ZnO nanowire arrays" Angew. Chem. Int. Ed. (2003) 42:3031-3034.

Gudicksen, M.S. et al. "Diameter-selective synthesis of semiconductor nanowires" J. Am. Chem. Soc. (2000) 122:8801-8802.

Gudicksen, M.S. et al. "Synthetic control of the diameter and length of single crystal semiconductor nanowires" J. Phys. Chem. (2001) 105:4062-4064.

Gudicksen, M.S. et al. "Growth of nanowire superlattice structures of nanoscale photonics and electronics" Nature (2002) 415:617-620.

Jun, Y-W, et al. "Controlled synthesis of multi-armed CdS nanorod architectures using monosurfactant system" J. Am. Chem. Soc. (2001) 123:5150-5151.

Liu, C. et al. "Sol-Gel Synthesis of Free-Standing Ferroelectric Lead Zirconate Titanate Nanoparticles" J. Am. Chem. Soc. (2001) 123:4344-4345.

Manna, L. et al. "Synthesis of soluble and processable rod-, arrow-, teardrop-, and tetrapod-shaped CdSe nanocrystals" J. Am. Chem. Soc. (2000) 122:12700-12706.

Manna et al., "Epitaxial growth and photochemical annealing of graded CdS/ZnS shells on colloidal CdSe nanorods" J. Am. Chem. Soc. (2002) 124:7136-7145.

Morales, A.M. et al., "A laser ablation method for the synthesis of crystalline semiconductor nanowires " Science (1998) 279:208-211.

Peng, X. et al. "Epitaxial growth of highly luminescentCdSe/CdS core/shell nanocrystals with photostability and electronic accessibility" J. Am. Chem. Soc. (1997) 119:7019-7029.

Peng, X. et al. "Shape control of CdSe nanocrystals" Nature (2000) 404:59-61.

Puntes, V.F. et al. "Colloidal nanocrystal shape and size control: The case of cobalt " Science (2001) 291:2115-2117.

Urban, J.J. et al. "Synthesis of single-crystalline perovskite nanowires composed of brium titanate and strontium titanate " J. Am. Chem. Soc. (2002) 124:1186-1187.

Wu, Y. et al. "Block-by-block growth of single-crystalline Si/SiGe superlattice nanowires " Nano Lett (2002) 2:83-86.

Yun, W.S. et al. "Ferroelectric properties of individual barium titanate nanowires investigated by scanned probe microscopy " Nano Lett (2002) 2(5):447-450.

Supplementary European Search Report in counterpart European Patent Application No. EP 06 83 8053, dated Apr. 22, 2010.

Yang, W. et al., "Fabrication in-situ SiC nonwires/SiC matrix composite by chemical vapour infiltration process," Materials Letters, North Holland Publ. Co., Amsterdam, NL, vol. 58, No. 25, Oct. 1, 2004, pp. 3145-3148.

* cited by examiner

NANOWIRE STRUCTURES COMPRISING CARBON

CROSS REFERENCE TO RELATED APPLICATIONS

The present application is a continuation-in-part of U.S. patent application Ser. No. 11/295,133, filed Dec. 6, 2005, now U.S. Pat. No. 7,179,561, which claims the benefit of U.S. Provisional Patent Application Nos. 60/634,472, filed Dec. 9, 2004, and 60/738,100, filed Nov. 21, 2005. The present application also claims the benefit of U.S. Provisional Patent Application No. 60/801,377, filed May 19, 2006, and U.S. Provisional Patent Application No. 60/738,100, filed Nov. 21, 2005. The disclosures of each of these applications are incorporated herein by reference in their entireties.

BACKGROUND OF THE INVENTION

1. Field of the Invention

The present invention relates to various nanowire structures, and to interconnected nanowire networks comprising such structures. The present invention also relates to the use of these nanowire structures and interconnected nanowire networks in fuel cells, as field emitting elements and other applications, such as chromatographic materials.

2. Background of the Invention

Nanomaterials, and in particular, nanowires have the potential to facilitate a whole new generation of electronic devices. For example, In certain cases, uses of nanomaterials have been proposed that exploit the unique and interesting properties of these materials more as a bulk material than as individual elements requiring individual assembly. For example, Duan et al., *Nature* 425:274-278 (September 2003), describes a nanowire based transistor for use in large area electronic substrates, such as, displays, antennas, and the like that employ a bulk processed, oriented semiconductor nanowire film or layer in place of a rigid semiconductor wafer. The result is an electronic substrate that performs on par with a single crystal wafer substrate that can be manufactured using conventional and less expensive processes than those used to manufacture poorer performing amorphous semiconductors, which is also more amenable to varied architectures, such as, flexible and/or shaped materials.

Graphene layers, a single atom layer of carbon formed as a sheet, have found applications in electrochemical cells and as flexible, strong substrates and coatings. See e.g., U.S. Pat. Nos. 5,677,082, 6,303,266 and 6,479,030. In addition, rolled or folded layers of graphene can form carbon nanotubes and the like, see e.g., U.S. Pat. Nos. 6,582,673, 6,749,827 and 6,756,026.

Fuel cells are devices that convert the chemical energy of fuels, such as hydrogen and methanol, directly into electrical energy. The basic physical structure or building block of a fuel cell consists of an electrolyte layer in contact with a porous anode and cathode on either side. A schematic representation of a fuel cell with the reactant/product gases and the ion conduction flow directions through the cell is shown in FIG. 6. In a typical fuel cell as shown in FIG. 6, a fuel (e.g., methanol or hydrogen) is fed to an anode catalyst that converts the fuel molecules into protons (and carbon dioxide for methanol fuel cells), which pass through the proton exchange membrane to the cathode side of the cell. At the cathode catalyst, the protons (e.g., hydrogen atoms without an electron) react with the oxygen ions to form water. By connecting a conductive wire from the anode to the cathode side, the electrons stripped from fuel, hydrogen or methanol on the anode side, can travel to the cathode side and combine with oxygen to form oxygen ions, thus producing electricity. Fuel cells operating by electrochemical oxidation of hydrogen or methanol fuels at the anode and reduction of oxygen at the cathode are attractive power sources because of their high conversion efficiencies, low pollution, lightweight, and high energy density.

For example, in direct methanol fuel cells (DMFCs), the liquid methanol ($CH_3OH$) is oxidized in the presence of water at the anode generating $CO_2$, hydrogen ions and the electrons that travel through the external circuit as the electric output of the fuel cell. The hydrogen ions travel through the electrolyte and react with oxygen from the air and the electrons from the external circuit to form water at the anode completing the circuit.

Anode Reaction: $CH_3OH + H_2O \rightarrow CO_2 + 6H^+ + 6e^-$

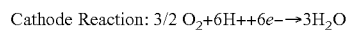

Cathode Reaction: $3/2\ O_2 + 6H^+ + 6e^- \rightarrow 3H_2O$

Overall Cell Reaction: $CH_3OH + 3/2\ O_2 \rightarrow CO_2 + 2H_2O$

Initially developed in the early 1990s, DMFCs were not embraced because of their low efficiency and power density, as well as other problems. Improvements in catalysts and other recent developments have increased power density 20-fold and the efficiency may eventually reach 40%. These cells have been tested in a temperature range from about 50° C.-120° C. This low operating temperature and no requirement for a fuel reformer make the DMFC an excellent candidate for very small to mid-sized applications, such as cellular phones, laptops, cameras and other consumer products, up to automobile power plants. One of the drawbacks of the DMFC is that the low-temperature oxidation of methanol to hydrogen ions and carbon dioxide requires a more active catalyst, which typically means a larger quantity of expensive platinum (and/or ruthenium) catalyst is required.

A DMFC typically requires the use of ruthenium (Ru) as a catalyst component because of its high carbon monoxide (CO) tolerance and reactivity. Ru disassociates water to create an oxygenated species that facilitates the oxygenation of CO, which is produced from the methanol, to $CO_2$. Some existing DMFCs use nanometer-sized bimetallic Pt:Ru particles as the electro-oxidation catalyst because of the high surface area to volume ratio of the particles. The Pt/Ru nanoparticles are typically provided on a carbon support (e.g., carbon black, fullerene soot, or desulfurized carbon black) to yield a packed particle composite catalyst structure. Most commonly used techniques for creating the Pt:Ru carbon packed particle composite are the impregnation of a carbon support in a solution containing platinum and ruthenium chlorides followed by thermal reduction A multi-phase interface or contact is established among the fuel cell reactants, electrolyte, active Pt:Ru nanoparticles, and carbon support in the region of the porous electrode. The nature of this interface plays a critical role in the electrochemical performance of the fuel cell. It is known that only a portion of catalyst particle sites in packed particle composites are utilized because other sites are either not accessible to the reactants, or not connected to the carbon support network (electron path) and/or electrolyte (proton path). In fact, current packed particle composites only utilize about 20 to 30% of the catalyst particles. Thus, most DMFCs which utilize packed particle composite structures are highly inefficient.

In addition, connectivity to the anode and/or cathode is currently limited in current packed particle composite structures due to poor contacts between particles and/or tortuous diffusion paths for fuel cell reactants between densely packed particles. Increasing the density of the electrolyte or support matrix increases connectivity, but also decreases methanol diffusion to the catalytic site. Thus, a delicate balance must be maintained among the electrode, electrolyte, and gaseous phases in the porous electrode structure in order to maximize the efficiency of fuel cell operation at a reasonable cost. Much of the recent effort in the development of fuel cell technology has been devoted to reducing the thickness of cell components while refining and improving the electrode structure and the electrolyte phase, with the aim of obtaining a higher and more stable electrochemical performance while lowering cost. In order to develop commercially viable DMFCs, the electrocatalytic activity of the catalyst must be improved.

A structure combining nanowires, for example semiconductor nanowires, and graphene layers has not been heretofore been disclosed. In addition, nanowires comprised of carbon, or covered with a carbon-based layer, have also not heretofore been disclosed. The nanowire-based structures and networks disclosed herein possess unique properties and characteristics that allow their use in various applications from substrates and supports to membranes and filtration. The present invention also provides nanowire composite membrane electrode catalyst support assemblies comprising the various structures described throughout that provide a highly porous material with a high surface area, a high structural stability and a continuum structure. The composite structures are provided as a highly interconnected nanowire supported catalyst structure interpenetrated with an electrolyte network to maximize catalyst utilization, catalyst accessibility, and electrical and ionic connectivity to thereby improve the overall efficiency of fuel cells, at lower cost, etc.

SUMMARY OF THE INVENTION

The present invention provides nanowire structures and interconnected nanowire networks. These structures and networks are particularly useful as membranes and supports in various catalyst and battery applications, as high surface area electrodes in medical devices, as well as particles for use in chromatography.

In an embodiment, the present invention provides nanowires comprising a carbon-based layer. Suitably the carbon-based layer is non-crystalline and substantially devoid of basal plane carbon. In an embodiment, the nanowires comprise a core which can comprise semiconductor material such as Si and B. In additional embodiments, the core can comprise carbon, such as a carbide (e.g., SiC), or can consist only of carbon (i.e., a pure carbon nanowire). In other embodiments, the carbon-based layer is carbide, for example SiC. Generally, the carbon-based layer on the nanowires will be greater than about 1 nm in thickness, though thinner layers can also be prepared.

In another embodiment, the present invention provides nanowire structures, comprising a core, an interfacial carbide layer and a carbon-based structure formed on the interfacial carbide layer. Examples of carbon-based structures that can be formed on the interfacial carbide layer include nanowires and nanographitic plates. Suitably, the nanowire core will be made from semiconductor material, such as Si, B or SiC, and/or a highly doped semiconductor material. Additional materials that can be used to form the core include, but are not limited to, inorganic oxides, inorganic carbides and inorganic nitrides, as well as carbon nanotubes and carbon nanofibrils. Nanographitic plates suitably comprise multiple layers of graphene attached to the interfacial carbide layer, and to each other.

The present invention also provides methods of manufacturing such nanowire structures. An embodiment comprises: heating a nanowire core and contacting the nanowire core with one or more carbon-comprising gases to form a carbon-based layer on the nanowire core. Generally, the temperatures at which the carbon-based layers are formed are greater than about 600° C. Suitable carbon-comprising gases that can be used in the methods of manufacturing include, but are not limited to, carbon monoxide, methane, ethane, propane, butane, ethylene and propylene. In addition, the gas mixtures can also comprise noble or other non-contaminating gases. In other embodiments, hydrogen can be included to control the carbide layer and nanographite formation process.

The present invention also comprises methods of manufacturing nanowire structures comprising: heating a nanowire core; contacting the nanowire core with one or more carbon-comprising gases to form an interfacial carbide layer on the nanowire core; and forming at least one carbon-based structure on the interfacial carbide layer. Generally, the temperatures at which the interfacial carbide layers and carbon-based structures (e.g., nanowires and/or nanographitic plates) are formed are greater than about 600° C. Suitable carbon-comprising gases that can be used in the methods of manufacturing include, but are not limited to, methane, ethane, propane, butane, ethylene and propylene. In addition, the gas mixtures can also comprise noble or other non-contaminating gases. In other embodiments, hydrogen can be included to control the carbide layer and carbon-based structure formation process.

Methods of manufacturing the interconnected nanowire networks are also provided. An exemplary method comprises: dispersing a plurality of nanowire cores in a liquid; filtering the nanowire cores to form a nanowire mat; heating the nanowire mat; contacting the nanowire mat with one or more carbon-comprising gases to form an interfacial carbide layer on the nanowire cores, and forming nanographitic plates on the interfacial carbide layer, such that that nanographitic plates interconnect the nanowire cores.

In another embodiment, the present invention provides interconnected nanowire networks, comprising, for example, a plurality of nanowire structures, wherein nanographitic plates connect the nanowire structures. The nanowire networks suitably form mesoporous membranes or particles. The nanowire structures and interconnected nanowire networks have applications in areas such as catalysts, fuel cells, high surface area electrodes for medical devices, sensors, support substrates and media for chromatography and filtration.

In another embodiment, the present invention provides a proton exchange membrane fuel cell with nanostructured components, in particular, one or more of the electrodes of the membrane electrode assembly. The nanostructured fuel cell has a higher catalytic metal utilization rate at the electrodes, higher power density (kW/volume and kW/mass), and lower cost than conventional fuel cells. The nanostructured fuel cells are not only attractive for stationary and mobile applications, but also for use as a compact power supply for microelectronics such as laptops, cell phones, cameras and other electronic devices.

In accordance with a further embodiment of the present invention, nanowires (e.g., inorganic nanowires) for use in a membrane electrode assembly of a fuel cell are disclosed which generally comprise a metal catalyst deposited on a surface of the nanowires. The metal catalyst may be deposited as a thin film on the surface of the nanowires, or as a layer of catalyst particles, e.g., by functionalizing the surface of the nanowires with standard surface chemistries. Suitable metal catalysts include, but are not limited to, one or more of platinum (Pt), ruthenium (Ru), iron (Fe), cobalt (Co), gold (Au), chromium (Cr), molybdenum (Mo), tungsten (W), manganese (Mn), technetium (Tc), rhenium (Re), osmium (Os), rhodium (Rh), iridium (Ir), nickel (Ni), palladium (Pd), copper (Cu), silver (Ag), zinc (Zn), tin (Sn), aluminum (Al), and combinations and alloys thereof (such as bimetallic Pt:Ru nanoparticles). The nanowires may comprise branched structures (e.g., side nodules) to increase the surface area to volume ratio of the wires to maximize the catalytic efficiency of the fuel cell. The nanowires may be made from metallic conducting, semiconducting, carbide, nitride, or oxide materials such as $RuO_2$, SiC, GaN, $TiO_2$, $SnO_2$, WCx, MoCx, ZrC, $WN_x$, $MoN_x$ etc. It is preferable that the nanowires be made from a material that is resistant to degradation in a weak acid so that the nanowires are compatible with the reactants of a variety of different fuel cells.

The nanowires of the present invention may be derivatized with at least a first functional group or chemical binding moiety which binds to metallic catalyst particles, such as a nitric acid group, carboxylic acid group, a hydroxyl group, an amine group, a sulfonic acid group, and the like, or the catalyst may be deposited as a thin film using other deposition processes such as electrodeposition, atomic layer deposition, plasma sputtering, etc. The nanowires may also be derivatized with a functional group which differentially binds to a thin proton conducting polymer coating (e.g., NAFION® or other sulfonated polymer) which may be deposited directly on the nanowires. For example, the nanowires may be functionalized with a sulfonated hydrocarbon, fluorocarbon, or branched hydrocarbon chain using known standard chemistries. Alternatively, instead of binding ionomer to the nanowires through a chemical binding moiety, the nanowires may be functionalized to make them proton conductive. For example, the nanowires may be functionalized with a surface coating such as a perfluorinated sulfonated hydrocarbon using well-known functionalization chemistries.

In this way, the intimate relationship between the nanowire catalyst support and the polymer shell ensures that most, if not all, of the metal catalyst particles are located at a three-phase contact point (e.g., such that the catalyst particles are accessible to the fuel cell reactants, electrolyte and nanowire core for efficient electron and proton conduction). The controlled nanowire surface chemistry can be used to control the wettability of the polymer in the composite nanowire structure and ensures that catalyst particles are exposed and accessible for catalysis.

According to another embodiment of the present invention, a nanostructured catalyst support for a membrane electrode assembly of a fuel cell is provided which generally comprises an interconnected mat or network of nanowires each having a metal catalyst deposited thereon. The catalyst metal may comprise any of the catalyst metals described herein, as well as those known to the ordinarily skilled artisan, such as platinum. The catalyst metal may comprise a combination of metals such as platinum and ruthenium. In one representative embodiment, the catalyst metal comprises nanoparticles having a diameter less than about 50 nm, e.g., less than about 10 nm, e.g., less than about 5 nm, e.g., between about 1 and 5 nm. In this embodiment, each nanowire in the network of nanowires typically is physically and/or electrically connected to at least one or more other nanowires in the nanowire network to form a highly interconnected network of nanowires. In other embodiments, the nanowires may be substantially aligned in a parallel array of nanowires between the anode/cathode bipolar plates and the proton exchange membrane, or the nanowires may be randomly oriented. The nanowires may each be coated with a first catalyst colloid coating and/or a second thin proton conducting polymer coating (e.g., NAFION®). The membrane electrode assembly may be a component in a direct methanol fuel cell, a hydrogen fuel cell, or any fuel cell known to those of ordinary skill in the art.

A fuel cell is formed by providing a proton exchange membrane, an anode electrode, a cathode electrode, and first and second bipolar plates, wherein at least one of the anode and cathode electrode comprise an interconnected network of the catalyst supported nanowires. Because of the superior connectivity of the nanowire network, the fuel cell may not require a gas diffusion layer between the proton exchange membrane and the first or second bipolar plates as is the case with conventional fuel cells. In one embodiment, the nanowires may be synthesized directly on one or more of the bipolar plates of the fuel cell and/or on the proton exchange membrane. The nanowires may also be grown on a separate growth substrate, harvested therefrom, and then transferred (e.g., as a porous sheet of interconnected wires) and incorporated into the fuel cell structure (e.g., deposited on one or more of the fuel cell components such as one or more of the bipolar plates and/or the proton exchange membrane). When grown in situ on the bipolar plate(s) and/or proton exchange membrane, the nanowires may be oriented substantially perpendicular or normal to a surface of the bipolar plate(s) or proton exchange membrane, or oriented randomly.

The nanowires in the nanowire network are preferentially physically and/or electrically connected to one or more other wires in the network to form an open, highly branched, porous, intertwined structure, with low overall diffusion resistance for reactants and waste diffusion, high structural stability and high electrical connectivity for the electrons to ensure high catalytic efficiency, thus leading to high power density and lower overall cost. The multiple electrical connectivity of the nanowires ensures that if one wire breaks or is damaged in the system, for example, that all points along the wire still connect to the anode (or cathode) electrode along different paths (e.g., via other nanowires in the network). This provides substantially improved electrical connectivity and stability as compared to previous packed particle composite structures. The catalyst is highly accessible to the fuel source to produce electrons and protons, while the electrons can conduct directly to the bipolar plate through the nanowire and the protons can transport directly to the membrane through the polymer.

The nanowires in the network of nanowires may be cross-linked or fused together using various cross-linking or sintering methods described further herein at points where such nanowires contact or are proximal to others of the nanowires to increase the connectivity and structural stability of the nanowire network. In another embodiment, the same strategy of cross-linking or sintering can be used to improve the electrical or structural connectivity between the nanowires and catalyst material that is in contact or proximal with such nanowires.

The nanowire network defines a plurality of pores between the nanowires in the network, wherein the plurality of pores preferentially have an effective pore size of less than about 10 µm, for example, less than about 5 µm, e.g., less than about 1 µm, e.g., less than about 0.2 µm, e.g., less than 0.02 µm, e.g., between about 0.002 µm and 0.02 µm, e.g., between about 0.005 and 0.01 µm. The overall porosity of the branched nanowire structure may be greater than about 30%, for example, between about 30% and 95%, e.g., between about 40% and 60%. The nanowires are dispersed in a porous polymer matrix electrolyte material such as perfluorosulfonic acid/PTFE copolymer (e.g., NAFION®) which forms a continuous network interpenetrated with the nanowires in the branched nanowire network to provide sufficient contact points for proton (e.g., H+) transport.

In another embodiment of the present invention, a method for preparing a fuel cell membrane electrode is disclosed which generally comprises (a) associating a catalyst metal selected from the group comprising one or more of chromium (Cr), molybdenum (Mo), tungsten (W), manganese (Mn), technetium (Tc), rhenium (Re), iron (Fe), ruthenium (Ru), osmium (Os), cobalt (Co), rhodium (Rh), iridium (Ir), nickel (Ni), palladium (Pd), platinum (Pt), copper (Cu), silver (Ag), gold (Au), zinc (Zn), tin (Sn), aluminum (Al), and combinations thereof, with a plurality of inorganic nanowires to form a plurality of inorganic nanowires with associated catalyst metal, and (b) forming a membrane electrode comprising a plurality of inorganic nanowires with associated catalyst metal.

The plurality of inorganic nanowires may be derivatized with at least a first functional group which binds the catalyst metal such as a nitric acid group, a carboxylic acid group, a hydroxyl group, an amine group, a sulfonic acid group, and the like. The associating may also be done by a variety of methods selected from the group comprising chemical vapor deposition, electrochemical deposition, physical vapor deposition, solution impregnation and precipitation, colloid particle absorption and deposition, atomic layer deposition, and combinations thereof. For example, the associating may be done by chemical deposition of a catalyst metal precursor such as chloroplatinic acid or by electrodeposition of Pt from a precursor salt in solution. The catalyst metal precursor may be converted to a catalytically active metal by subjecting the catalyst metal precursor to metal reduction, wherein metal reduction is done by a method selected from the group comprising hydrogen reduction, chemical reduction, electrochemical reduction and a combination thereof. The catalytically active metal may be in the form of metal nanoparticles on the surface of the nanowires. The forming may be done on a proton exchange membrane or on one or more of the bipolar plates, for example, by a method selected from the group comprising spray/brush painting, solution coating, casting, electrolytic deposition, filtering a fluid suspension of the nanowires, and combinations thereof. The nanowires may also be grown directly on one or more of the fuel cell components such as one or more of the bipolar plates and/or proton exchange membrane. The method may further comprise mixing an ionomeric resin (e.g., perfluorosulfonic acid/PTFE copolymer, e.g., NAFION®) with the plurality of inorganic nanowires with associated catalyst metal. The plurality of inorganic nanowires may be derivatized with at least a second functional group (e.g., a sulfonated hydrocarbon group) which binds the ionomeric resin.

In another embodiment of the present invention, a method of making a membrane electrode assembly of a fuel cell is disclosed which generally comprises: forming nanowires on a growth substrate; transferring the nanowires from the growth substrate into a fluid suspension; depositing one or more catalyst metals on the nanowires to form a nanowire supported catalyst; filtering the fluid suspension of nanowires to create a porous sheet of interconnected nanowires; infiltrating the network of nanowires with an ionomeric resin; and combining the sheet of interconnected nanowires with a proton exchange membrane to form a membrane electrode assembly (MEA). Hot pressing may be used to fuse electrolyte in both the anode and cathode electrode with the proton exchange membrane to form a continuous electrolyte phase for efficient proton transport from the anode electrode to the cathode electrode. The step of depositing one or more catalyst metals may comprise, for example, depositing a metal selected from the group comprising platinum, gold, ruthenium, and other metals, and combinations thereof. The method may further comprise forming a proton exchange membrane fuel cell utilizing the formed MEA by combining first and second bipolar plates together to form the proton exchange membrane fuel cell.

In another embodiment, the present invention provides fuel cell electrodes comprising an inorganic support wafer having a first surface with one or more channels, one or more nanowires disposed within the channels, and one or more metal catalysts deposited on a surface of the one or more nanowires. In suitable embodiments, the inorganic support wafer is a Si wafer that is on the order of about 5 mm or less in thickness. In additional embodiments, the wafer has a second surface comprising one or more channels opposite the first surface, one or more nanowires disposed within the channels in the second surface, and one or more metal catalysts deposited on a surface of the nanowires. Suitably the surfaces of the wafer and the nanowires will be carburized. Examples of metal catalysts useful in the fuel cell electrodes include those described throughout, including Pt, Au, Pd, Ru, Re, Rh, Os, Ir, Fe, Co, Ni, Cu, Ag, V, Cr, Mo, W and alloys and mixtures thereof. Suitably, the metal catalysts will be nanoparticles having a diameter of between about 1 nm and 10 nm.

The present invention also provides membrane electrode assemblies comprising a first fuel cell electrode, a proton exchange membrane, and a second fuel cell electrode. In suitable embodiments, the first surface of the first fuel cell electrode comprises nanowires with anionic metallic catalysts (e.g., PtRu) and the second surface of the second fuel cell electrode comprises nanowires with cationic metallic catalysts (e.g., Pt). A suitable proton exchange membrane for use in the present invention includes a sulfonated tetrafluorethylene copolymer.

The present invention also provides methods for preparing a fuel cell electrode comprising providing a semiconductor wafer having a first surface and a second surface, etching one or more channels on the first surface and the second surface, disposing one or more nanowires in the channels in the first and second surfaces, contacting the nanowires and the first and second surfaces with one or more carbon-comprising gases to form a carbon-based layer on the nanowires and the first and second surfaces, and depositing one or more metal catalysts on the nanowires. Suitable etching methods include NaOH etching. Generally, nanoparticle catalysts will be deposited on the nanowires to generate cathode and anode nanowires.

In a further embodiment, the present invention provides field emission elements comprising a nanowire structure with a core, an interfacial carbide layer and a carbon-based structure formed on the interfacial carbide layer. Suitably, the core comprises semiconductor material, such as Si, B, SiC or GaN. In additional embodiments, the core comprises an inorganic oxide selected from the group comprising $SiO_2$, $Al_2O_3$, $TiO_2$, $SnO_2$, $ZrO_2$, $HfO_2$ and $Ta_2O_5$; an inorganic carbide selected from the group comprising TiC, ZrC, HfC, NbC, WC, $W_2C$, MoC and $Mo_2C$; or an inorganic nitride selected from the group comprising TiN, ZrN, HfN, WN, MoN and BN. The interfacial carbide layer suitably is selected from the group comprising SiC, TiC, ZrC, HfC, NbC, WC, $Mo_2C$ and mixtures thereof. The carbon-based structure generally is at least one nanographitic plate extending away from the core a distance of about 1 nm to about 100 nm and is oriented relative the major axis of the core at an angle of between about 0° and about 90°.

In additional embodiments, the present invention provides methods for preparing one or more nanowires comprising one or more catalyst metals associated with the nanowires. In exemplary embodiments, one or more nanowires are dispersed in a solution, and then one or more catalyst metals are added (for example, a solution comprising one or more catalyst metal nanoparticles). The solution is then refluxed (e.g., heated until boiling, for example, for about 10-60 minutes), whereby the catalyst metals become associated with the nanowires. The solution can then be filtered to generate a solid nanowire dispersion, and then finally dried.

The present invention also provides methods for preparing a fuel cell membrane electrode assembly. Initially, a gas diffusion layer is provided. Then, a first composition (e.g., a solution) of catalyst metal-associated nanowires is disposed adjacent the gas diffusion layer. Suitably, the solution of catalyst metal-associated nanowires also comprises one or more ionomers) Then, a membrane layer (e.g., a proton conducting polymer) is disposed adjacent the first catalyst metal-associated nanowire composition, and finally, a second composition of catalyst metal-associated nanowires (e.g., a solution suitably also comprising one or more ionomers) is disposed adjacent the membrane layer. Suitably the first composition comprises anode catalyst metal-associated nanowires and the second composition comprises cathode catalyst metal-associated nanowires. In additional embodiments, a masking layer is disposed adjacent the gas diffusion layer to cover at least the edges of the gas diffusion layer prior to disposing the first composition of catalyst metal-associated nanowires. The masking layer is then removed after the disposing of the first composition, but prior to disposing the membrane layer. In further embodiments, a masking layer is disposed on the membrane layer to cover at least the edges of the membrane layer prior to disposing the second composition of catalyst metal-associated nanowires. Suitably the nanowire compositions are sprayed from solution. The present invention also provides membrane electrode assemblies prepared according to the methods disclosed throughout.

In a still further embodiment, the present invention provides methods for preparing a fuel cell electrode stack. Initially, a first end plate is provided, and a gasket is disposed adjacent the end plate. Then, a membrane electrode assembly (MEA) of the present invention is disposed adjacent the gasket. A gas diffusion layer is then disposed adjacent the MEA, followed by disposing another gasket adjacent the gas diffusion layer. Finally, a end plate is disposed adjacent the second gasket.

In further embodiments, the MEA preparation methods of the present invention can further comprise assembling additional MEA layers (2, 3, 4, 5, 6, etc., up to an $n^{th}$ MEA) when preparing fuel cell electrode stacks. For example, following disposition of the second gasket, and prior to disposing the final end plate, a bipolar plate is disposed adjacent the second gasket. Another gasket is then disposed adjacent the bipolar plate, and a second MEA is disposed adjacent the gasket. This is followed by disposing an additional gas diffusion layer adjacent the MEA. Finally, an additional gasket is then disposed the adjacent gas diffusion layer. These steps can then repeated until the $n^{th}$, i.e., final, membrane electrode assembly, has been disposed, prior to disposing an end plate.

The present invention also provides conducting composites, comprising one or more nanowires comprising a core, an interfacial carbide layer and a carbon-based structure formed on the interfacial carbide layer, and carbon black. An additional embodiment provides porous catalyst supports comprising one or more nanowires comprising a core, an interfa-cial carbide layer and a carbon-based structure formed on the interfacial carbide layer, and carbon black. A still further embodiment provides catalysts comprising one or more nanowires comprising a core, an interfacial carbide layer and a carbon-based structure formed on the interfacial carbide layer, carbon black and one or more catalyst metals associated with the nanowires and the carbon black.

Further embodiments, features, and advantages of the invention, as well as the structure and operation of the various embodiments of the invention are described in detail below with reference to accompanying drawings.

BRIEF DESCRIPTION OF THE FIGURES

The invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

Figure 1A:
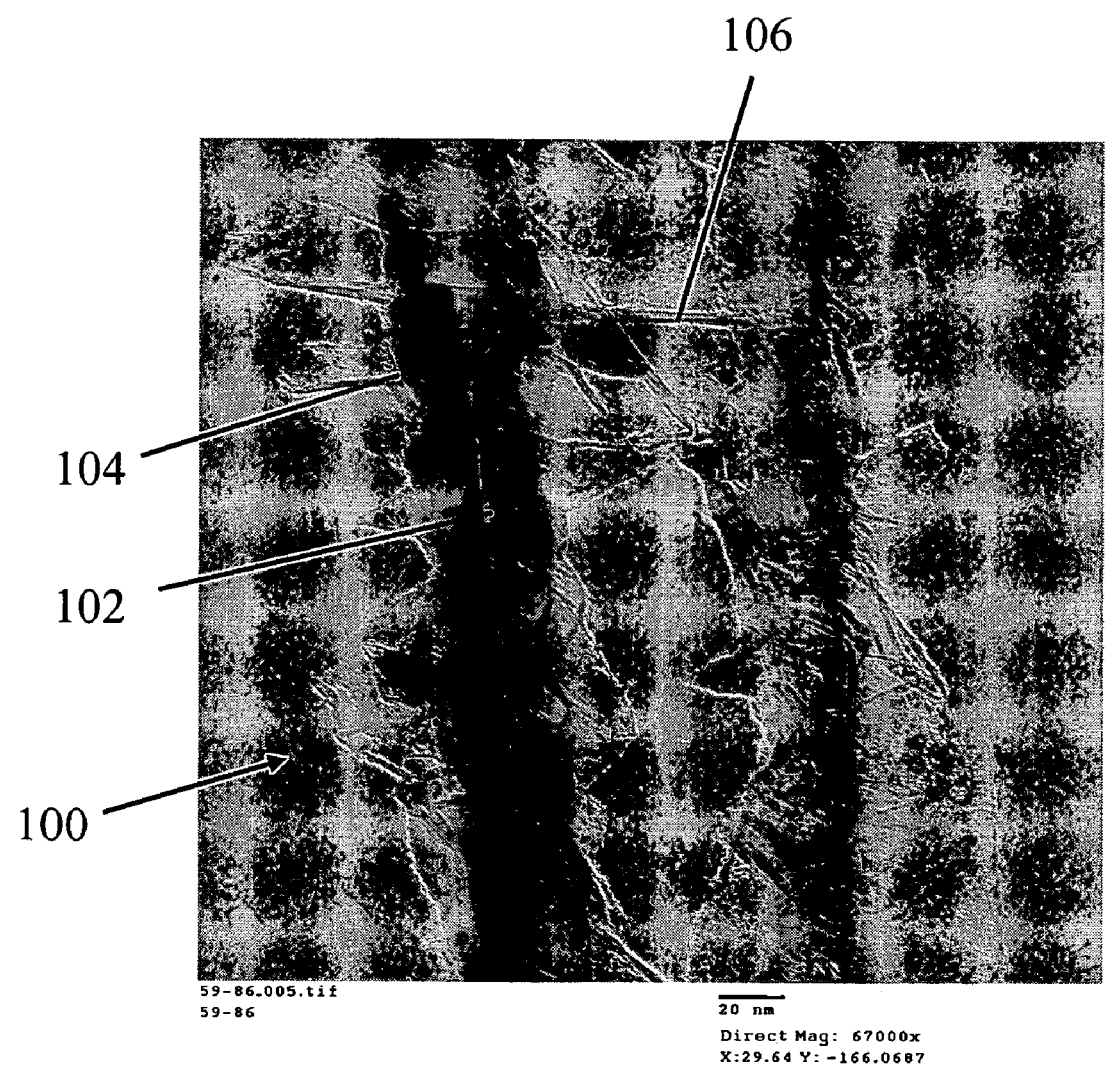
FIG. 1A is a transmission electron micrograph of a nanowire structure in accordance with one embodiment of the present invention.

It should be appreciated that the particular implementations shown and described herein are examples of the invention and are not intended to otherwise limit the scope of the present invention in any way. Indeed, for the sake of brevity, conventional electronics, manufacturing, semiconductor devices, and nanowire (NW), nanorod, nanotube, and nanoribbon technologies and other functional aspects of the systems (and components of the individual operating components of the systems) may not be described in detail herein. Furthermore, for purposes of brevity, the invention is frequently described herein as pertaining to nanowires, though other similar structures are also encompassed herein.

It should be appreciated that although nanowires are frequently referred to, the techniques described herein are also applicable to other nanostructures, such as nanorods, nanotubes, nanotetrapods, nanoribbons and/or combinations thereof. It should further be appreciated that the manufacturing techniques described herein could be used to create a carbon-based layer (including non-crystalline carbon, such as non-basal plane carbon, as well as crystalline nanographite coatings) on the surface of a wide range of materials, including, but not limited to, conventional fibers and fiber structures; flat, curved and irregular surfaces; and various materials such as metal, semiconductors, ceramic foams, reticulated metals and ceramics. Further, the techniques would be suitable for application as catalysts, energy storage and conversion, separation, electrodes for medical devices, protective surfaces, or any other application.

As used herein, an "aspect ratio" is the length of a first axis of a nanostructure divided by the average of the lengths of the second and third axes of the nanostructure, where the second and third axes are the two axes whose lengths are most nearly equal to each other. For example, the aspect ratio for a perfect rod would be the length of its long axis divided by the diameter of a cross-section perpendicular to (normal to) the long axis.

The term "heterostructure" when used with reference to nanostructures refers to nanostructures characterized by at least two different and/or distinguishable material types. Typically, one region of the nanostructure comprises a first material type, while a second region of the nanostructure comprises a second material type. In another embodiment, the nanostructure comprises a core of a first material and at least one shell of a second (or third etc.) material, where the different material types are distributed radially about the long axis of a nanowire, a long axis of an arm of a branched nanocrystal, or the center of a nanocrystal, for example. A shell need not completely cover the adjacent materials to be considered a shell or for the nanostructure to be considered a heterostructure. For example, a nanocrystal characterized by a core of one material covered with small islands of a second material is a heterostructure. In other embodiments, the different material types are distributed at different locations within the nanostructure. For example, material types can be distributed along the major (long) axis of a nanowire or along a long axis or arm of a branched nanocrystal. Different regions within a heterostructure can comprise entirely different materials, or the different regions can comprise a base material.

As used herein, a "nanostructure" is a structure having at least one region or characteristic dimension with a dimension of less than about 500 nm, e.g., less than about 200 nm, less than about 100 nm, less than about 50 nm, or even less than about 20 nm. Typically, the region or characteristic dimension will be along the smallest axis of the structure. Examples of such structures include nanowires, nanorods, nanotubes, branched nanocrystals, nanotetrapods, tripods, bipods, nanocrystals, nanodots, quantum dots, nanoparticles, branched tetrapods (e.g., inorganic dendrimers), and the like. Nanostructures can be substantially homogeneous in material properties, or in other embodiments can be heterogeneous (e.g., heterostructures). Nanostructures can be, for example, substantially crystalline, substantially monocrystalline, polycrystalline, amorphous, or combinations thereof. In one aspect, one of the three dimensions of the nanostructure has a dimension of less than about 500 nm, for example, less than about 200 nm, less than about 100 nm, less than about 50 nm, or even less than about 20 mm.

As used herein, the term "nanowire" generally refers to any elongated conductive or semiconductive material (or other material described herein) that includes at least one cross sectional dimension that is less than 500 nm, and preferably, less than 100 nm, and has an aspect ratio (length:width) of greater than 10, preferably greater than 50, and more preferably, greater than 100.

The nanowires of this invention can be substantially homogeneous in material properties, or in other embodiments can be heterogeneous (e.g. nanowire heterostructures). The nanowires can be fabricated from essentially any convenient material or materials, and can be, e.g., substantially crystalline, substantially monocrystalline, polycrystalline, amorphous, or combinations thereof. Nanowires can have a variable diameter or can have a substantially uniform diameter, that is, a diameter that shows a variance less than about 20% (e.g., less than about 10%, less than about 5%, or less than about 1%) over the region of greatest variability and over a linear dimension of at least 5 nm (e.g., at least 10 nm, at least 20 nm, or at least 50 nm). Typically the diameter is evaluated away from the ends of the nanowire (e.g., over the central 20%, 40%, 50%, or 80% of the nanowire). A nanowire can be straight or can be e.g., curved or bent, over the entire length of its long axis or a portion thereof. In other embodiments, a nanowire or a portion thereof can exhibit two- or three-dimensional quantum confinement.

Examples of such nanowires include semiconductor nanowires as described in Published International Patent Application Nos. WO 02/17362, WO 02/48701, and WO 01/03208, carbon nanotubes, and other elongated conductive or semiconductive structures of like dimensions, which are incorporated herein by reference.

As used herein, the term "nanorod" generally refers to any elongated conductive or semiconductive material (or other material described herein) similar to a nanowire, but having an aspect ratio (length:width) less than that of a nanowire. Note that two or more nanorods can be coupled together along their longitudinal axis so that the coupled nanorods span all the way between electrodes. Alternatively, two or more nanorods can be substantially aligned along their longitudinal axis, but not coupled together, such that a small gap exists between the ends of the two or more nanorods. In this case, electrons can flow from one nanorod to another by hopping from one nanorod to another to traverse the small gap. The two or more nanorods can be substantially aligned, such that they form a path by which electrons can travel between electrodes.

A wide range of types of materials for nanowires, nanorods, nanotubes and nanoribbons can be used, including semiconductor material selected from, e.g., Si, Ge, Sn, Se, Te, B, C (including diamond), P, B—C, B—P($BP_6$), B—Si, Si—C, Si—Ge, Si—Sn and Ge—Sn, SiC, BN, BP, BAs, AlN, AlP, AlAs, AlSb, GaN, GaP, GaAs, GaSb, InN, InP, InAs, ZnO, ZnS, ZnSe, ZnTe, CdS, CdSe, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, AgF, AgCl, AgBr, AgI, $BeSiN_2$, $CaCN_2$, $ZnGeP_2$, $CdSnAs_2$, $ZnSnSb_2$, $CuGeP_3$, $CuSi_2P_3$, (Cu, Ag)(Al, Ga, In, Ti, Fe)(S, Se, Te)$_2$, $Si_3N_4$, $Ge_3N_4$, $Al_2O_3$, (Al, Ga, In)$_2$ (S, Se, Te)$_3$, $Al_2CO$, and an appropriate combination of two or more such semiconductors.

The nanowires can also be formed from other materials such as metals such as gold, nickel, palladium, iradium, cobalt, chromium, aluminum, titanium, tin and the like, metal alloys, polymers, conductive polymers, ceramics, and/or combinations thereof. Other now known or later developed conducting or semiconductor materials can be employed.

Nanowires of the present invention may also be comprised of organic polymers, ceramics, inorganic semiconductors such as carbides and nitrides, and oxides (such as $TiO_2$ or ZnO), carbon nanotubes, biologically derived compounds, e.g., fibrillar proteins, etc. or the like. For example, in certain embodiments, inorganic nanowires are employed, such as semiconductor nanowires. Semiconductor nanowires can be comprised of a number of Group IV, Group III-V or Group II-VI semiconductors or their oxides. In one embodiment, the nanowires may include metallic conducting, semiconducting, carbide, nitride, or oxide materials such as $RuO_2$, SiC, GaN, $TiO_2$, $SnO_2$, $WC_x$, $MoC_x$, ZrC, $WN_x$, $MoN_x$ etc. As used throughout, the subscript "x," when used in chemical formulae, refers to a whole, positive integer (e.g., 1, 2, 3, 4, 5, 6, 7, 8, 9, 10, etc). It is suitable that the nanowires be made from a material that is resistant to degradation in a weak acid so that the nanowires are compatible with the reactants of a variety of different fuel cells. Nanowires according to this invention can expressly exclude carbon nanotubes, and, in certain embodiments, exclude "whiskers" or "nanowhiskers", particularly whiskers having a diameter greater than 100 nm, or greater than about 200 nm.

In other aspects, the semiconductor may comprise a dopant from a group consisting of: a p-type dopant from Group III of the periodic table; an n-type dopant from Group V of the periodic table; a p-type dopant selected from a group consisting of: B, Al and In; an n-type dopant selected from a group consisting of: P, As and Sb; a p-type dopant from Group II of the periodic table; a p-type dopant selected from a group consisting of: Mg, Zn, Cd and Hg; a p-type dopant from Group IV of the periodic table; a p-type dopant selected from a group consisting of: C and Si.; or an n-type dopant selected from a group consisting of: Si, Ge, Sn, S, Se and Te. Other now known or later developed dopant materials can be employed.

Additionally, the nanowires or nanoribbons can include carbon nanotubes, or nanotubes formed of conductive or semiconductive organic polymer materials, (e.g., pentacene, and transition metal oxides).

It should be understood that the spatial descriptions (e.g., "above", "below", "up", "down", "top", "bottom", etc.) made herein are for purposes of illustration only, and that devices of the present invention can be spatially arranged in any orientation or manner.

Nanomaterials have been produced in a wide variety of different ways. For example, solution based, surfactant mediated crystal growth has been described for producing spherical inorganic nanomaterials, e.g., quantum dots, as well as elongated nanomaterials, e.g., nanorods and nanotetrapods. Other methods have also been employed to produce nanomaterials, including vapor phase methods. For example, silicon nanocrystals have been reportedly produced by laser pyrolysis of silane gas.

Other methods employ substrate based synthesis methods including, e.g., low temperature synthesis methods for producing, e.g., ZnO nanowires as described by Greene et al. ("Low-temperature wafer scale production of ZnO nanowire arrays," L. Greene, M. Law, J. Goldberger, F. Kim, J. Johnson, Y. Zhang, R. Saykally, P. Yang, Angew. Chem. Int. Ed. 42, 3031-3034, 2003), and higher temperature VLS methods that employ catalytic gold particles, e.g., that are deposited either as a colloid or as a thin film that forms a particle upon heating. Such VLS methods of producing nanowires are described in, for example, Published International Patent Application No. WO 02/017362, the full disclosure of which is incorporated herein by reference in its entirety for all purposes.

Nanostructures can be fabricated and their size can be controlled by any of a number of convenient methods that can be adapted to different materials. For example, synthesis of nanocrystals of various composition is described in, e.g., Peng et al. (2000) "Shape Control of CdSe Nanocrystals" *Nature* 404, 59-61; Puntes et al. (2001) "Colloidal nanocrystal shape and size control: The case of cobalt" *Science* 291, 2115-2117; U.S. Pat. No. 6,306,736 to Alivisatos et al. (Oct. 23, 2001) entitled "Process for forming shaped group III-V semiconductor nanocrystals, and product formed using process;" U.S. Pat. No. 6,225,198 to Alivisatos et al. (May 1, 2001) entitled "Process for forming shaped group II-VI semiconductor nanocrystals, and product formed using process;" U.S. Pat. No. 5,505,928 to Alivisatos et al. (Apr. 9, 1996) entitled "Preparation of III-V semiconductor nanocrystals;" U.S. Pat. No. 5,751,018 to Alivisatos et al. (May 12, 1998) entitled "Semiconductor nanocrystals covalently bound to solid inorganic surfaces using self-assembled monolayers;" U.S. Pat. No. 6,048,616 to Gallagher et al. (Apr. 11, 2000) entitled "Encapsulated quantum sized doped semiconductor particles and method of manufacturing same;" and U.S. Pat. No. 5,990,479 to Weiss et al. (Nov. 23, 1999) entitled "Organo luminescent semiconductor nanocrystal probes for biological applications and process for making and using such probes."

Growth of nanowires having various aspect ratios, including nanowires with controlled diameters, is described in, e.g., Gudiksen et al. (2000) "Diameter-selective synthesis of semiconductor nanowires" *J. Am. Chem. Soc.* 122, 8801-8802; Cui et al. (2001) "Diameter-controlled synthesis of single-crystal silicon nanowires" *Appl. Phys. Lett.* 78, 2214-2216; Gudiksen et al. (2001) "Synthetic control of the diameter and length of single crystal semiconductor nanowires" *J. Phys. Chem. B* 105, 4062-4064; Morales et al. (1998) "A laser ablation method for the synthesis of crystalline semiconductor nanowires" *Science* 279, 208-211; Duan et al. (2000) "General synthesis of compound semiconductor nanowires" *Adv. Mater.* 12, 298-302; Cui et al. (2000) "Doping and electrical transport in silicon nanowires" *J. Phys. Chem. B* 104, 5213-5216; Peng et al. (2000) "Shape control of CdSe nanocrystals" *Nature* 404, 59-61; Puntes et al. (2001) "Colloidal nanocrystal shape and size control: The case of cobalt" *Science* 291, 2115-2117; U.S. Pat. No. 6,306,736 to Alivisatos et al. (Oct. 23, 2001) entitled "Process for forming shaped group III-V semiconductor nanocrystals, and product formed using process;" U.S. Pat. No. 6,225,198 to Alivisatos et al. (May 1, 2001) entitled "Process for forming shaped group II-VI semiconductor nanocrystals, and product formed using process"; U.S. Pat. No. 6,036,774 to Lieber et al. (Mar. 14, 2000) entitled "Method of producing metal oxide nanorods"; U.S. Pat. No. 5,897,945 to Lieber et al. (Apr. 27, 1999) entitled "Metal oxide nanorods"; U.S. Pat. No. 5,997,832 to Lieber et al. (Dec. 7, 1999) "Preparation of carbide nanorods;" Urbau et al. (2002) "Synthesis of single-crystalline perovskite nanowires composed of barium titanate and strontium titanate" *J. Am. Chem. Soc.*, 124, 1186; and Yun et al. (2002) "Ferroelectric Properties of Individual Barium Titanate Nanowires Investigated by Scanned Probe Microscopy" *Nanoletters* 2, 447.

In certain embodiments, the nanowires of the present invention are produced by growing or synthesizing these elongated structures on substrate surfaces. By way of example, published U.S. Patent Application No. US-2003-0089899-A1 discloses methods of growing uniform populations of semiconductor nanowires from gold colloids adhered to a solid substrate using vapor phase epitaxy. Greene et al. ("Low-temperature wafer scale production of ZnO nanowire arrays", L. Greene, M. Law, J. Goldberger, F. Kim, J. Johnson, Y. Zhang, R. Saykally, P. Yang, *Angew. Chem. Int. Ed.* 42, 3031-3034, 2003) discloses an alternate method of synthesizing nanowires using a solution based, lower temperature wire growth process. A variety of other methods are used to synthesize other elongated nanomaterials, including the surfactant based synthetic methods disclosed in U.S. Pat. Nos. 5,505,928, 6,225,198 and 6,306,736, for producing shorter nanomaterials, and the known methods for producing carbon nanotubes, see, e.g., US-2002/0179434 to Dai et al., as well as methods for growth of nanowires without the use of a growth substrate, see, e.g., Morales and Lieber, Science, V.279, p. 208 (Jan. 9, 1998). As noted herein, any or all of these different materials may be employed in producing the nanowires for use in the invention. For some applications, a wide variety of group III-V, II-VI and group IV semiconductors may be utilized, depending upon the ultimate application of the substrate or article produced. In general, such semiconductor nanowires have been described in, e.g., US-2003-0089899-A1, incorporated herein above.

Growth of branched nanowires (e.g., nanotetrapods, tripods, bipods, and branched tetrapods) is described in, e.g., Jun et al. (2001) "Controlled synthesis of multi-armed CdS nanorod architectures using monosurfactant system" *J. Am. Chem. Soc.* 123, 5150-5151; and Manna et al. (2000) "Synthesis of Soluble and Processable Rod-, Arrow-, Teardrop-, and Tetrapod-Shaped CdSe Nanocrystals" *J. Am. Chem. Soc.* 122, 12700-12706.

Synthesis of nanoparticles is described in, e.g., U.S. Pat. No. 5,690,807 to Clark Jr. et al. (Nov. 25, 1997) entitled "Method for producing semiconductor particles"; U.S. Pat. No. 6,136,156 to El-Shall, et al. (Oct. 24, 2000) entitled "Nanoparticles of silicon oxide alloys;" U.S. Pat. No. 6,413,489 to Ying et al. (Jul. 2, 2002) entitled "Synthesis of nanometer-sized particles by reverse micelle mediated techniques;" and Liu et al. (2001) "Sol-Gel Synthesis of Free-Standing Ferroelectric Lead Zirconate Titanate Nanoparticles" *J. Am. Chem. Soc.* 123, 4344. Synthesis of nanoparticles is also described in the above citations for growth of nanocrystals, nanowires, and branched nanowires, where the resulting nanostructures have an aspect ratio less than about 1.5.

Synthesis of core-shell nanostructure heterostructures, namely nanocrystal and nanowire (e.g., nanorod) core-shell heterostructures, are described in, e.g., Peng et al. (1997) "Epitaxial growth of highly luminescent CdSe/CdS core/shell nanocrystals with photostability and electronic accessibility" *J. Am. Chem. Soc.* 119, 7019-7029; Dabbousi et al. (1997) "(CdSe)ZnS core-shell quantum dots: Synthesis and characterization of a size series of highly luminescent nanocrysallites" *J. Phys. Chem. B* 101, 9463-9475; Manna et al. (2002) "Epitaxial growth and photochemical annealing of graded CdS/ZnS shells on colloidal CdSe nanorods" *J. Am. Chem. Soc.* 124, 7136-7145; and Cao et al. (2000) "Growth and properties of semiconductor core/shell nanocrystals with InAs cores" *J. Am. Chem. Soc.* 122, 9692-9702. Similar approaches can be applied to growth of other core-shell nanostructures.

Growth of nanowire heterostructures in which the different materials are distributed at different locations along the long axis of the nanowire is described in, e.g., Gudiksen et al. (2002) "Growth of nanowire superlattice structures for nanoscale photonics and electronics" *Nature* 415, 617-620; Bjork et al. (2002) "One-dimensional steeplechase for electrons realized" *Nano Letters* 2, 86-90; Wu et al. (2002) "Block-by-block growth of single-crystalline Si/SiGe superlattice nanowires" *Nano Letters* 2, 83-86; and U.S. Patent Application 60/370,095 (Apr. 2, 2002) to Empedocles entitled "Nanowire heterostructures for encoding information." Similar approaches can be applied to growth of other heterostructures.

As described herein, and throughout co-assigned provisional Patent Application No. 60/738,100, filed Nov. 21, 2005, the entire contents of which are incorporated by reference herein, nanowire structures with multiple shells can also be fabricated, such as, for example, a conducting inner core wire (which may or may not be doped) (e.g., to impart the necessary conductivity for electron transport) and one or more outer-shell layers that provide a suitable surface for binding catalyst (and/or polymer electrolyte). For example, in one embodiment, a multi-layer or multi-walled carbon nanotube (MWNT) can be formed in which the outermost shell layer is converted to silicon carbide to provide a surface (SiC) to bind catalyst (and/or polymer electrolyte) and a conductive carbon nanotube core to impart the necessary conductivity. In alternative embodiments, the core may consist of heavily doped material such as doped silicon, and a shell of a carbide, nitride etc. material (e.g., SiC) may then be formed on the core. The use of silicon as the core material leverages the extensive experience and infrastructure known for fabricating silicon nanowires. A carbide shell, such as SiC, WC, MoC or mixed carbide (e.g. WSiC) may be formed around the core material using a controlled surface reaction. SiC, WC and MoC are known for their high conductivity and chemical stability. In addition, these materials have been shown to have catalytic properties similar to those of precious metals, such as Pt, for methanol oxidation, and therefore may provide further performance enhancements in the nanowire bird's nest MEA. The precursor materials for the shell may be deposited on the core nanowire surface (e.g., silicon) by atomic layer deposition (ALD) and then converted to the carbide by high-temperature carbothermal reduction, for example.

FIG. 1A. shows a transmission electron micrograph (TEM) of a nanowire structure 100 according to an embodiment of the present invention. Nanowire structure 100 comprises core 102, carbon-based layer 104 and, in suitable embodiments, comprises carbon-based structure 106 formed on the carbon-based layer extending away from the core. The terms "core" and "nanowire core" are used interchangeably herein. Suitably, core 102 comprises a semiconductor material, including but not limited to, those semiconductors disclosed throughout. For example, core 102 can comprise Si, B, SiC or GaN. Suitably the semiconductor core is highly doped. In other embodiments, core 102 can comprise an inorganic oxide, an inorganic carbide or an inorganic nitride. Suitable inorganic oxides include, but are not limited to, $SiO_2$, $Al_2O_3$, $TiO_2$, $SnO_2$, $ZrO_2$, $HfO_2$ and $Ta_2O_5$. Suitable inorganic carbides include, but are not limited to, TiC, ZrC, HfC, NbC, WC, $W_2C$, MoC and $Mo_2C$. Suitable inorganic nitrides include, but are not limited to, TiN, ZrN, HfN, WN, MoN and BN. Core 102 can also comprise a carbon nanofiber, e.g., a carbon nanotube or a carbon nanofibril.

In other embodiments, core 102 can comprise carbon, consist essentially of carbon or consist of carbon (i.e. consist only of carbon). In embodiments where core 102 consists only of carbon, nanowire structure 100 represents a purely carbon-based nanowire, where core 102 is carbon and carbon-based layer 104 is carbon in either amorphous and/or crystalline forms (e.g., basal plane carbon in the form of graphene layers or sheets). Such embodiments are distinct from carbon nanotubes, however, as core 102 is not hollow, but rather carbon-based. In embodiments where core 102 comprises carbon or consists essentially of carbon, core 102 can also further comprise additional materials, such as semiconductors, metals, or other materials, as described herein. In another embodiment, core 102 can comprise a carbide, i.e. a mixture of carbon and an additional material as described herein. For example, core 102 can comprise inorganic carbides, such as SiC, TiC, ZrC, HfC, NbC, WC, $W_2C$, MoC and $Mo_2C$. In other embodiments, core 102 is substantially devoid of carbon, that is will contain less than about 0.5% carbon, e.g., less than about 0.25%, less than about 0.1%, or suitably, no carbon at all.

Core 102 of nanowire structure 100 can be prepared using any suitable method known in the art. For example, core 102 can be prepared from metallic nucleation particles using chemical vapor deposition and related methods, such as those disclosed in Pan et al., "Systems and Methods for Nanowire Growth and Harvesting," U.S. patent application Ser. No. 11/117,703, filed Apr. 29, 2005, and Romano et al., "Methods for Nanowire Growth," U.S. patent application Ser. No.

11/117,702, filed Apr. 29, 2005, each of which is incorporated herein by reference, or as otherwise disclosed in other patents, patent applications and references described herein. In general, core 102 will be grown on a suitable substrate material, such as Si or other semiconductor material. In suitable embodiments, cores 102 are prepared from metallic nucleation particles that are about 10 nm to about 100 nm in diameter. For example, cores 102 can be prepared from nucleation particles that are about 20 nm in diameter that have been deposited on a substrate surface at a particle density of about 80 particles/$\mu m^2$ to about 400 particles/$\mu m^2$, or from nucleation particles that are about 10 nm in diameter that have been deposited on a substrate at a particle density of about 4 particles/$\mu m^2$ to about 40 particles/$\mu m^2$. When nucleation particles of about 20 nm in diameter are used (e.g., 20 nm gold nanoparticles), substantially pure nanowires with an average diameter of about 27 nm are produced. Use of nucleation particles of about 10 nm in diameter result in nanowires with an average diameter of about 15 nm. Suitable conditions for growing nanowires from 10 nm nucleation particles are readily determined by those of skill in the art. Exemplary conditions include $SiH_4$ flow at 20 to 40 standard cubic centimeters per minute (sccm) (e.g., about 40 sccm), $H_2$/He flow at 50/350, 200/200 and 400/0 sccm (e.g., about 50/350) and total pressure of about 15, 30 and 45 Torr (e.g., about 15 Torr).

The formation of carbon-based layer 104 and carbon-based structure 106, when present, can occur while core 102 is still attached to the substrate material, or core 102 can be removed from the substrate material for later processing, as described herein. Suitably, core 102 will have a length of greater than about 50 nm to less than about 1 μm. In suitable such embodiments, core 102 will have a length of a few 100 nms. In addition, core 102 will be at least about 1 nm to less than about 1 μm in cross-sectional diameter. Suitably, core 102 will have a diameter of about a few nms to 100's of nms, but generally less than about 500 nm.

As used herein, the term "carbon-based layer" 104 refers to a layer, coating, or other similar structure of carbon-comprising material either partly or completely surrounding core 102. Carbon based layer 104 can be in the form of islands or sections of material on core 102, or can completely cover and surround core 102 in a substantially uniform layer. Carbon-based layer 104 can comprise carbon in any form, for example, substantially crystalline, substantially monocrystalline, polycrystalline, amorphous (i.e., non-crystalline), or combinations thereof. In an embodiment, carbon-based layer 104 will be substantially non-crystalline or amorphous. As used herein, the terms non-crystalline and amorphous refer to carbon that lacks a distinct crystalline structure and instead has a random arrangement of carbon atoms. In other embodiments, amorphous, non-crystalline carbon-based layer 104 will be substantially devoid of basal plane carbon. That is, carbon-based layer 104 will contain less than about 0.5% basal plane carbon, e.g., less than about 0.25%, less than about 0.1%, or suitably, no basal plane carbon at all. Basal plane carbon refers to carbon in its characteristic bonded, crystalline structure found in graphene sheets and/or graphite layers.

In an embodiment, carbon-based layer 104 is an interfacial carbide layer. The term "interfacial carbide layer" refers to carbide that has formed at the interface of core 102, where the surface is exposed to the surrounding environment. Interfacial carbide layers can comprise any suitable carbide, such as, but not limited to, SiC, TiC, ZrC, HfC, NbC, WC, $Mo_2C$ and mixtures thereof. Interfacial carbide layers on the surface of core 102 can be of any thickness. In some embodiments, core 102 and carbon-based layer 104 are both composed entirely of carbide. In other embodiments, carbon-based layer 104 is greater than about 1 nm in thickness, e.g., about 1 nm to about 500 nm in thickness (i.e., the entire thickness of nanowire structure 100 can be a carbide). In other embodiments, carbon-based layer 104 is on the order of a few angstroms (Å) to 10's of Å thick, surrounding core 102 which makes up the remaining thickness of the nanowire structure 100.

Carbon-based layer 104 is formed on core 102 by contacting core 102 with one or more carbon-comprising gases or gas mixtures at an elevated temperature. As the carbon-comprising gas contacts core 102, carbon precipitates out of the gas phase and forms carbon-based layer 104 at the interface of core 102 and the surrounding environment. In an embodiment, where core 102 is a semiconductor or like material, carbon-based layer 104 is in the form of a carbide layer formed on core 102. The carbon-comprising gas can be in the form of a gas mixture comprising several component cases. In another embodiment, in addition to a carbon-based gas, this gas mixture can also comprise one or more noble gases, or other gases such as hydrogen, to maintain the partial pressure of the gas mixture and to control the carbide and nanographite formation. These additional gases help to limit the amount of carbon component that precipitates out prior to contact with core 102. Such gases, however, do not, and should not, contaminate or otherwise interfere with the formation of carbon-based layer 104. Suitable carbon-based gases for use in the mixtures include, but are not limited to, carbon monoxide, methane, ethane, propane, butane, ethylene, propylene and various derivatives and mixtures thereof. Contacting core 102 with the carbon-comprising gas mixture can occur at any suitable temperature determined by the ordinarily skilled artisan. In general, the temperature will be in the range of about 400° C. to about 1500° C., or more suitably about 600° C. to about 1300° C. In other embodiments, as carbon-based layer 104 is formed, carbon begins to migrate toward the center of nanowire structure 100 and permeate the entire structure, including core 102. In such embodiments, the entire nanowire structure 100 can therefore be substantially carbon-based throughout, e.g., carbide, and in further embodiments, can be entirely carbon throughout. In an embodiment, the present invention provides a substantially carbon-based nanowire structure that is not a carbon nanotube, i.e. that does not comprise basal plane carbon wrapped around a core (or hollow center), but rather, comprises amorphous, substantially non-crystalline carbon layered on a core comprising, for example, a semiconductor material, or carbide.

As additional carbon precipitates on carbon-based layer 104 (suitably an interfacial carbide layer), carbon-based structures 106 may begin to form on carbon-based layer 104 and chemically bond to the layer. In other embodiments, carbon-based structures 106 are amorphous carbon fibers or nanowires extending from carbon-based layer 104. These carbon nanowires can comprise carbon, for example in the form of carbide, such as SiC, or any suitably carbide described herein or known in the art. In other embodiments, the nanowires can consist essentially of carbon, or in additional embodiments, can consist only of carbon. In such embodiments the carbon-based structures will be substantially devoid of any basal plane carbon.

In other embodiments, carbon-based structures 106 can be nanographitic plates formed on carbon-based layer 104 (suitably an interfacial carbide layer) that chemically bond to the layer via the a-b lattice edges of the carbon crystals. In an embodiment, both nanowires and nanographitic plates can be formed at the same time as part of nanowire structure 100. The term a-b lattice edges refers to the dimensions in the plane of the carbon-based structures 106 that are in the form of nanographitic plates (i.e., the flat dimensions of the plates). In an embodiment, this formation and bonding can occur at the same temperature at which carbon-based layer 104 is formed. In other embodiments, carbon-based layer 104 can be formed at a temperature of about 400° C. to about 800° C., and then the temperature can be increased such that carbon-based structures 106 are formed, for example, at a temperature from about 800° C. to about 1300° C.

Though it is not required, generally, nanographitic plates are highly crystallized, isolated graphene sheets or layers. The graphene layers will generally not be interconnected (i.e., will not be connected via bonds normal to the plane of the layers as in graphite), and grow out of the plane of carbon-based layer 104 (suitably an interfacial carbide layer), attached via the a-b edges of the graphenes to the carbon-based layer 104 and to each other. In other embodiments, however, graphene layers can be interconnected as in the structure of graphite. Suitably, nanographitic plates will comprise less than about 100 graphene sheets, and more suitably, between about 2-15 graphenes. While the dimension of nanographitic plates in the a-b plane (i.e., the plane of the graphene layers) can be any size, generally they will be on the order of 10's to 100's of nanometers. Suitably the nanographitic plates will be less than about 100 nm across in the a-b plane.

Figure 1B:
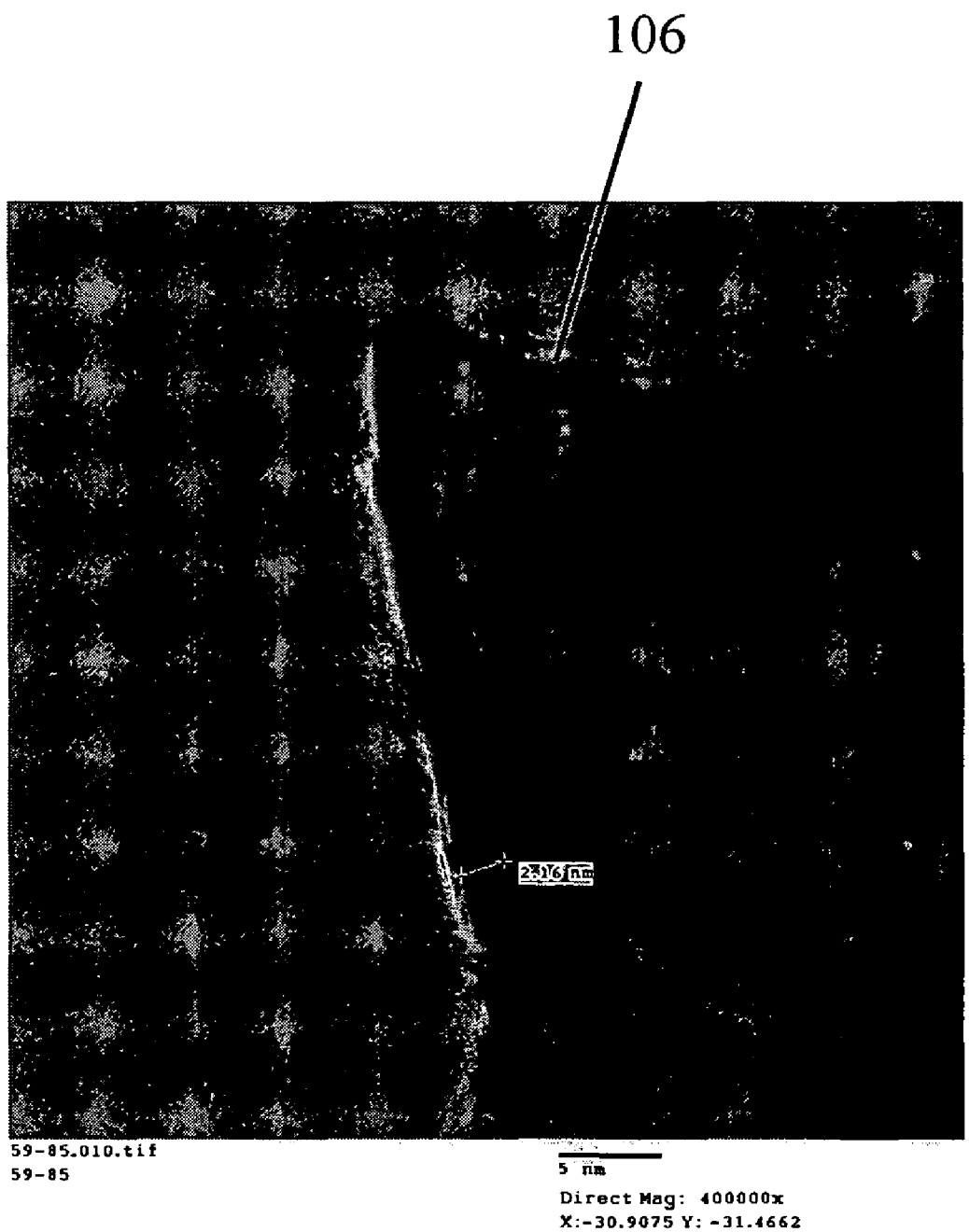
FIG. 1B is a high magnification transmission electron micrograph of a nanowire structure in accordance with one embodiment of the present invention.

Carbon-based structures 106 (e.g., nanowires and/or nanographitic plates) generally extend away from core 102 and carbon-based layer 104 a distance of between about 1 nm and about 500 nm, suitably on the order a few nms to 10's of nms or even to a few 100 nms. The carbon-based structures 106 can be oriented at any angle, between 0° and 90°, relative to the major axis of core 102 (i.e., the long axis of the nanowire). Suitably, carbon-based structures 106 will be at an angle of about 45° to about 90° normal to the axis of core 102. FIG. 1B shows a high magnification TEM of carbon-based structures 106 (in the form of nanographitic plates) extending away from carbon-based layer 104 and core 102. The multiple layers of graphene sheets of the nanographitic plates can be seen.

Figure 2:
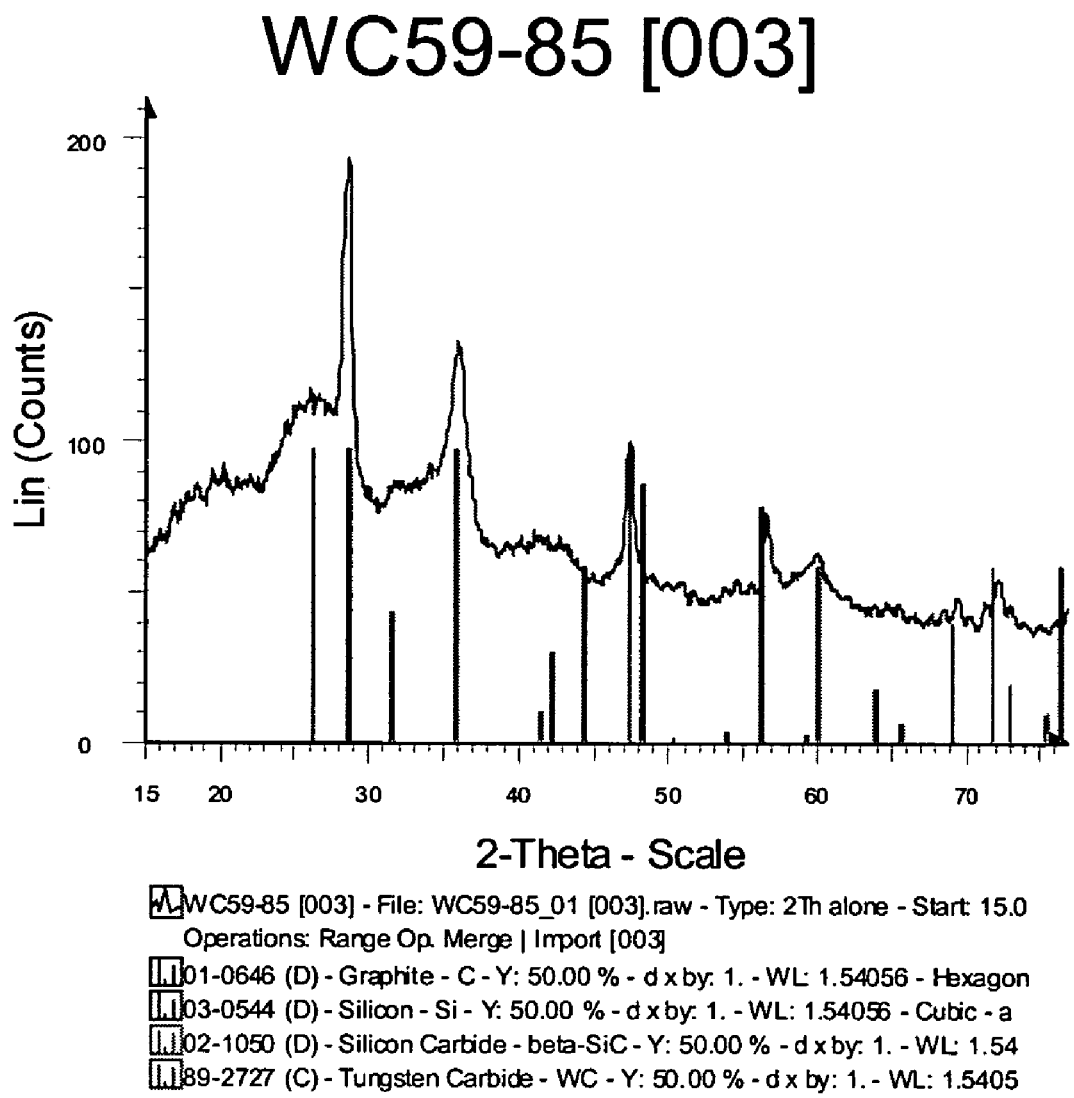
FIG. 2 is an x-ray diffraction pattern of a nanowire structure in accordance with one embodiment of the present invention.

FIG. 2 shows an X-ray diffraction pattern of a representative nanowire structure 100 comprising core 102, carbon-based layer 104 (in the form of an interfacial carbide layer) and carbon-based structures 106 (in the form of nanographitic plates). The nanowire structure used in this x-ray analysis was prepared using a tungsten oxide ($WO_3$) coated silicon nanowire, contacted with methane-comprising gas (see Examples section for an exemplary preparation). The presence of graphite (C), silicon (Si), silicon carbide (SiC) and tungsten carbide (WC) are detected in the diffraction peaks, indicating the presence of a silicon core, a silicon carbide interfacial layer, and a graphite (graphene) nanographitic plate(s).

Figure 3B:
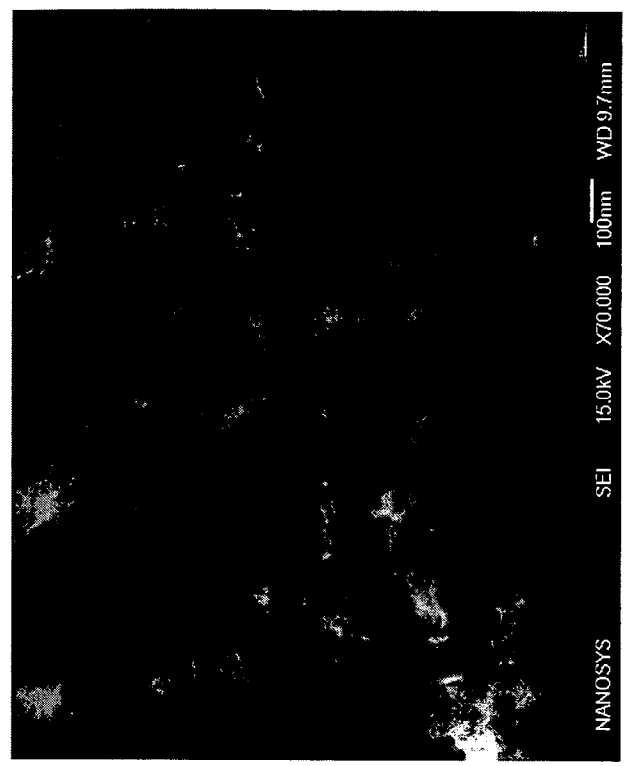
FIG. 3B is a high magnification scanning electron micrograph of an interconnected nanowire network in accordance with one embodiment of the present invention.
Figure 3A:
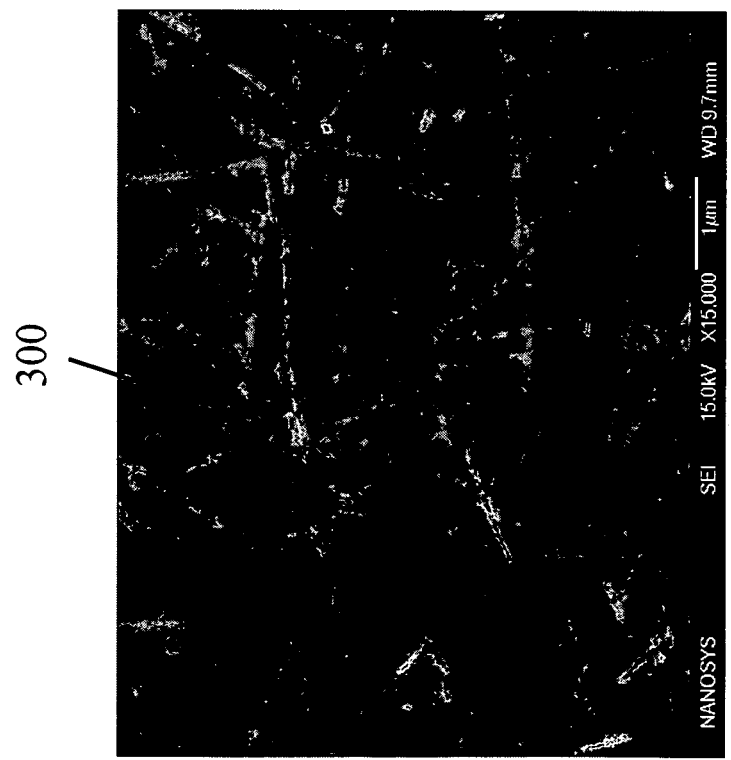
FIG. 3A is a scanning electron micrograph of an interconnected nanowire network in accordance with one embodiment of the present invention.

In another embodiment, as represented in FIGS. 3A and 3B, the present invention provides an interconnected nanowire network 300, comprising a plurality of nanowire structures 100, wherein carbon-based structures 106, in the form of nanographitic plates, attached to the various nanowire cores connect the nanowire structures 100. When a plurality of cores 102 are contacted with a carbon-comprising gas under conditions (e.g., elevated temperature) that favor the formation of carbon-based layers 104 (e.g., interfacial carbide layers) and carbon-based structures 106 as nanographitic plates, interconnected nanowire network 300 forms. As carbon-based structures 106 are generated in the form of nanographitic plates, graphenes extend out in the a-b direction away from adjacent cores 102, until they overlap, or in many cases, interconnect and/or bond to adjacent carbon-based layers 104 (e.g., interfacial carbide layers) and/or other carbon-based structures 106 in the firm of nanographitic plates. The resulting interconnected nanowire network 300, as shown in a scanning electron micrograph (SEM) (FIG. 3A) and high magnification SEM (FIG. 3B), has a densely-packed arrangement of nanowires and interconnecting nanographitic plates. This structure of densely packed nanowires, with or without interconnecting nanographitic plates, is also referred to throughout as a "bird's nest" structure. This arrangement takes the form of a porous structure, wherein the size of pores between the nanowires and nanographitic plates are suitably mesopores. As used herein the term "mesopores" refers to pores that are larger than micropores (micropores are defined as less than about 2 nm in diameter), but smaller than macropores (macropores are defined as greater than about 50 nm in diameter), and therefore have a pore size in the range of greater than about 2 nm to less than about 50 nm in diameter. Suitably, interconnected nanowire network 300 will be substantially free of micropores, that is, less than about 0.1% of the pores will be micropores (i.e., less than about 2 nm in diameter).

The mesoporous material formed by interconnected nanowire network 300 can take the form of a membrane, particle or other similar porous structure. In the form of a membrane, the mesoporous material will generally be a layer of interconnected nanowire network 300 comprising a suitable volume of the network, cut and shaped to the appropriate size. The membrane can be prepared at any overall thickness, depending on the ultimate application, by varying the amount of starting material and reaction temperatures and times, as can be readily determined by those skilled in the art. Generally, the thickness of the mesoporous material will be on the order of 10's to 100's of nanometers, up to several microns and even millimeters depending upon the final desired application.

The creation of particles of the mesoporous material can be generated by grinding, cutting, or otherwise breaking the interconnected nanowire structure 300 into small pieces, each comprising the mesoporous material network. Techniques and devices for grinding, cutting or otherwise breaking the interconnected nanowire structure 300 are well known by, and readily available to, those of skill in the art (e.g., mortar and pestle, rotary grinders, tumblers, and the like). These particles can then be appropriately filtered or selected such that particles of only a certain size are used, depending upon the final application.

Figure 4:
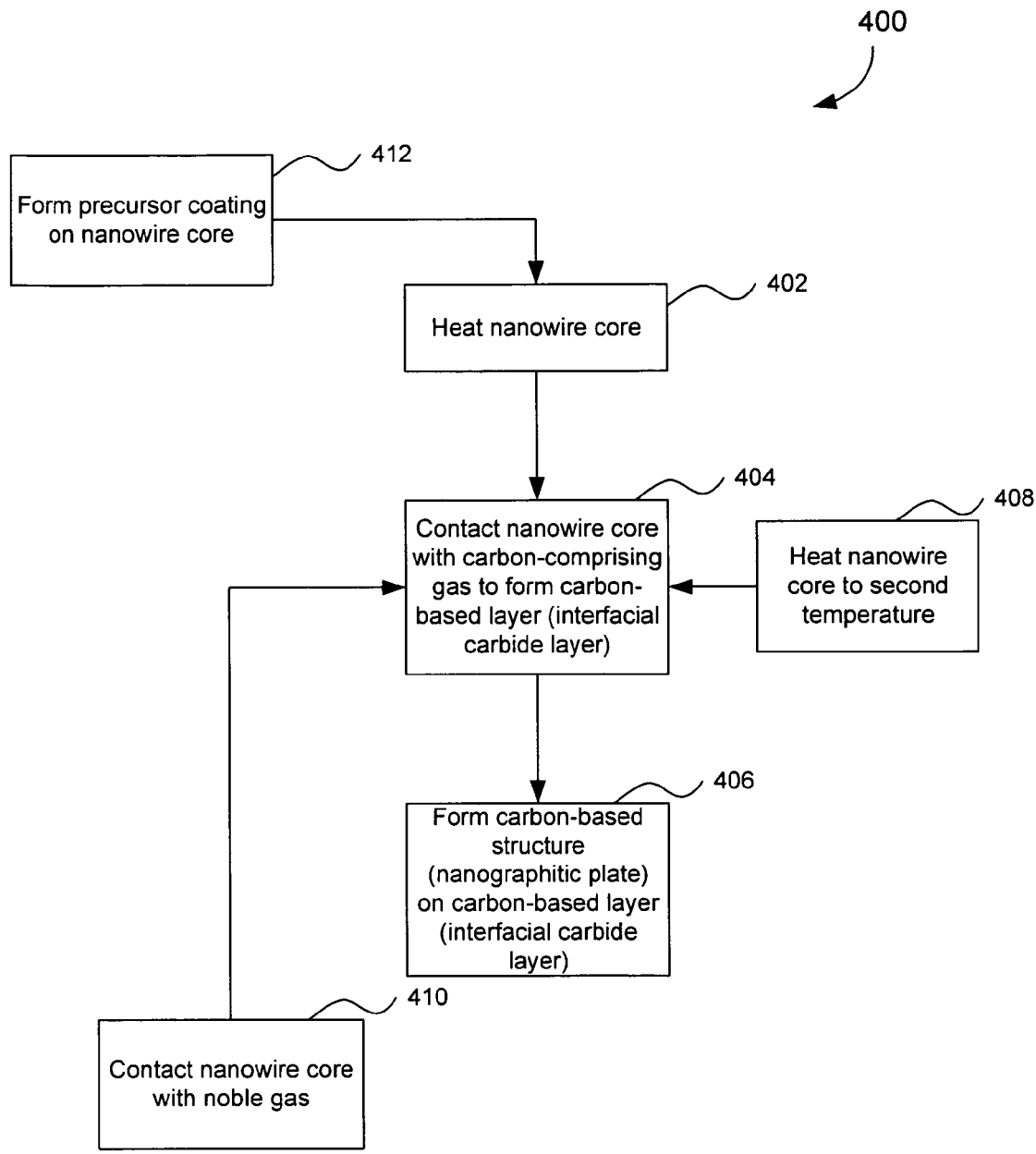
FIG. 4 shows a flow chart representing a method of manufacturing a nanowire structure in accordance with one embodiment of the present invention.

In another embodiment, as represented in flowchart 400 of FIG. 4, with reference to FIG. 1A, the present invention also provides methods of manufacturing a nanowire structure 100. In step 402 of FIG. 4, a nanowire core 102 is heated. In step 404 of FIG. 4, the nanowire core 102 is contacted with one or more carbon-comprising gases to form a carbon-based layer 104 (e.g., an interfacial carbide layer) on the nanowire core 102. The methods of manufacturing of the present invention can also further comprise step 406 of FIG. 4, in which at least one carbon-based structure 106 (e.g., a nanowire and/or a nanographitic plate) is formed on carbon-based layer 104.

Heating step 402 will generally comprise heating core 102 to a temperature of greater than about 400° C., more suitably greater than about 600° C., and most suitably about 600° C. to about 1300° C. As discussed throughout, contacting step 404 will comprise contacting core 102 with a carbon-comprising gas, such as carbon monoxide, methane, ethane, propane, butane, ethylene or propylene. As shown in step 410 of FIG. 4, nanowire core 102 can also be contacted with a noble or similar gas (e.g., He, Ne, Ar, Kr, Xe, $H_2$ and the like) that helps to maintain the partial pressure of the gas mixture to prevent the carbon from precipitating out of the gas phase too early in the process.

Flowchart 400 can also comprise optional step 408 of heating nanowire core 102 to a second temperature in addition to the first temperature utilized during heating step 402. In optional heating step 408, nanowire core 102 and carbon-based layer 104 forming on core 102 can be heated to a second, higher temperature that allows, or in some cases enhances, formation of carbon-based structures 106 (e.g., nanographitic plates and/or nanowires). This second heating step 408 will suitably increase the temperature of core 102 and carbon-based layer 104 to greater than about 800° C., more suitably to greater than about 1000° C., for example, to about 1200-1300° C.

Flowchart 400 of FIG. 4 can also further comprise step 412, forming a precursor coating on the nanowire core 102 prior to heating step 402. Examples of precursor coatings that can be generated on the nanowire cores 102 include oxides, including but are not limited to, $TiO_2$, $ZrO_2$, $HfO_2$, $Nb_2O_3$, $Ta_2O_5$, $MoO_3$ and $WO_3$.

Figure 5:
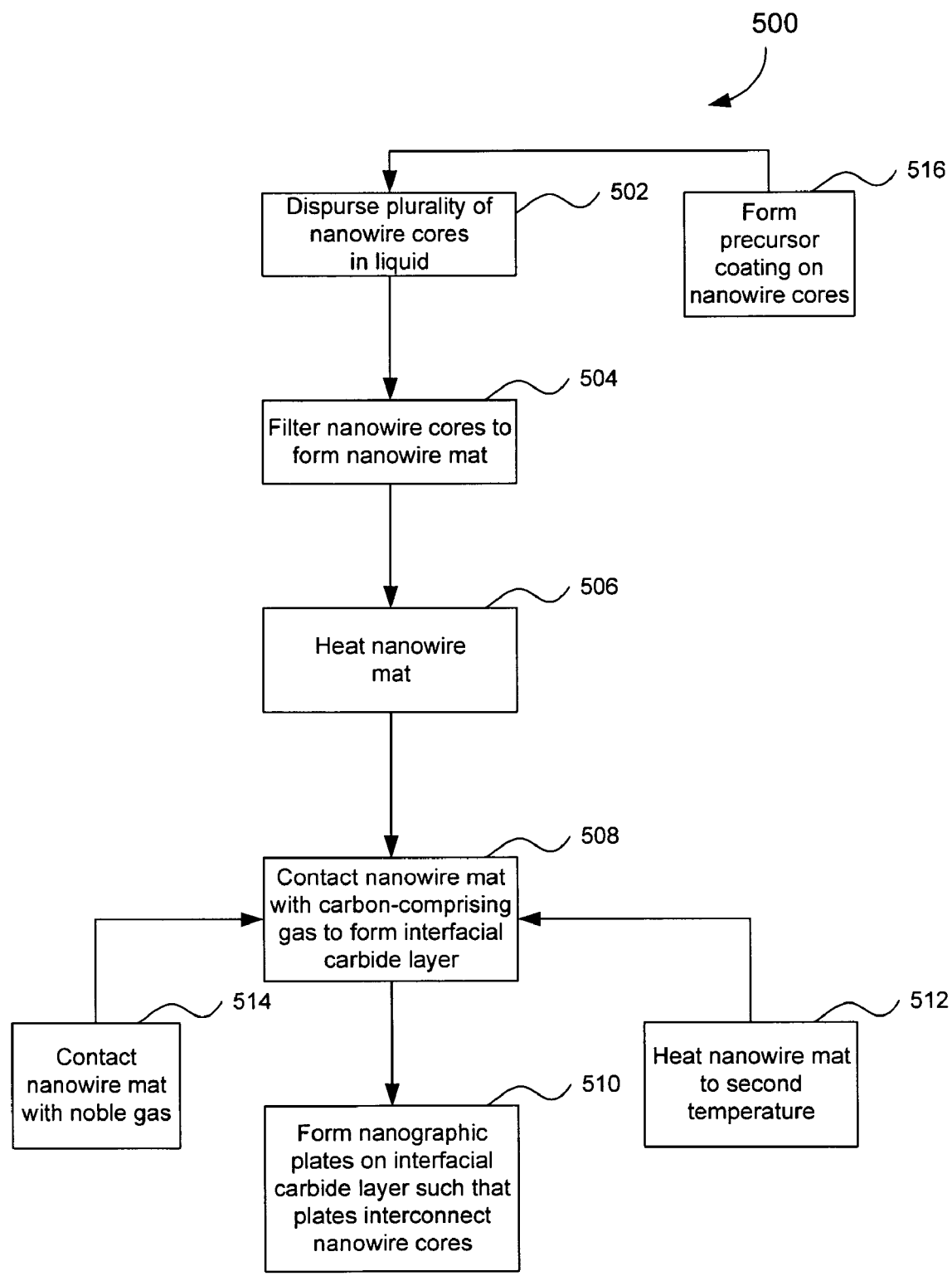
FIG. 5 shows a flow chart representing a method of manufacturing an interconnected nanowire network in accordance with one embodiment of the present invention.

In another embodiment of the present invention, as shown in flowchart 500 of FIG. 5, with reference to FIGS. 1 and 3A, the present invention also provides methods of manufacturing an interconnected nanowire network 300 (or bird's nest structure). In step 502 of FIG. 5, a plurality of nanowire cores 102 are dispersed in a liquid. Any suitable liquid that does not interact with the cores can be used, for example water or various alcohols. In step 504, nanowire cores 102 are filtered, for example, by placing the dispersed nanowire cores through a filtration funnel or similar device to remove the liquid from the nanowire cores, thereby forming a nanowire mat (not shown). The nanowire mat can then be dried. Dispersing 502 and filtration 504 steps help to randomize the nanowire cores 102 and aid in the production of the interconnected network 300 by creating a disperse, random arrangement of nanowire cores 102 prior to generation of the carbon-based structures 106, suitably nanographitic plates. This dispersion and filtration are especially helpful when preparing a membrane structure comprising interconnected nanowire network 300. As used herein, the term "nanowire mat" refers to a plurality of nanowires (i.e., more than one) that have been filtered so as to randomize the nanowires. A nanowire wire mat, for example, will comprise a plurality of randomly oriented nanowires, lying or disposed in a substantially planar structure that can then be used to form interconnected nanowire network 300. In step 506 of FIG. 5, the nanowire mat is then heated. In step 508 of FIG. 5, the nanowire mat is contacted with carbon-comprising gas to form carbon-based layers 104, suitably interfacial carbide layers, on the cores 102. In step 510 of FIG. 4, carbon-based structures 106, suitably nanographitic plates, are formed on the interfacial carbide layer, such that the plates interconnect the nanowire cores 102 to generate the interconnected nanowire network 300.

Heating step 506 generally comprises heating the nanowire mat to a temperature of greater than about 400° C., more suitably greater than about 600° C., and most suitably about 600° C. to about 1300° C. As discussed throughout, contacting step 508 comprises contacting the nanowire mat with a carbon-comprising gas, such as carbon monoxide, methane, ethane, propane, butane, ethylene or propylene. As shown in step 514 of FIG. 5, nanowire mat can also be contacted with a noble or similar gas (e.g., H, He, Ne, Ar, Kr, Xe, $H_2$ and the like).

Flowchart 500 can also comprise optional step 512 of heating the nanowire mat to a second temperature in addition to the first temperature utilized during heating step 506. In optional heating step 512, nanowire mat and carbon-based layer 104 forming on cores 102 can be heated to a second, higher temperature that allows, or in some cases enhances, formation of nanographitic plates (or nanowires). This second heating step 512 suitably increases the temperature of the mat, cores and interfacial carbide layers to greater than about 800° C., more suitably to greater than about 1000° C., for example, to about 1200-1300° C.

Flowchart 500 of FIG. 5 can also further comprise step 516, forming a precursor coating on the nanowire cores 102 prior to heating step 506, and suitably, prior to dispersing step 502. Examples of precursor coatings that can be generated on the nanowire cores include oxides, including but not limited to, $TiO_2$, $ZrO_2$, $HfO_2$, $Nb_2O_3$, $Ta_2O_5$, $MoO_3$ and $WO_3$.

Applications of Nanowire Structures and Interconnected Nanowire Networks

Having described the formation of free-standing nanowire structures 100, and interconnected nanowire networks 300 in detail above, it will be readily apparent to one of ordinary skill in the art that such nanowires and networks can also be formed on the surface of a support. For example, the nanowires and networks can be formed on the surface of a conventional fiber network, a flat or irregular surface, or a foam structure.

Fuel Cell Applications

The nanowire structures and interconnected nanowire networks of the present invention can also be used in various fuel cell applications and configurations. For example catalysts comprising nanowires or interconnected nanowire networks and active catalytic nanoparticles dispersed on the surface of the nanowires/networks can be generated. Exemplary catalytic nanoparticles include, but are not limited to, Pt, Pd, Ru, Rh, Re, No, Fe, Co, Ag, Au, Cu, Zn and Sn, as well as metal alloy nanoparticles comprising two or more of such elements. These catalysts can be used as fuel cell cathodes, for example, a cathode comprising a nanowire or interconnected nanowire network and Pt catalytic nanoparticles with a diameter from about 2 nm to about 10 nm, or more suitably from about 3 nm to about 5 nm can be created. The catalysts can also be used as fuel cell anodes, for example, by using catalytic Pt—Ru nanoparticles on the order of about 2 nm to about 10 nm, or more suitably, from about 3 nm to about 5 nm in diameter. In exemplary anode catalysts, the Pt—Ru nanoparticles will have an atomic ratio of Pt:Ru of about 0.1 to about 20, or more suitably about 1 to about 3.

The present invention also provides membrane electrode assemblies (MEA) comprising the cathode catalysts and anode catalysts described herein, and also a membrane (e.g., a NAFION® membrane, DuPont, Wilmington, Del.). Such MEAs can be constructed using well known methods in the art, for example as set forth in U.S. Pat. Nos. 6,933,033; 6,926,985; and 6,875,537, the disclosures of each of which are incorporated herein by reference in their entireties. In exemplary embodiments, the membrane will be disposed on one side with a cathode catalyst and on the other side an anode catalyst. Fuel cells comprising such MEAs, as well as gas diffusion layers (e.g., carbon fiber cloth), bipolar plates and end plates (e.g., machined graphite or molded conducting polymer composites) can also be constructed, as is well known in the art. Exemplary fuel cells that can be constructed using the nanowires and interconnected nanowire networks disclosed herein include proexchange membrane fuel cells (PEMF) and direct methanol fuel cells (DMFC). The nanowires and interconnected nanowire networks can also be used to generate anodes and cathodes, for example for use in lithium batteries and electrochemical capacitors. The components and construction of such batteries and capacitors is well known in the art.

In one embodiment of the invention, the nanowire portion of the anode (and/or cathode) electrode of the invention may be synthesized on a growth substrate, and then transferred and incorporated into the membrane electrode assembly structure of the fuel cell. For example, in certain aspects, inorganic semiconductor or semiconductor oxide nanowires are grown on the surface of a growth substrate using a colloidal catalyst based VLS synthesis method described herein and known in the art. In accordance with this synthesis technique, the colloidal catalyst (e.g., gold, platinum etc. particles) is deposited upon the desired surface of the substrate. The substrate including the colloidal catalyst is then subjected to the synthesis process which generates nanowires attached to the surface of the substrate. Other synthetic methods include the use of thin catalyst films, e.g., 50 nm or less, deposited over the surface of the substrate. The heat of the VLS process then melts the film to form small droplets of catalyst that forms the nanowires. Typically, this latter method may be employed where fiber diameter homogeneity is less critical to the ultimate application. Typically, growth catalysts comprise metals, e.g., gold or platinum, and may be electroplated or evaporated onto the surface of the substrate or deposited in any of a number of other well known metal deposition techniques, e.g., sputtering etc. In the case of colloid deposition, the colloids are typically deposited by first treating the surface of the substrate so that the colloids adhere to the surface. Such treatments include those that have been described in detail previously, i.e., polylysine treatment, etc. The substrate with the treated surface is then immersed in a suspension of colloid.

Following growth of the nanowires, the nanowires are then harvested from their synthesis location. The free standing nanowires are then introduced into or deposited upon the relevant surface of the fuel cell component such as the bipolar plate(s) or proton exchange membrane, for example, by spray/brush painting, solution coating, casting, electrolytic deposition, filtering a fluid suspension of the nanowires, and combinations thereof. For example, such deposition may simply involve immersing the component of interest (e.g., one or more of the bipolar plates or the proton exchange membrane) into a suspension of such nanowires, or may additionally involve pre-treating all or portions of the component to functionalize the surface or surface portions for wire attachment. As described herein, the nanowires may also be introduced into a solution (e.g., methanol or water), filtered (e.g., vacuum filtered over a polyvinylidene fluoride (PVDF) membrane) to give them a dense, intertwined mat or "bird's nest structure," removed from the filter after drying and washing, and then heat treated (e.g., annealed) at high temperatures. The resulting porous sheet of nanowires (whether interconnected with nanographitic plates or note) can then be incorporated into the membrane electrode assembly of the fuel cell. A variety of other deposition methods, e.g., as described in U.S. Patent Application Publication No. 20050066883, published Mar. 31, 2005, and U.S. Pat. No. 6,962,823, the full disclosures of which are incorporated herein by reference in their entirety for all purposes, can also be used. The nanowires may also be grown directly on one or more of the fuel cell components such as one or more of the bipolar plates and/or proton exchange membrane.

Figure 6:
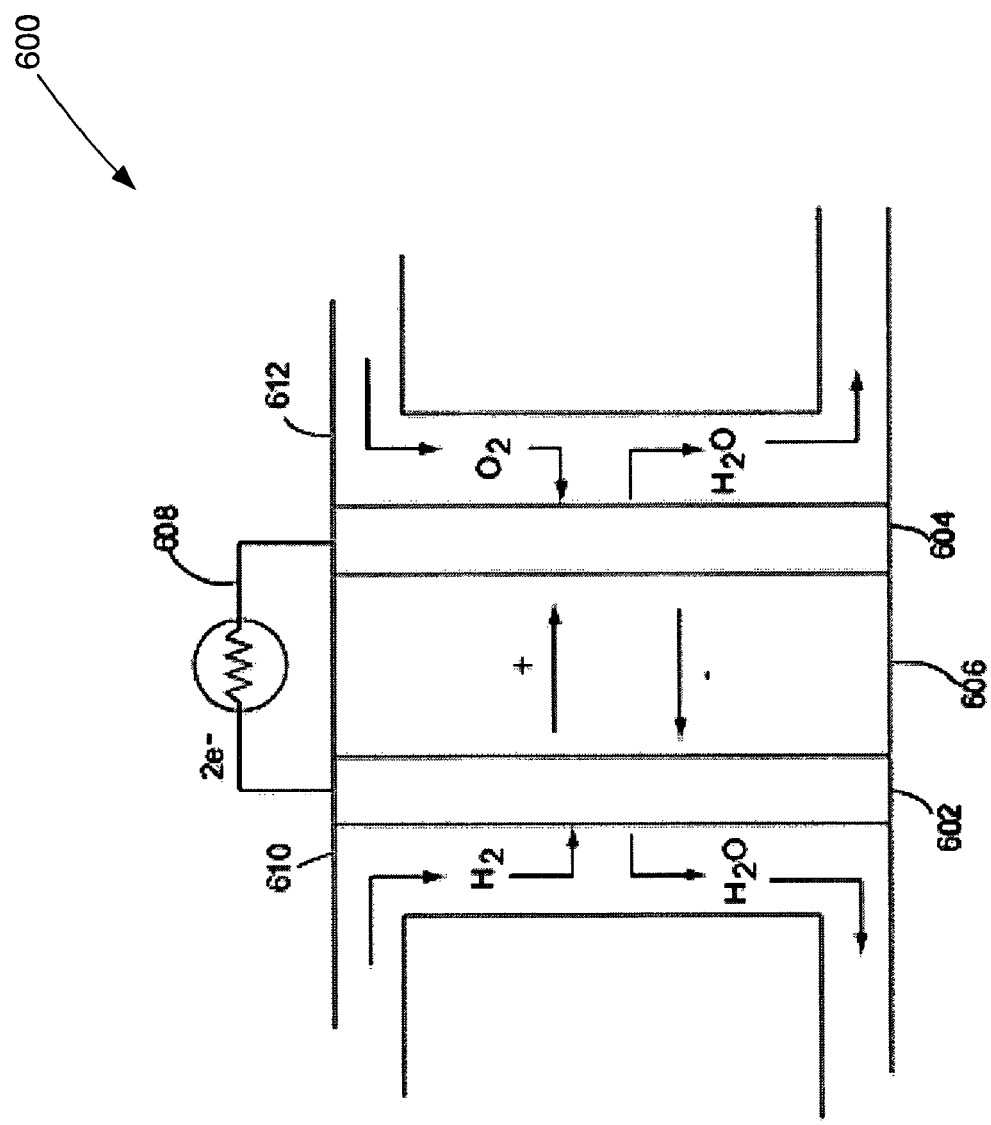
FIG. 6 is a schematic representation of a conventional electrochemical fuel cell showing exemplary reactions in the anode and the cathode electrodes.

Typically, as shown in FIG. 6, a fuel cell 600 generally comprises an anode electrode 602, a cathode electrode 604, and a proton exchange membrane (PEM) 606. The assembly of these three components is generally referred to as a membrane electrode assembly (MEA). As described previously, if methanol is used as fuel, liquid methanol ($CH_3OH$) is oxidized in the presence of water at the anode 602 generating $CO_2$, hydrogen ions and the electrons that travel through the external circuit 608 as the electric output of the fuel cell. The hydrogen ions travel through the electrolyte membrane 606 and react with oxygen from the air and the electrons from the external circuit 608 to form water at the cathode completing the circuit. Anode and cathode electrodes 602, 604 each contact bipolar plates 610, 612, respectively. The bipolar plates 610, 612 typically have channels and/or grooves in their surfaces that distribute fuel and oxidant to their respective catalyst electrodes, allow the waste, e.g., water and $CO_2$ to get out, and may also contain conduits for heat transfer. Typically, bipolar plates are highly electrically conductive and can be made from graphite, metals, conductive polymers, and alloys and composites thereof. Materials such as stainless steel, aluminum alloys, carbon and composites, with or without coatings, are good viable options for bipolar end plates in PEM fuel cells. Bipolar plates can also be formed from composite materials comprising highly-conductive or semiconducting nanowires incorporated in the composite structure (e.g., metal, conductive polymer etc.). The shape and size of the components of the fuel cell can vary over a wide range depending on the particular design.

In one embodiment of the present invention, nanowires may be deposited (e.g., grown) on one or more of the bipolar plates to provide a high surface area electrode plate with low flow resistance for methanol (or other fuel cell gas or liquid reactants) and waste products through it. A more complete description of nanowire structures having enhanced surface areas, as well as to the use of such nanowires and nanowire structures in various high surface area applications, is provided in U.S. patent application Ser. No. 10/792,402 entitled "Nanofiber Surfaces for use in Enhanced Surface Area Applications," filed Mar. 2, 2004, the entire contents of which are incorporated by reference herein.

Figure 7A:
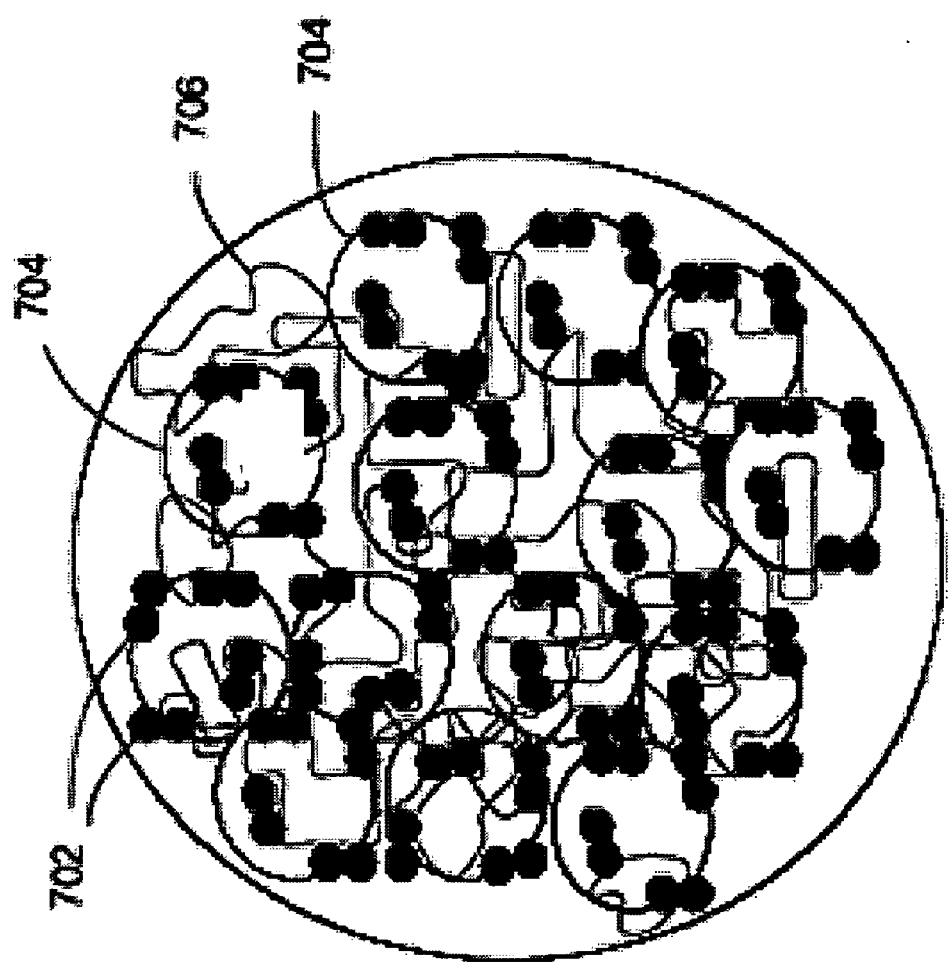
FIG. 7A is an expanded view of the anode electrode portion of the fuel cell of FIG. 6 showing details of a conventional packed particle composite catalyst structure comprising Pt/Ru nanoparticles provided on a carbon particle support.
Figure 7B:
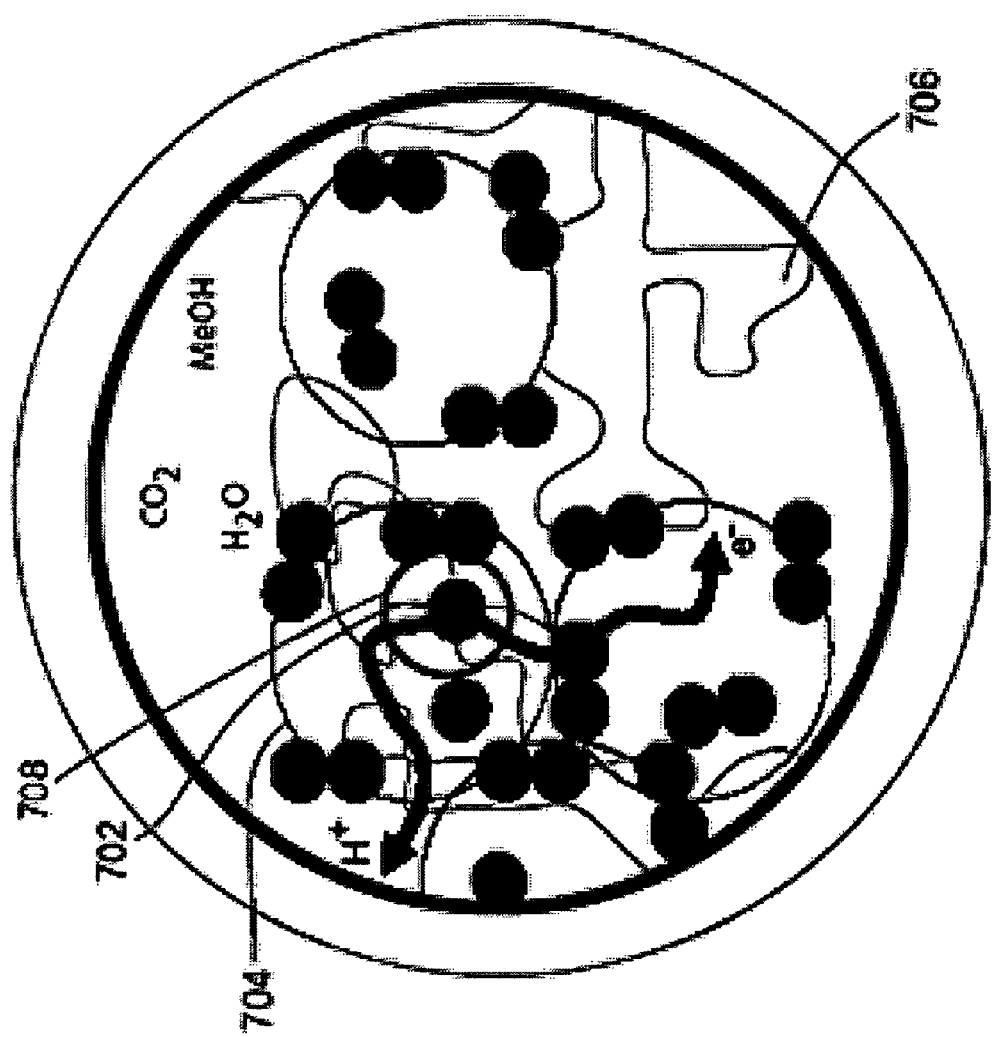
FIG. 7B is an expanded view of the packed particle composite catalyst structure of FIG. 7A showing an exemplary three-phase contact between the gaseous reactants, electrolyte, and the electrocatalyst structure.

At present, the most commonly used electrode catalyst is Pt or Pt:Ru particles 702 supported on carbon particles 704 (e.g., made from carbon black) which are dispersed in an electrolyte film 706 as shown in the expanded view of the anode 602 in FIG. 7A. One of the challenges in the commercialization of proton exchange membrane fuel cells (PEMFCs) is the high cost of the precious metals used as the catalyst (e.g., Pt or Ru). Decreasing the amount of Pt used in a PEMFC by increasing the utilization efficiency of Pt has been one of the major concerns during the past decade. To effectively utilize the Pt catalyst, the Pt should have simultaneous contact to the reactant gases (or reactant solutions or liquids), the electrolyte (e.g., proton conducting film), and the carbon particles (e.g., electron-conducting element). As shown in FIG. 7B, an effective electrode in a fuel cell requires a 4-phase-contact 708 in the catalyst layer between the reactant gases/liquid, active metal particles, carbon support 702, 704, and the electrolyte 706. A preferred catalyst layer allows the facile transport of reactant gases (e.g., methanol, $MeOH:H_2O$, hydrogen and/or oxygen), solutions, or liquids, facile transport of electrons to/from the external circuit and protons to/from the proton exchange membrane.

The carbon particles conduct electrons and the perfluorosulfonate ionomer (e.g., NAFION®) conducts protons. As noted previously, in conventional packed particle composite systems as shown in FIGS. 7A-B, there is a significant portion of Pt (or Pt:Ru) that is isolated from the external circuit and/or the PEM, resulting in a low Pt utilization. For example, current packed particle composites only utilize about 20 to 30% of the catalyst particles. The inaccessibility to some catalyst sites can be due, for example, to the fact that the necessary addition of the solubilized perfluorosulfonate ionomer (e.g., NAFION®) for proton transport tends to wash away or isolate carbon particles in the catalyst layer, leading to poor electron transport. Thus, most DMFCs which utilize packed particle composite structures are highly inefficient.

Due to their unique structural, mechanical, and electrical properties, the inventors of the present application have discovered that nanowires can be used to replace traditional carbon particles in PEMFCs as the catalyst support and electron conducting medium to make MEAs. Because the generation of surface functional groups on nanowires, e.g., nanowires such as SiC or GaN, is relatively straightforward, catalyst nanoparticles such as Pt and/or Pt:Ru (as well as a proton conducting polymer (e.g., NAFION®)), can be facilely deposited on the nanowires, e.g., without agglomeration of the particles. Each catalyst particle is then directly connected to the anode (and cathode) through the nanowire core. The multiple electrical connectivity of the interconnected nanowires secures the electronic route from Pt to the electron conducting layer. The use of nanowires and the resulting guaranteed electronic pathway eliminate the previously mentioned problem with conventional PEMFC strategies where the proton conducting medium (e.g., NAFION®) would isolate the carbon particles in the electrode layer. Eliminating the isolation of the carbon particles supporting the electrode layer improves the utilization rate of Pt.

Figure 8A:
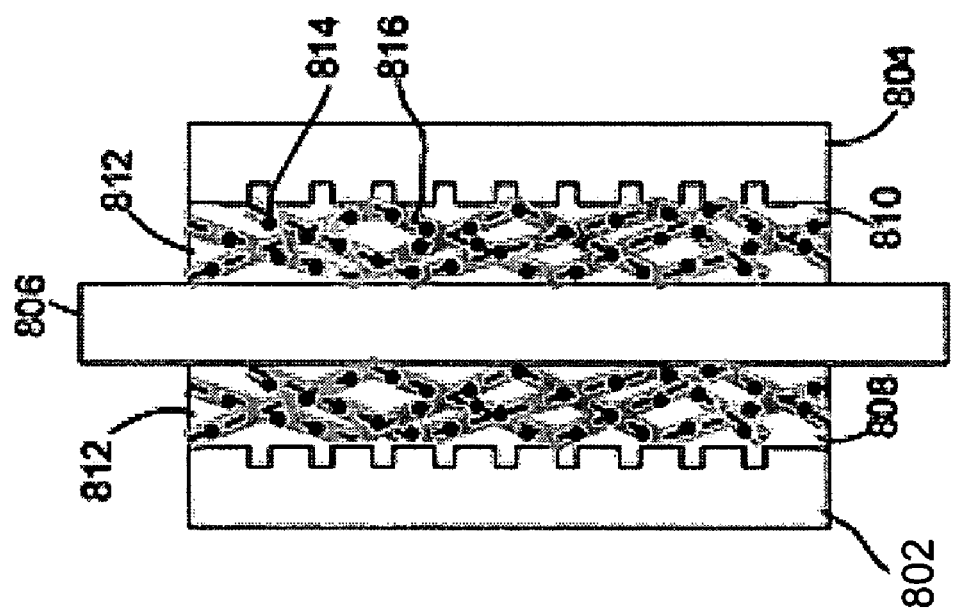
FIG. 8A is a schematic representation of a nanowire-based electrochemical fuel cell made according to the teachings of the present invention.
Figure 8B:
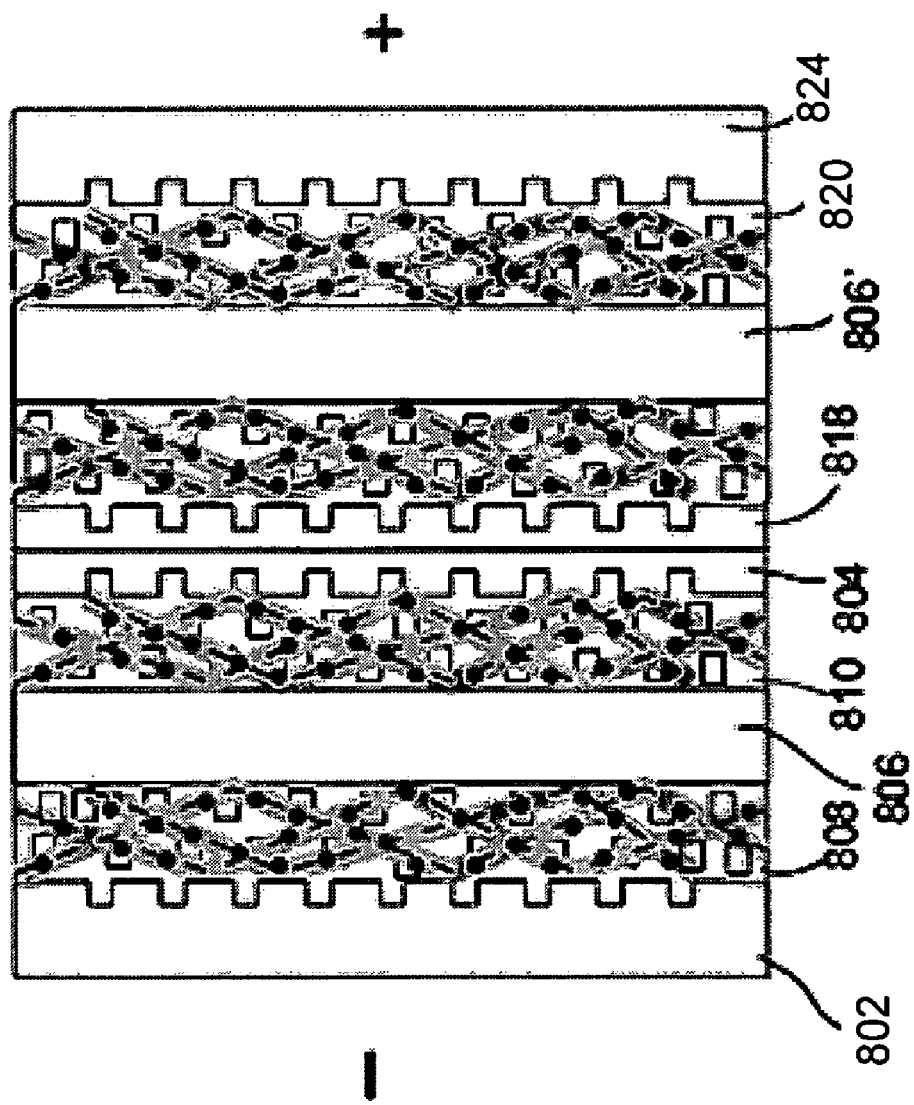
FIG. 8B is a schematic representation of a nanowire-based electrochemical fuel cell stack made according to the teachings of the present invention.

As shown now with reference to FIG. 8A, a nanowire-based fuel cell is shown which includes an anode bipolar electrode plate 802, a cathode bipolar electrode plate 804, a proton exchange membrane 806, an anode electrode 808, a cathode electrode 810, and an interconnecting network of nanowires 812 positioned between both the anode electrode 808 and cathode electrode 810 on one side, and the proton exchange membrane 806 on the other side of the fuel cell. Generally, a plurality of fuel cells or MEAs as shown in FIG. 8A can be combined to form a fuel cell stack as shown, for example, in FIG. 8B having separate anode electrodes 808, 820 and cathode electrodes 810, 822 separated by respective proton exchange membranes 806 and 806', respectively. The cells within the stacks are connected in series by virtue of the bipolar plates 802, 804, 818, and 824 such that the voltages of the individual fuel cells are additive.

Figure 9A:
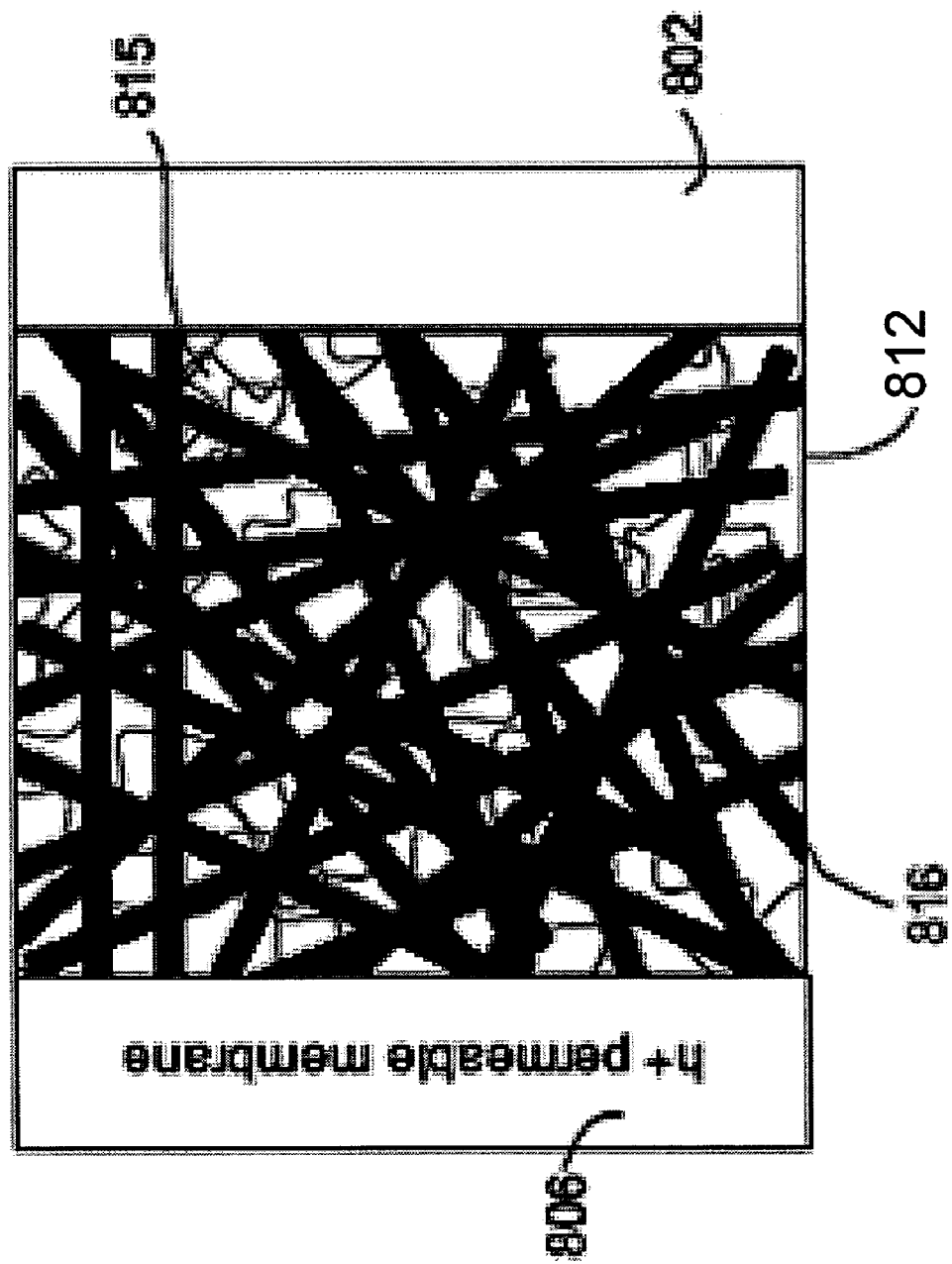
FIG. 9A is an expanded view of the anode electrode portion of the fuel cell of FIG. 8A showing details of an embodiment of an interconnected network of catalyst supported nanowires which span the junction between the proton exchange membrane and anode electrode of the fuel cell of FIG. 8A.
Figure 10:
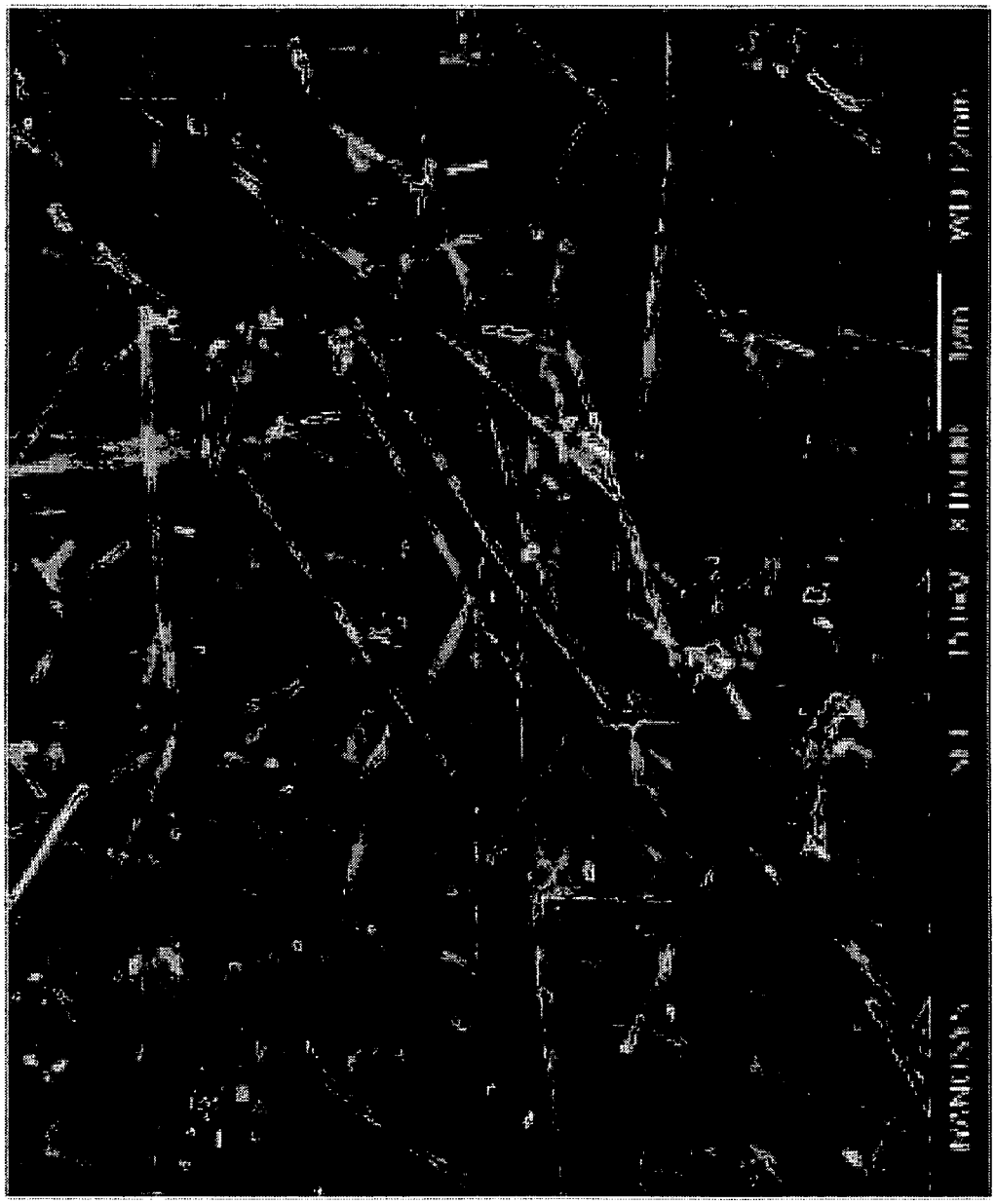
FIG. 10 is a SEM image of an interconnected network of nanowires used as the catalyst support in an anode (and/or cathode) electrode of a fuel cell made according to the teachings of the present invention.

As shown in FIGS. 8A, 9A and in the SEM image of FIG. 10, the nanowires 816 in the nanowire networks 812 each are physically and/or electrically connected to one or more other wires in the network to form an open, highly branched, porous, intertwined structure, with low overall diffusion resistance for reactants and waste diffusion, high structural stability and high electrical connectivity for the electrons to ensure high catalytic efficiency, thus leading to high power density and lower overall cost. It is important to note that even if two wires are not in actual direct physical contact with each other (or with a catalyst particle), it is possible that at some small distance apart, they may still be able to transfer charges (e.g., be in electrical contact). Preferentially, each nanowire is physically and/or electrically connected to at least one or more other nanowires in the network. The multiple connectivity of the nanowires ensures that if one wire breaks or is damaged in the system, for example, that all points along the wire still connect to the anode (and cathode) electrode along different paths (e.g., via other nanowires in the network). This provides substantially improved electrical connectivity and stability as compared to previous packed particle composite structures. The wires may extend all the way (or only part way) between the anode (and cathode) bipolar plate and the proton exchange membrane. In the case where the wires do not extend all the way between a bipolar plate and the membrane, the wires may extend from the bipolar plate toward the membrane, but not reach the membrane, and the polymer electrolyte can extend from the membrane toward the bipolar plate, but not reach the bipolar plate (but not the other way around) to ensure that electrons are efficiently transferred to the anode, and protons are transferred towards the cathode.

Figure 11:
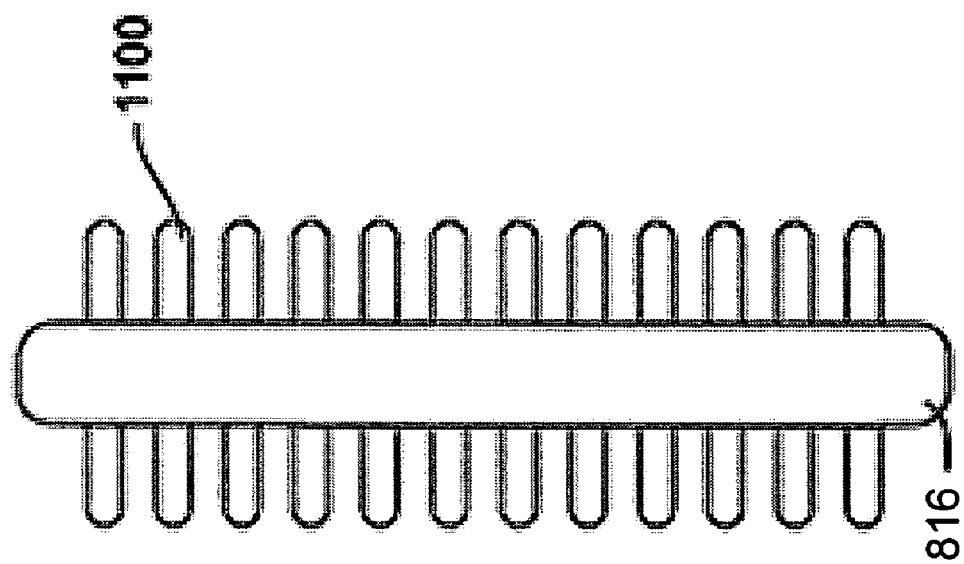
FIG. 11 is a schematic representation of a branched nanowire structure that can be used in practicing the methods of the present invention.
Figure 12:
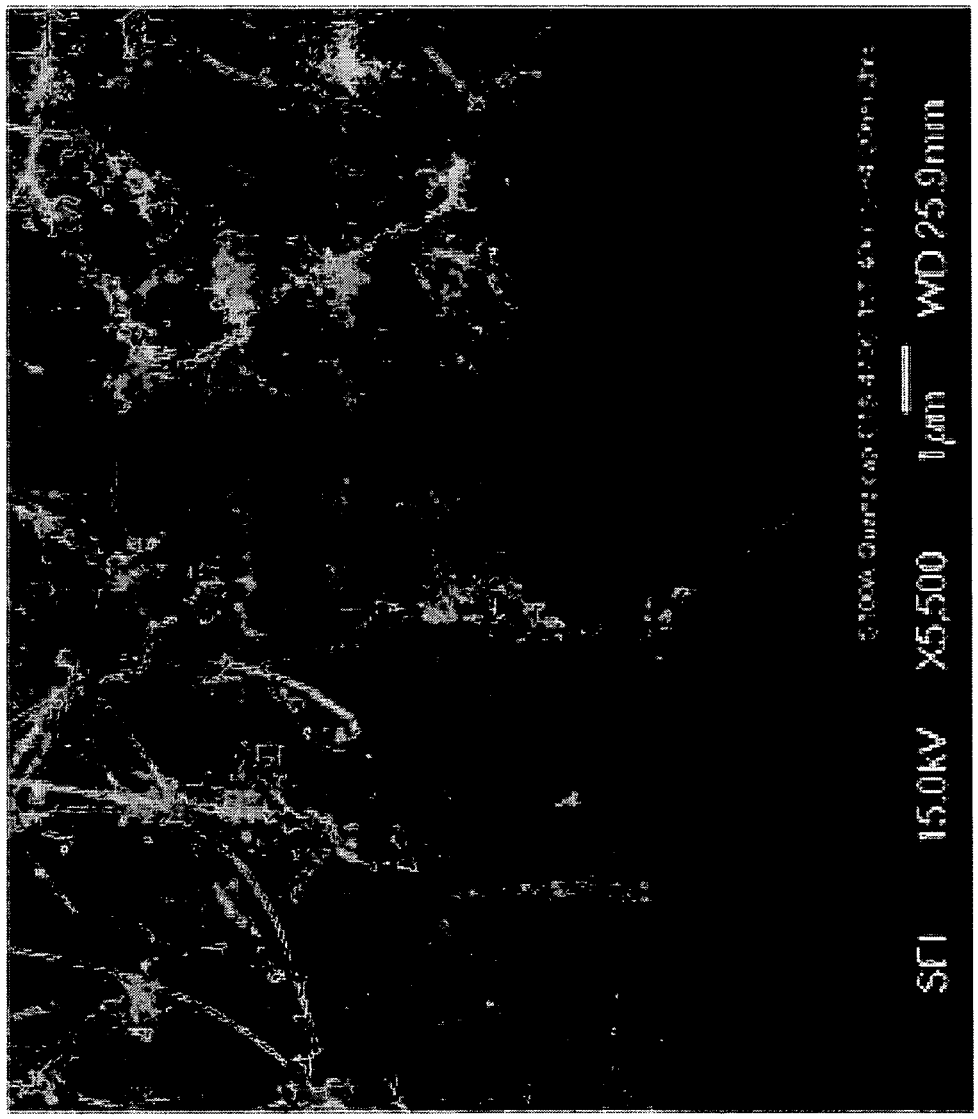
FIG. 12 is an SEM image of a branched nanowire network including a plurality of branched nanowires having tiny nodules extending from the side surfaces of the nanowires.

The nanowires in the nanowire network may optionally have a branched structure and include a plurality of nodules 1100 which extend from side surfaces of the nanowire as shown in FIG. 11 and in the SEM image of FIG. 12. The nodules 1100 on the sides of the nanowire core can further increase available surface area for catalysis without substantially impacting the connectivity or porosity of the nanowire network.

The nanowires 816 are dispersed in a polymer electrolyte material 815 (e.g., see FIG. 9A) which coats the surface of nanowires in the branched nanowire network to provide sufficient contact points for proton (e.g., H+) transport. Polymer electrolytes can be made from a variety of polymers including, for example, polyethylene oxide, poly (ethylene succinate), poly (β-propiolactone), and sulfonated fluoropolymers such as NAFION® (commercially available from DuPont Chemicals, Wilmington). A suitable cation exchange membrane is described in U.S. Pat. No. 5,399,184, for example, the disclosure of which is incorporated herein by reference. Alternatively, the proton conductive membrane can be an expanded membrane with a porous microstructure where an ion exchange material impregnates the membrane effectively filling the interior volume of the membrane. U.S. Pat. No. 5,635,041, incorporated herein by reference, describes such a membrane formed from expanded polytetrafluoroethylene (PTFE). The expanded PTFE membrane has a microstructure of nodes interconnected by fibrils. Similar structures are described in U.S. Pat. No. 4,849,311, the disclosure of which is incorporated herein by reference.

The porous structure of the interconnected nanowire network provides an open (non-tortuous) diffusion path for fuel cell reactants to the catalyst (e.g., catalyst particles 814) deposited on the nanowires 816. The void spaces between the interconnected nanowires form a highly porous structure. The effective pore size will generally depend upon the density of the nanowire population, as well as the thickness of electrolyte layer, and to some extent, the width of the nanowires used. All of these parameters are readily varied to yield a nanowire network having a desired effective porosity. For example, preferred nanowire networks have a porosity adequate to provide for an even flow of reactants while maintaining adequate electrical conductivity and mechanical strength. Also, the porosity of the nanowire network provides for water management within the cell. The branched nanowire network preferably is sufficiently porous to pass fuel gases and water vapor through it without providing a site for water condensation that would block the pores of the network and prevent vapor transport. The mean pore size generally ranges from about 0.002 microns to about 10.0 microns, e.g., less than about 1 μm, e.g., less than about 0.2 μm, e.g., less than about 0.02 μm, e.g., between about 0.002 μm and 0.02 μm, e.g., between about 0.005 and 0.01 μm. The total porosity of the branched nanowire structure may be easily controlled between about 30% to 95%, for example, e.g., between about 40% to 60%, while still ensuring electrical connectivity to the anode and cathode electrodes.

Figure 13:
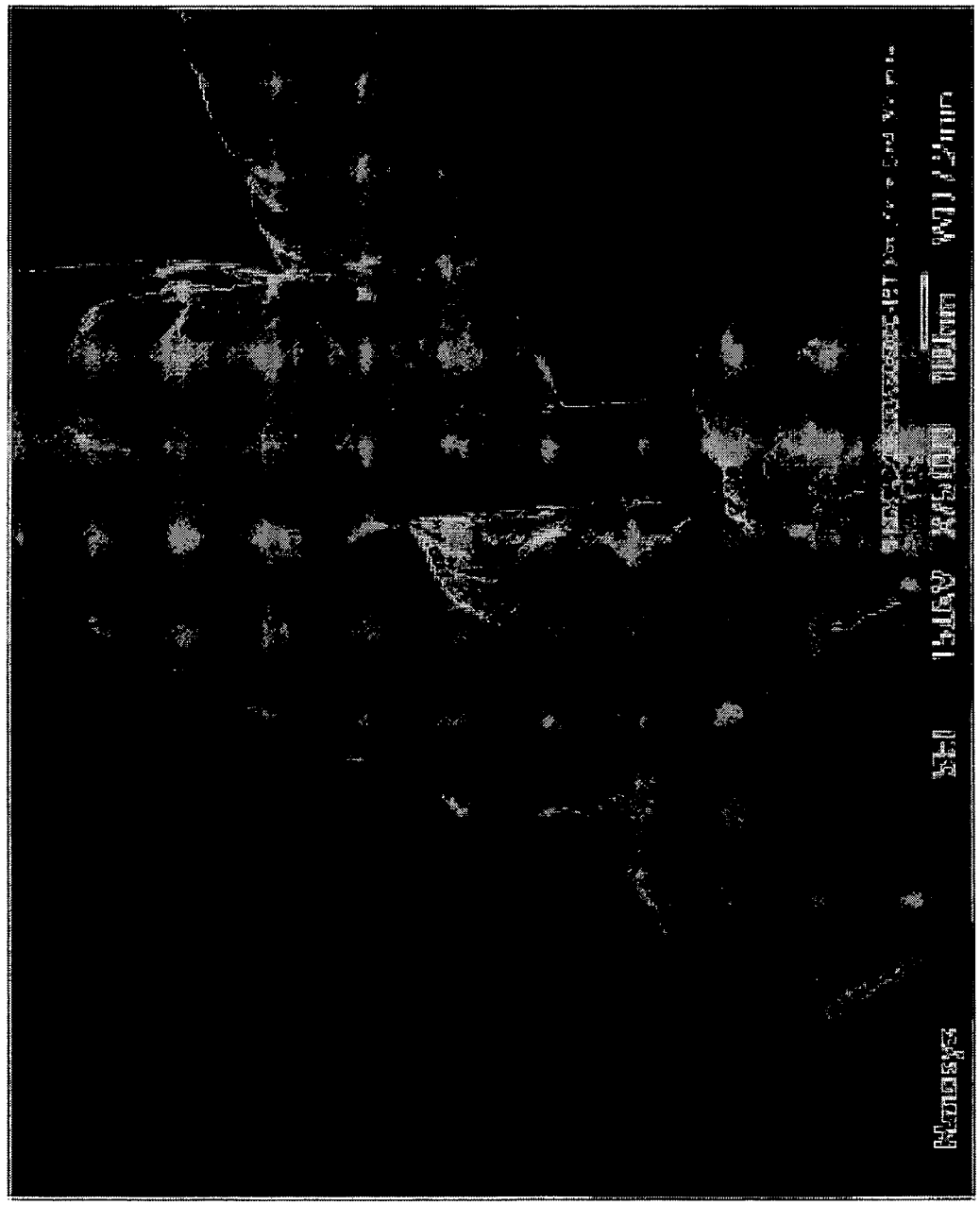
FIG. 13 is an SEM image at high magnification of crosslinked or fused nanowires creating an interconnecting nanowire network as used in certain aspects of the present invention.

The nanowires 816 which form the interconnected nanowire networks 812 may optionally be fused or cross-linked at the points where the various wires contact each other, to create a more stable, robust and potentially rigid membrane electrode assembly. The nanowires may also include surface chemical groups that may form chemical cross-links in order to cross-link the underlying nanowires. For example, the nanowires may be cross-linked or fused together by depositing a small amount of conducting or semiconducting material at their cross-points. For example, SiC nanowires (or, e.g., carbon nanotube nanowires having a SiC shell layer) can be cross-linked by depositing amorphous or polycrystalline SiC at their cross-points. FIG. 13 is an SEM micrograph showing a plurality of silicon nanowires which have been fused together using deposited polysilicon at their cross-points. One of skill in the art will appreciate that other metals, semimetals, semiconductors, and semiconductor oxides could also be used to cross-link these intersections.

Figure 9B:
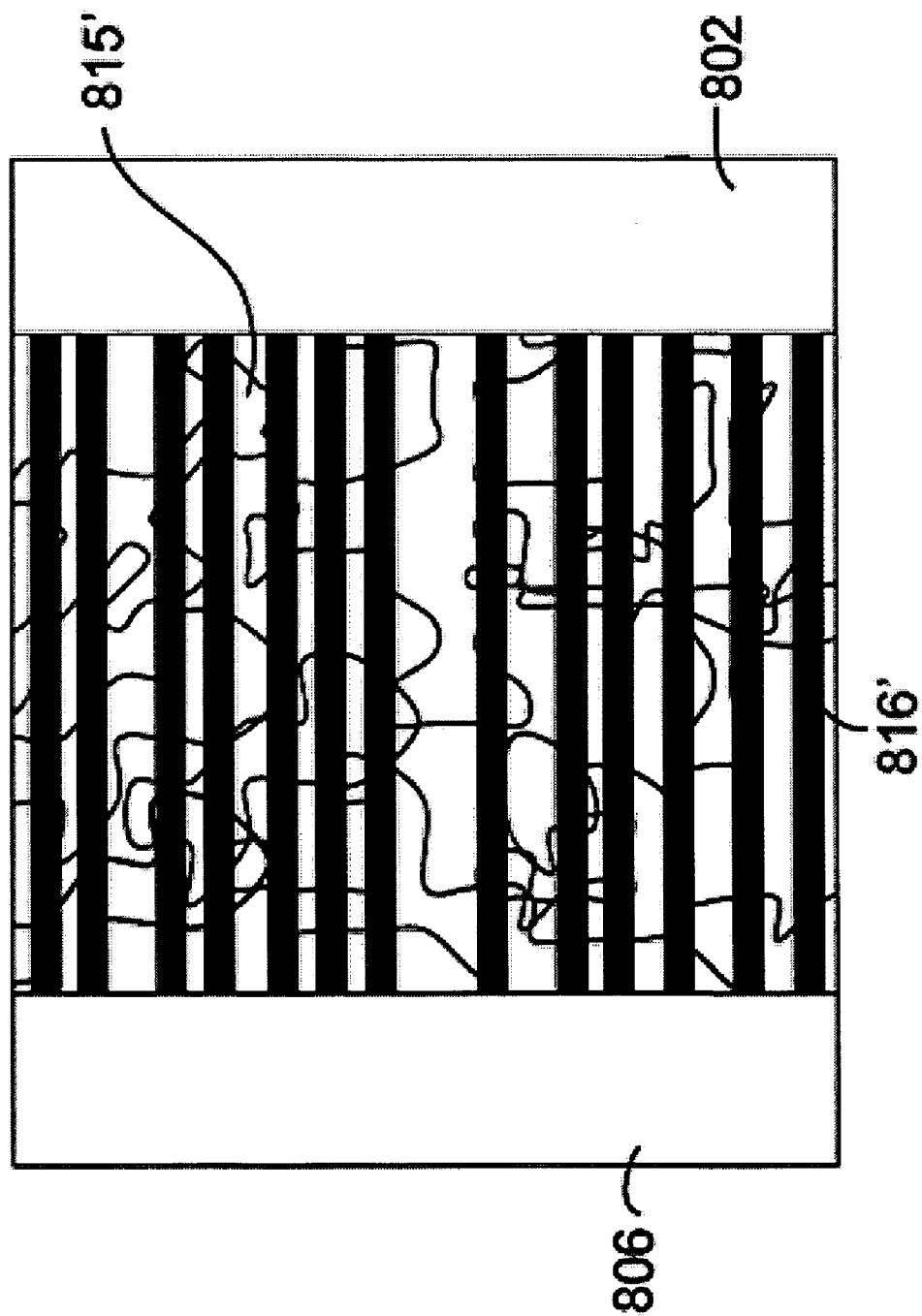
FIG. 9B is an expanded view of an alternative embodiment for a nanowire-based anode portion of a fuel cell showing details of a parallel array of catalyst supported nanowires which span the junction between the proton exchange membrane and the anode electrode of the fuel cell of FIG. 8A.

In another aspect of the present invention, shown with reference to FIG. 9B, nanowires 816' may be provided as a parallel array of aligned wires having electrolyte 815' interspersed between the free spaces between the aligned wires. In this particular implementation of the present invention, the parallel array of nanowires is preferably synthesized in situ, e.g., on the surface of the bipolar electrode plate(s) 802 and/or 804 (and/or the proton exchange membrane 806). It is to be understood that the randomly oriented, interconnected network 812 of wires 816 shown in FIGS. 8A, 9A and 10 and described above can also be grown in situ directly on the bipolar plates 802, 804 (and/or proton exchange membrane) using the techniques described herein. For example, inorganic semiconductor or semiconductor oxide nanowires may be grown directly on the surface of the electrode plate using a colloidal catalyst based VLS synthesis method described herein. In accordance with this synthesis technique, the colloidal catalyst is deposited upon the desired surface of the bipolar plate. The bipolar plate including the colloidal catalyst is then subjected to the synthesis process which generates nanowires attached to the surface of the plate. Other synthetic methods include the use of thin catalyst films, e.g., 50 nm or less, deposited over the surface of the bipolar plate. The heat of the VLS process then melts the film to form small droplets of catalyst that forms the nanowires. Typically, this latter method may be employed where wire diameter homogeneity is less critical to the ultimate application. Typically, catalysts comprise metals, e.g., gold or platinum, and may be electroplated or evaporated onto the surface of the electrode plate or deposited in any of a number of other well known metal deposition techniques, e.g., sputtering etc. In the case of colloid deposition the colloids are typically deposited by first treating the surface of the electrode plate so that the colloids adhere to the surface. The plate with the treated surface is then immersed in a suspension of colloid.

In another aspect of the invention, the anode electrode 808 (and cathode electrode 810) may include a conductive grid or mesh made from any of a variety of solid or semisolid materials such as organic materials, e.g., conductive polymers, carbon sheets, etc., inorganic materials, e.g., semiconductors, metals such as gold, semimetals, as well as composites of any or all of these, upon which the nanowires 816 may be attached, but through which apertures exist. Such meshes provide relatively consistent surfaces in a ready available commercial format with well defined screen/pore and wire sizes. A wide variety of metal meshes are readily commercially available in a variety of such screen/pore and wire sizes. Alternatively, metal substrates may be provided as perforated plates, e.g., solid metal sheets through which apertures have been fabricated. Fabricating apertures in metal plates may be accomplished by any of a number of means. For example relatively small apertures, e.g., less than 100 µm in diameter, may be fabricated using lithographic and preferably photolithographic techniques. Similarly, such apertures may be fabricated using laser based techniques, e.g., ablation, laser drilling, etc. For larger apertures, e.g., greater than 50-100 µm, more conventional metal fabrication techniques may be employed, e.g., stamping, drilling or the like. As formed, the metal grids or meshes with the nanowires formed or deposited thereon by the methods disclosed herein may be deposited on the proton exchange membrane, bipolar plate(s), and or embedded within one or more of the electrode layers to provide a porous network with a high surface area nanowire catalyst support attached thereto for efficient catalysis. Other examples of a variety of grids or meshes with nanowires deposited thereon which can be used in the present invention are fully disclosed in U.S. patent application Ser. No. 10/941, 746, entitled "Porous Substrates, Articles, Systems and Compositions Comprising Nanofibers and Methods of Their Use and Production," filed on Sep. 15, 2004, the entire disclosure of which is incorporated by reference herein.

The nanowire network thus formed by any of the methods described herein is employed as the support for the subsequent metal (e.g., platinum, ruthenium, gold, or other metal) catalyst, which may be coated or deposited, for example, on the nanowires. See e.g., FIG. 14. Appropriate catalysts for fuel cells generally depend on the reactants selected. For example, the metallic catalyst (also called catalyst metals throughout) may be selected from the group comprising, but not limited to, one or more of platinum (Pt), ruthenium (Ru), iron (Fe), cobalt (Co), gold (Au), chromium (Cr), molybdenum (Mo), tungsten (W), manganese (Mn), technetium (Tc), rhenium (Re), osmium (Os), rhodium (Rh), iridium (Ir), nickel (Ni), palladium (Pd), copper (Cu), silver (Ag), zinc (Zn), tin (Sn), aluminum (Al), and combinations and alloys thereof (such as bimetallic Pt:Ru nanoparticles). Suitable catalyst materials for oxidation of hydrogen or methanol fuels specifically include metals such as, for example, Pd, Pt, Ru, Rh and alloys thereof.

Figures 15A, 15B:
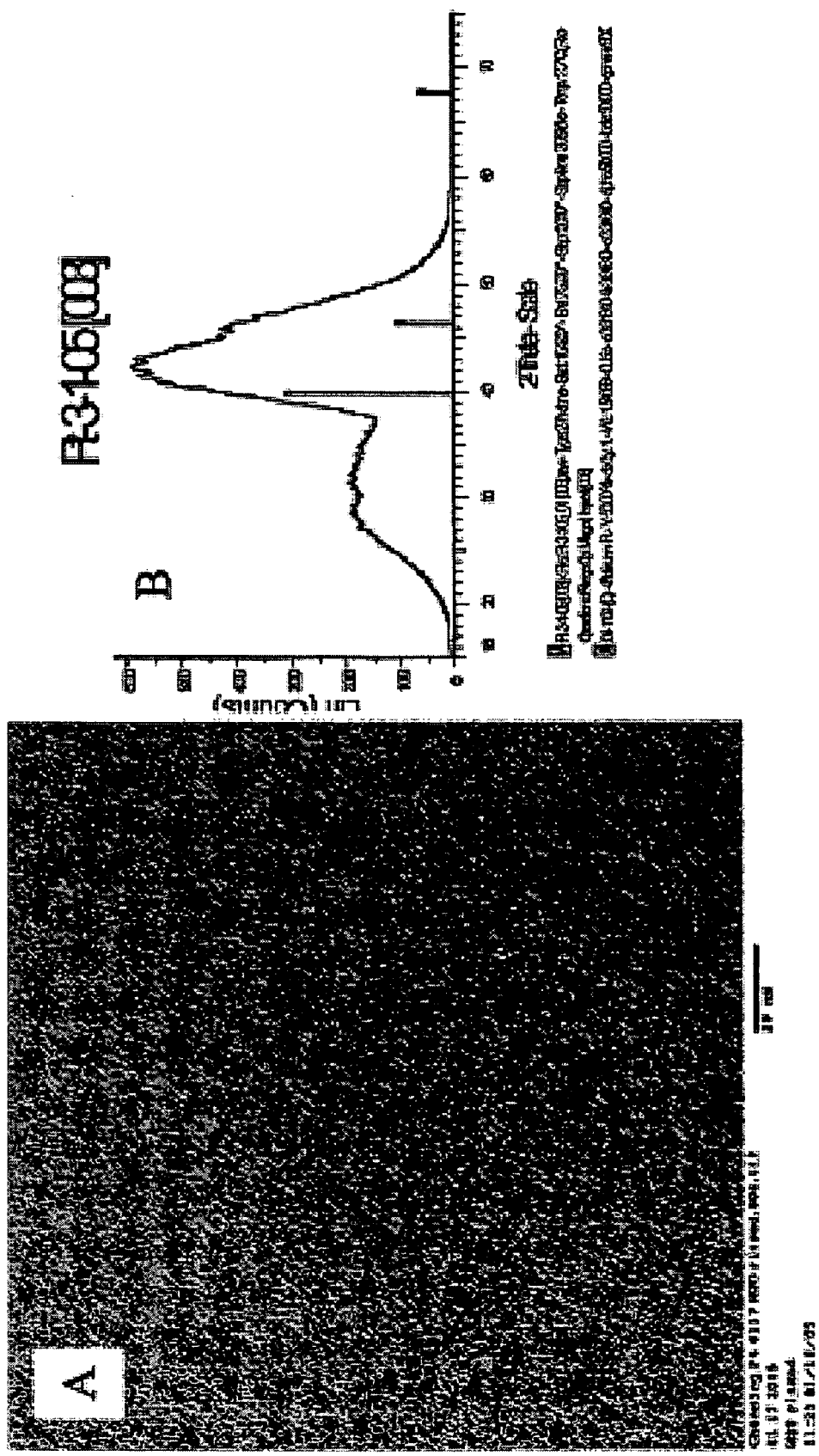
FIG. 15A shows a TEM of Pt nanoparticles, average diameter 1.61±0.31 nm, in accordance with one embodiment of the present invention.
FIG. 15B shows an X-ray diffraction pattern of these Pt nanoparticles.

FIG. 15A shows a transmission electron micrograph (TEM) of platinum (Pt) nanoparticles having an average diameter of about 1.61±0.31 nm and prepared in accordance with the present invention. FIG. 15B shows an X-ray diffraction pattern of these nanoparticles. The X-ray diffraction shows a characteristic peak at a value of 45° on the 2-theta scale indicating that the nanoparticles are crystallized platinum metal.

Figures 16A, 16B:
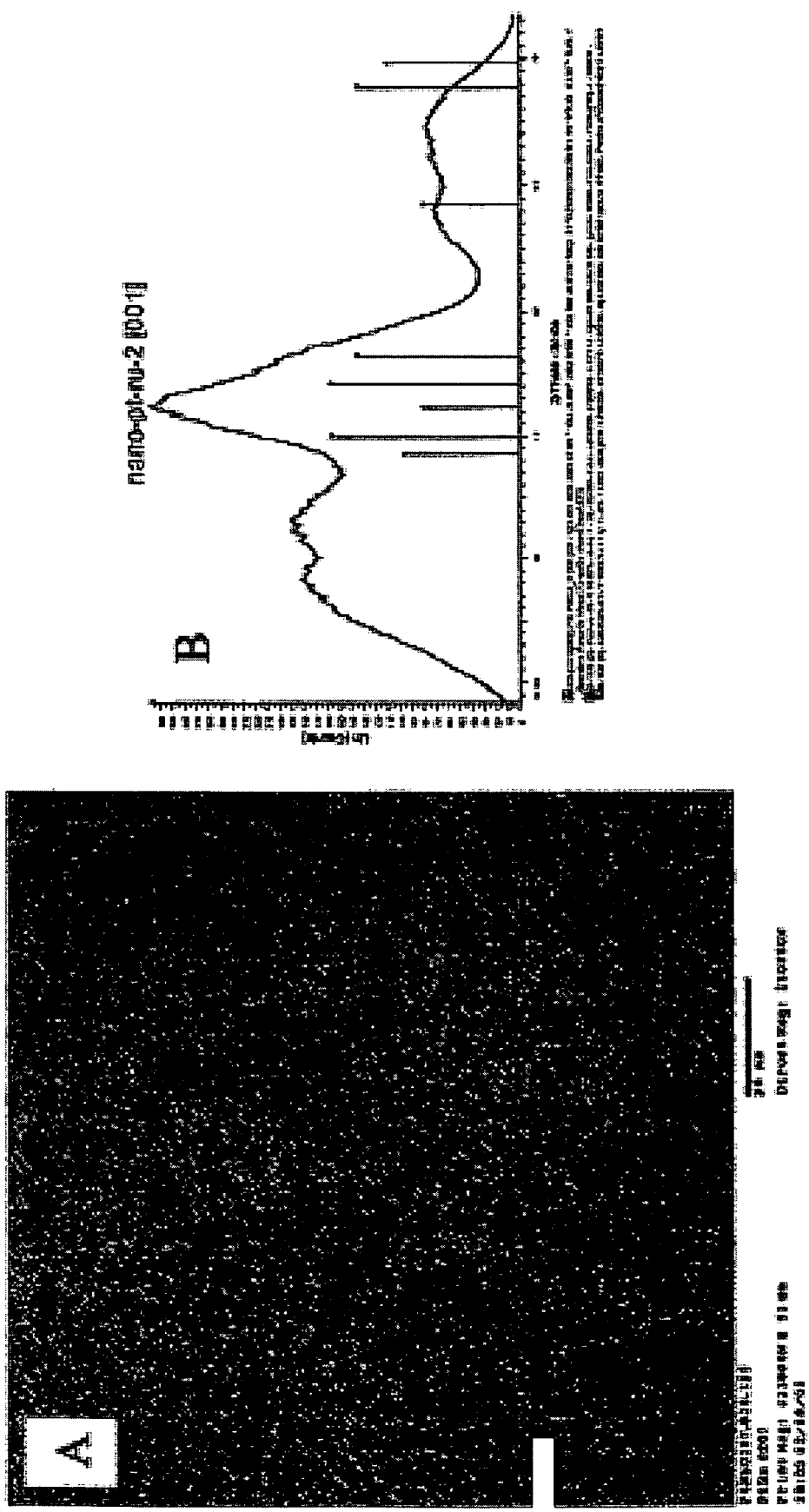
FIG. 16A shows a TEM of Pt—Ru alloy nanoparticles, 1.66±0.33 nm, in accordance with one embodiment of the present invention.
FIG. 16B shows an X-ray diffraction pattern of these Pt—Ru alloy nanoparticles.

FIG. 16A shows a TEM of platinum-ruthenium (Pt—Ru) alloy nanoparticles having an average diameter of about 1.66±0.33 nm and prepared in accordance with the present invention. The X-ray diffraction in FIG. 16B shows a peak at a value of 45° on the 2-theta scale indicating that the nanoparticles are crystallized Pt—Ru alloy.

The metal catalyst may be deposited or otherwise associated with the nanowire surface as a thin film (e.g., less than about 10 angstroms in thickness) (or a series of catalyst particles) using a variety of catalyst deposition techniques including, for example, chemical vapor deposition, electrochemical deposition (e.g., electroplating or electroless chemical plating), physical vapor deposition, solution impregnation and precipitation, colloid particle absorption and deposition, atomic layer deposition, and combinations thereof. The amount of the catalyst metal coated by the methods described herein is preferably in the range of about 0.5%-85% by weight, suitably about 10%-85%, more suitably about 20-40% by weight, based on the total amount of catalyst metal and nanowire material.

Alternatively, in one embodiment, as shown with reference to FIGS. 8A and 9A-B, the catalyst may be deposited on the nanowire surface plurality of nanometer-sized metallic catalyst particles 814 (e.g., between about 1 and 50 nm in diameter, e.g., less than about 10 nm in diameter, e.g., between about 1 and 5 nm in diameter), in solution. By derivatizing the nanowire external surface with one or more functional linker moieties (e.g., a chemically reactive group) such as one or more carboxylic acid groups, nitric acid groups, hydroxyl groups, amine groups, sulfonic acid groups, and the like, the nanoparticles bind to the surface of the nanowires. The catalysts particles (or film) can be attached to the wires either uniformly or non-uniformly. The catalyst particles can be spherical, semi-spherical or non-spherical. The catalyst particles can form islands on the surface of the nanowires or can form a continuous coating on the surface of the nanowire such as in a core-shell arrangement, or stripes or rings along the length of the nanowire, etc. The catalyst particles may be attached to the nanowire surface before or after the nanowire network is incorporated/deposited into the MEA of the fuel cell. In one embodiment, the catalyst particles may be selected from a population of catalyst particles having a uniform size distribution of less than about 50%, for example, less than about 30%, for example, less than about 20%.

Figure 17:
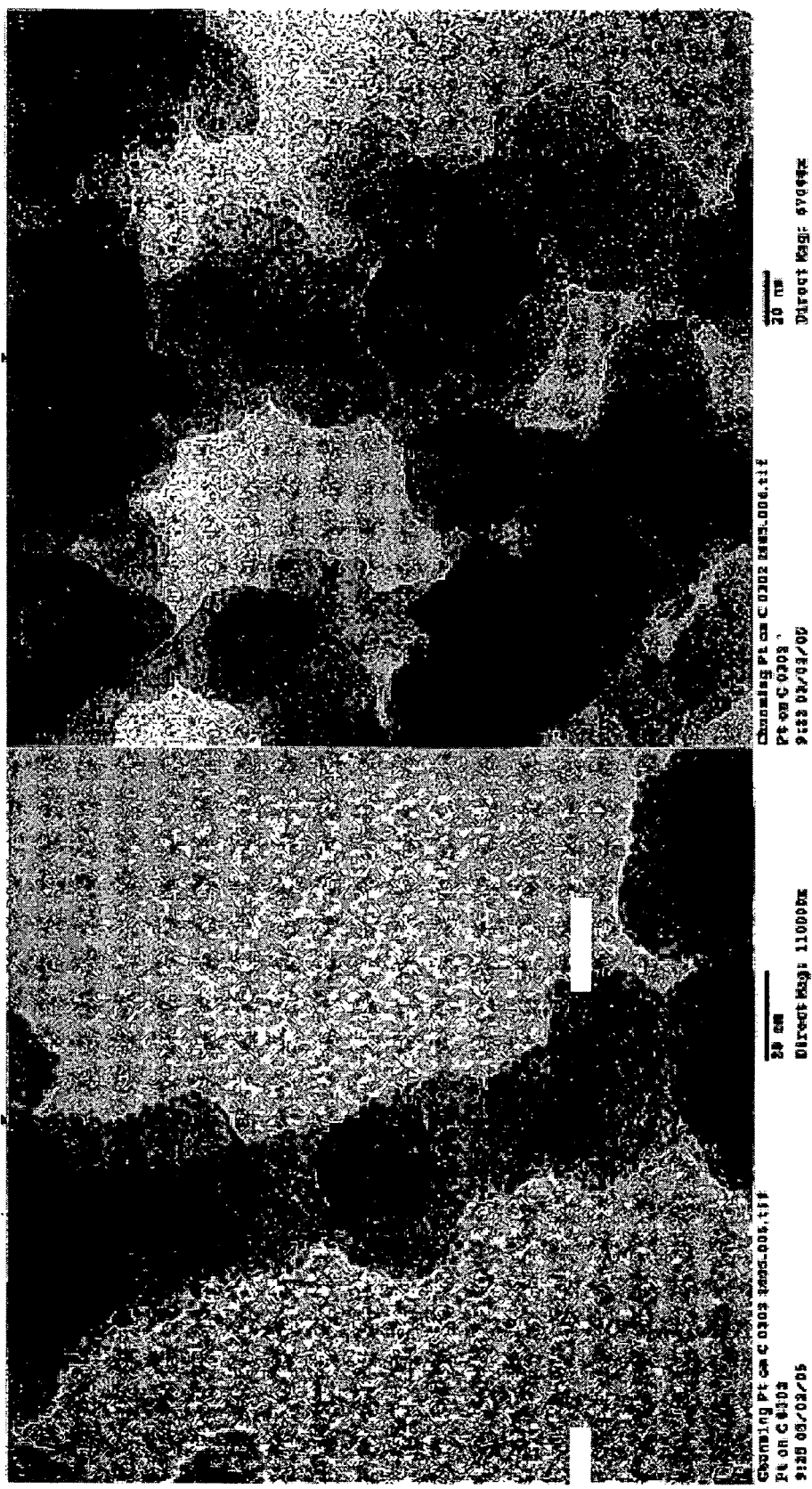
FIG. 17 shows TEM images of Pt—Ru alloy nanoparticles supported on the surface of carbon-black Cabot VULCAN® XC72 at two different magnifications.

FIG. 17 shows two TEM images (110,000 times magnification (left image) and 67,044 times magnification (right image)) of Pt—Ru alloy nanoparticles supported on the surface of carbon black-Cabot VULCAN® XC72, showing uniform distribution of the nanoparticles on the surface of carbon black without any observable agglomeration. Measurement of amount deposited on the carbon black versus amount of alloy added to the surface indicated a loading efficiency of about 24.3% of Pt—Ru alloy.

Figure 18:
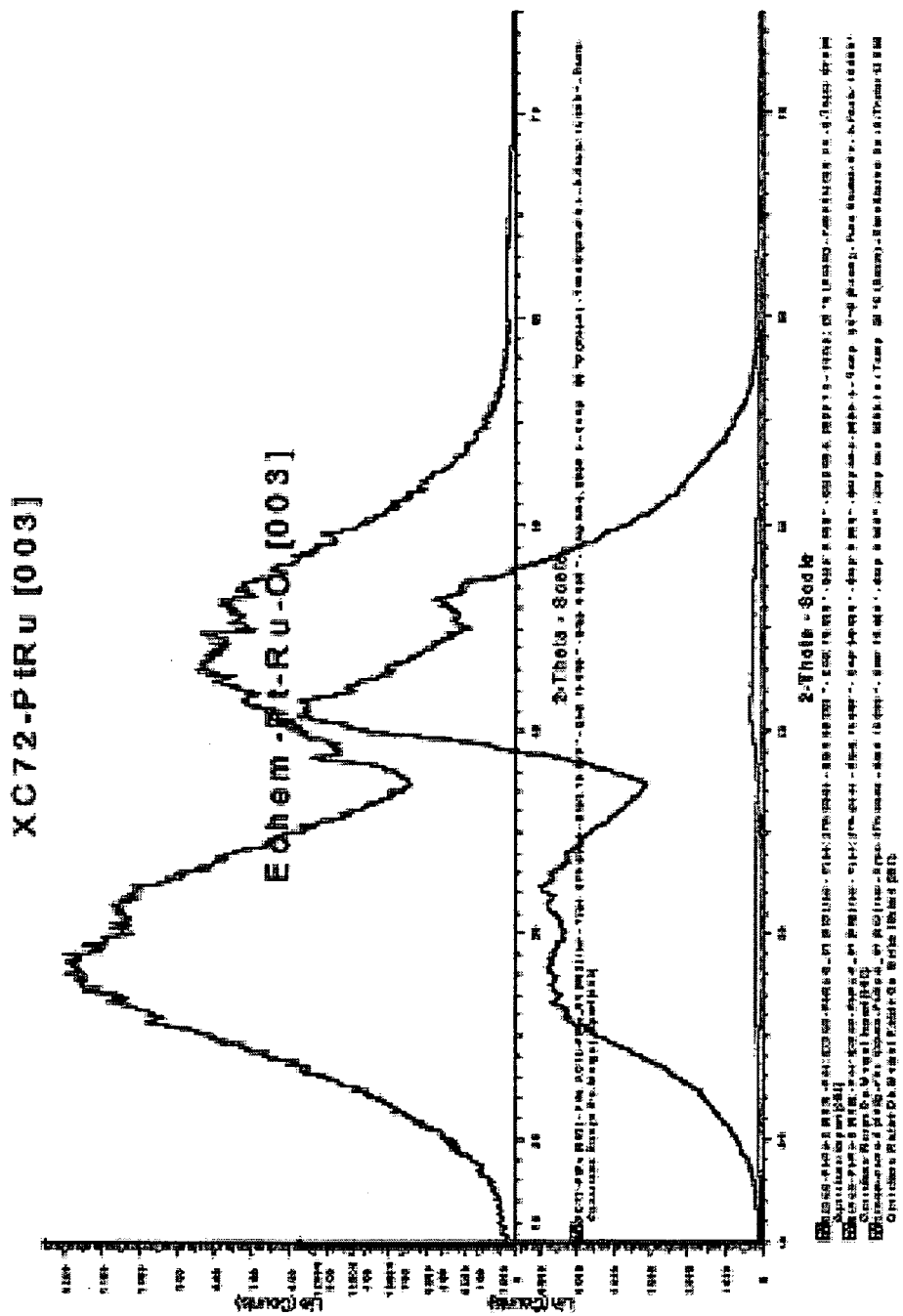
FIG. 18 shows X-ray diffraction patterns recorded from carbon-supported Pt—Ru catalyst of the present invention (top curve) and a commercially available Pt—Ru catalyst (bottom curve).
Figure 19:
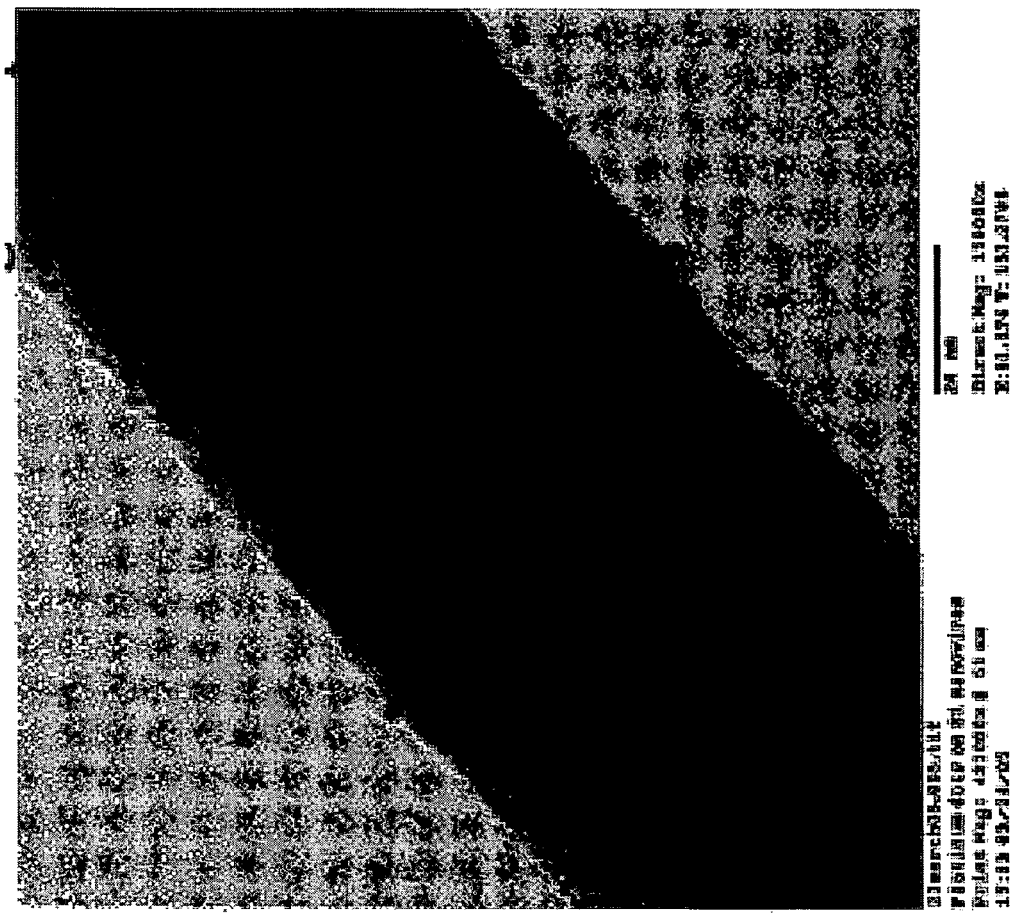
FIG. 19 shows a TEM image of Pt nanoparticles deposited on a nanowire in accordance with one embodiment of the present invention.

FIG. 18 shows an X-ray diffraction pattern recorded from carbon-supported Pt—Ru catalysts prepared in accordance with the present invention (top curve) as compared to a commercially available Pt—Ru catalysts (bottom curve). The lower relative intensity and higher 2-theta position of the catalyst of the present invention (i.e., near 45°, versus near 40° for commercial catalysts) were due to the smaller diameter of the fabricated nanoparticles. FIG. 19 represents a TEM of Pt nanoparticles prepared by the methods of the present invention deposited on Si nanowires.

Figure 20:
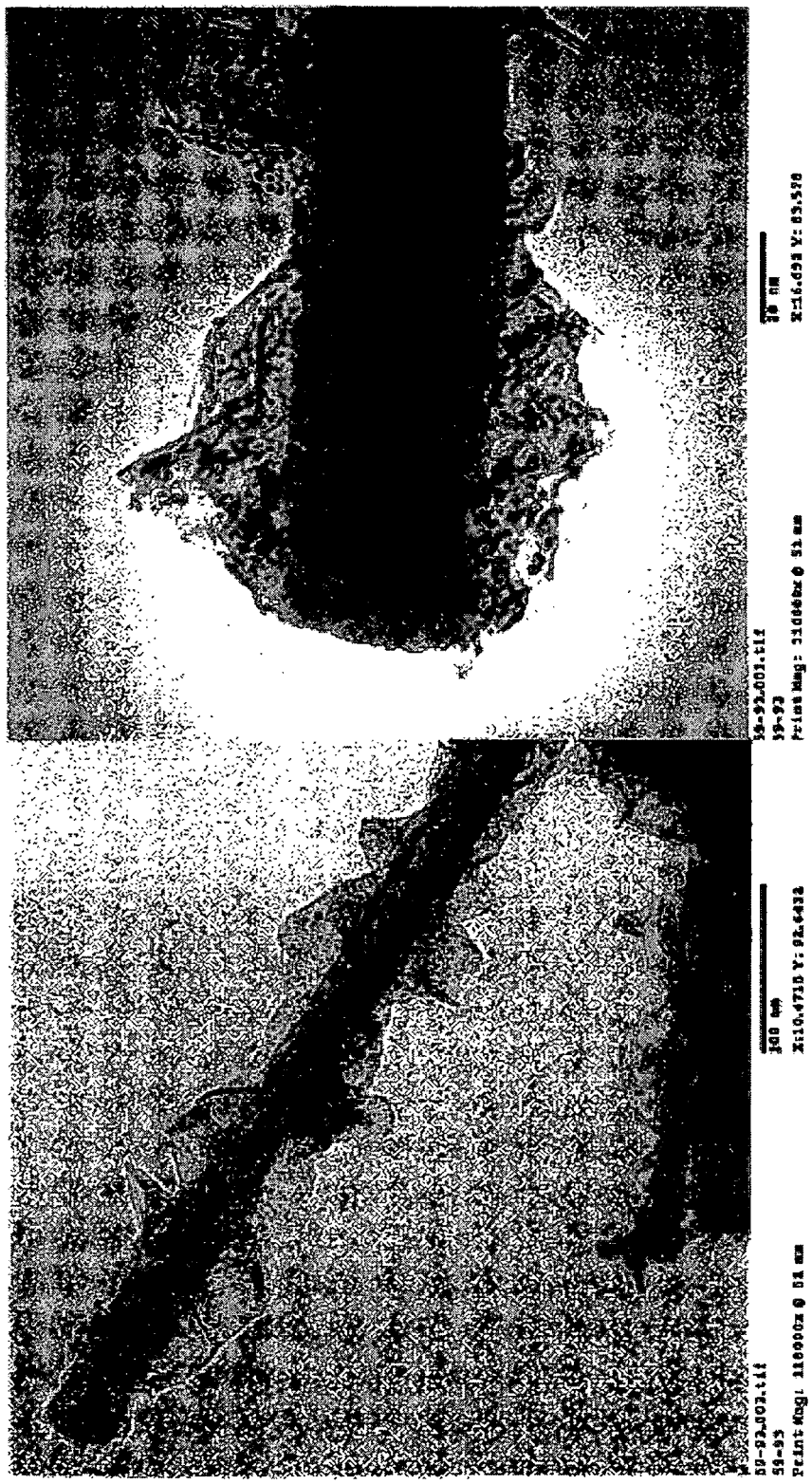
FIG. 20 shows TEM images of 1.67 nm Pt—Ru (1:1) nanoparticles deposited on the surface of nanographite coated nanowires at two different magnifications.

FIG. 20 shows TEM images of deposition of Pt—Ru nanoparticles on the surface of nanographite coated Si nanowires (110,000 times magnification (left image) and 330,000 times magnification (right image)). As the nanowires are coated with carbon, the deposition methods used to deposit nanoparticles on carbon black described above were used. The TEM images in FIG. 20 show uniform deposition of 1.67 nm Pt—Ru nanoparticles deposited on the nanographite coated nanowires at high density. The number of nanoparticles deposited on the nanowires compared to the starting number demonstrated a deposition efficiency of greater than about 20%.

When a chemical linker molecule is used to bind the catalyst to the nanowire, the chemical linker can be selected to promote electrical connection between the catalyst and the wire, or the chemical linker can be subsequently removed to promote electrical connection. For example, heat, vacuum, chemical agents or a combination thereof, can optionally be applied to the nanowires to cause the linker molecule to be removed to place the catalyst in direct physical contact with the wire to form a solid electrical connection between the catalyst particles and the nanowire. The structure can also be heated to anneal the interface between the catalyst and the wire in order to improve the electrical contact therebetween. Appropriate temperatures and heating conditions are well known to those of skill in the art.

Figure 21:
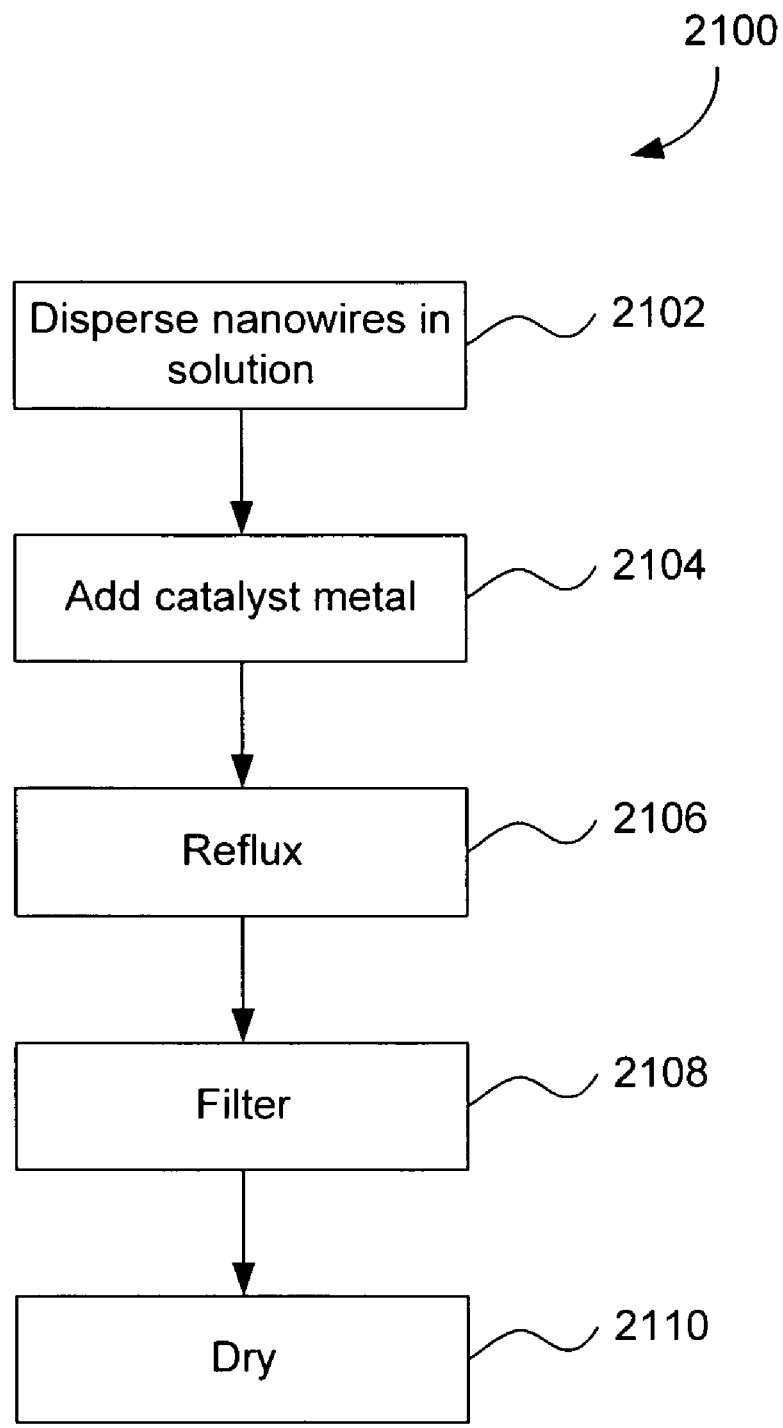
FIG. 21 shows a method for preparing catalyst metal-associated nanowires using reflux in accordance with one embodiment of the present invention.

The present invention also provides methods for preparing one or more nanowires comprising one or more catalyst metals associated with the nanowires. An exemplary embodiment of such methods is shown in flowchart 2100 in FIG. 21. Suitably, as shown in FIG. 21, in step 2102, one or more nanowires are dispersed in a solution. In step 2104, one or more catalyst metals are then added to the solution, and in step 2106, the solution is refluxed, whereby the catalyst metals become associated with the nanowires. Suitably, the catalyst meals are added as a solution comprising one or more catalyst metal nanoparticles. As discussed throughout, exemplary catalyst metals include, but are not limited to, chromium (Cr), molybdenum (Mo), tungsten (W), manganese (Mn), technetium (Tc), rhenium (Re), iron (Fe), ruthenium (Ru), osmium (Os), cobalt (Co), rhodium (Rh), iridium (Ir), nickel (Ni), palladium (Pd), platinum (Pt), copper (Cu), silver (Ag), gold (Au), zinc (Zn), tin (Sn), aluminum (Al), and combinations thereof. Suitably Pt or PtRu are used as catalyst metals.

Any suitable solution can be used for dispersion of the nanowires and then subsequent refluxing. Exemplary solutions include organic solvents such as ethylene glycol, as well as alcohols and aqueous-based solutions.

As used herein, "refluxing" means adding heat to a nanowire solution (heating) such that it boils, thereby driving volatile liquids from the solution and leaving catalyst metal-associated nanowires behind in the container in which the nanowire solution was heated. For example, refluxing can comprise heating the nanowire solution for about 10 minutes to about 100 minutes, suitably about 20, 30, 40, 50, 60, 70, 80, or 90 minutes, at a temperature at which the solution boils. Typically, solutions of nanowires will boil at about 70° C. to about 200° C., for example, about 90° C., 100° C., 110° C., 120° C., 130° C., 140° C., 150° C., 170° C., or about 190° C.

As discussed throughout, in exemplary embodiments, the nanowires are derivatized with at least a first functional group which binds the catalyst metal, for example, a nitric acid, a carboxylic acid group, a hydroxyl group, an amine group, and a sulfonic acid group.

Following refluxing the nanowire solution, as shown in FIG. 21, in step 2108, the catalyst metal-associated nanowires are filtered to generate a solid nanowire dispersion with associated catalyst metals, and then dried in step 2110.

Suitably the nanowires that are utilized in the refluxing methods of the present invention are the various nanowire structures and networks described throughout.

In addition to the conductive catalyst particles, fillers can be used to alter the physical properties of the nanowire composite structures useful in the invention. Appropriate fillers include, e.g. silica ($SiO_2$), powdered polytetrafluoroethylene and graphite fluoride (CFn). The polymer films preferably can include up to about 20 percent by weight fillers, and more preferably from about 2 to about 10 percent by weight fillers. The fillers are generally in the form of particles.

Following catalyst deposition, a proton conducting polymer such as NAFION® may optionally be deposited on the nanowire surface between catalyst particle sites, for example, by functionalizing the surface of the nanowire with a second functional group (different from the catalyst functional group, when used) that preferentially binds the electrolyte or which promotes consistent and/or controlled wetting. The polymer can either be a continuous or discontinuous film on the surface of the nanowire. For example, the polymer electrolyte can be uniformly wetted on the surface of the wires, or can form point-contacts along the length of the wire. The nanowires may be functionalized with a sulfonated hydrocarbon molecule, a fluorocarbon molecule, a short chain polymer of both types of molecules, or a branched hydrocarbon chain which may be attached to the nanowire surface via silane chemistry. Those of skill in the art will be familiar with numerous functionalizations and functionalization techniques which are optionally used herein (e.g., similar to those used in construction of separation columns, bio-assays, etc.). Alternatively, instead of binding ionomer to the nanowires through a chemical binding moiety, the nanowires may be directly functionalized to make them proton conductive. For example, the nanowires may be functionalized with a surface coating such as a perfluorinated sulfonated hydrocarbon using well-known functionalization chemistries.

For example, details regarding relevant moiety and other chemistries, as well as methods for construction/use of such, can be found, e.g., in Hermanson Bioconjugate Techniques Academic Press (1996), Kirk-Othmer Concise Encyclopedia of Chemical Technology (1999) Fourth Edition by Grayson et al. (ed.) John Wiley & Sons, Inc., New York and in Kirk-Othmer Encyclopedia of Chemical Technology Fourth Edition (1998 and 2000) by Grayson et al. (ed.) Wiley Interscience (print edition)/John Wiley & Sons, Inc. (e-format). Further relevant information can be found in CRC Handbook of Chemistry and Physics (2003) 83rd edition by CRC Press. Details on conductive and other coatings, which can also be incorporated onto the nanowire surface by plasma methods and the like can be found in H. S. Nalwa (ed.), Handbook of Organic Conductive Molecules and Polymers, John Wiley & Sons 1997. See also, "ORGANIC SPECIES THAT FACILITATE CHARGE TRANSFER TO/FROM NANOCRYSTALS," U.S. Pat. No. 6,949,206. Details regarding organic chemistry, relevant for, e.g., coupling of additional moieties to a functionalized surface can be found, e.g., in Greene (1981) Protective Groups in Organic Synthesis, John Wiley and Sons, New York, as well as in Schmidt (1996) Organic Chemistry Mosby, St Louis, Mo., and March's Advanced Organic Chemistry Reactions, Mechanisms and Structure, Fifth Edition (2000) Smith and March, Wiley Interscience New York ISBN 0-471-58589-0, and U.S. Patent Publication No. 20050181195, published Aug. 18, 2005. Those of skill in the art will be familiar with many other related references and techniques amenable for functionalization of surfaces herein.

The polymer electrolyte coating may be directly linked to the surface of the nanowires, e.g., through silane groups, or may be coupled via linker binding groups or other appropriate chemical reactive groups to participate in linkage chemistries (derivitization) with linking agents such as, e.g., substituted silanes, diacetylenes, acrylates, acrylamides, vinyl, styryls, silicon oxide, boron oxide, phosphorus oxide, N-(3-aminopropyl)-3-mercapto-benzamide, 3-aminopropyl-trimethoxysilane, 3-mercaptopropyl-trimethoxysilane, 3-maleimidopropyl-trimethoxysilane, 3-hydrazidopropyl-trimethoxysilane, trichloro-perfluoro octyl silane, hydroxysuccinimides, maleimides, haloacetyls, hydrazines, ethyldiethylamino propylcarbodiimide, and/or the like. Other surface functional chemistries can be used such as those that would be known to one or ordinary skill in the art.

In addition, a solubilized perfluorosulfonate ionomer (e.g., NAFION®) may be placed into the spare space between nanowires. The composite nanowire structure (e.g., as a porous sheet of interconnected nanowires, e.g., made by the process described in the Examples section), when not grown in situ on one of the bipolar plates and/or proton exchange membrane, may then be placed between bipolar plates on either side of a proton exchange membrane, and the assembly hot pressed to form a complete membrane-electrode assembly fuel cell according to the present invention. The pressing temperature is determined such that the proton exchange membrane is softened in that temperature range, for example, to 125° Celsius for NAFION®. The pressure level is about 200 kgf/cm$_2$. In order to efficiently distribute fuel/oxygen to the surface of the anode/cathode electrodes 808, 810, (see FIG. 8) a gas diffusion layer is typically needed in conventional fuel cells between the anode electrode and bipolar plate on one side, and the cathode electrode and bipolar plate on the other side of the fuel cell. Typically, a carbon fiber cloth is used as the gas diffusion layer. With the interconnecting nanowire composite membrane electrode catalyst support assembly of the present invention, this gas diffusion layer can be eliminated due to the superior structure of the nanowire-based electrodes.

In further embodiments, the present invention provides conducting composites, comprising one or more nanowires comprising a core, an interfacial carbide layer and a carbon-based structure formed on the interfacial carbide layer, and carbon black. As used throughout, carbon black refers to the material produced by the incomplete combustion of petroleum products. Carbon black is a form of amorphous carbon that has an extremely high surface area to volume ratio. The present invention also provides porous catalyst supports comprising one or more nanowires comprising a core, an interfacial carbide layer and a carbon-based structure formed on the interfacial carbide layer, and carbon black.

As discussed throughout, suitably the carbon-based structures comprise at least one nanographitic plate formed on the interfacial carbide layer. Exemplary cores for use in the conducting composites and porous catalyst supports and comprise semiconductor material, such as Si, B, SiC or GaN.

In further embodiments, the core comprises an inorganic oxide selected from the group consisting of $SiO_2$, $Al_2O_3$, $TiO_2$, $SnO_2$, $ZrO_2$, $HfO_2$ and $Ta_2O_5$; an inorganic carbide selected from the group consisting of TiC, ZrC, HfC, NbC, WC, $W_2C$, MoC and $Mo_2C$; or an inorganic nitride selected from the group consisting of TiN, ZrN, HfN, WN, MoN and BN. Examples of interfacial carbide layers include, but are not limited to, SiC, TiC, ZrC, HfC, NbC, WC, Mo2C and mixtures thereof. Suitably, the nanowires for use in the conducting composites comprise a core has a cross-sectional diameter of less than about 500 nm and a length of greater than about 50 nm.

As discussed throughout, suitably the nanowires comprise at least one nanographitic plate that extends away from the core a distance of about 1 nm to about 100 nm, comprises at least 2-15 layers of graphene, and is oriented relative the major axis of the core at an angle of between about 0° and about 90°.

Suitably, the porous catalyst supports of the present invention comprise one or more nanowires that are separated by a pore size of less than about 10 μm, for example, less than about 5 μm, e.g., less than about 1 μm, e.g., less than about 0.2 μm, e.g., less than 0.02 μm, e.g., between about 0.002 μm and 0.02 μm, e.g., between about 0.005 and 0.01 μm. The overall porosity of the porous catalyst supports may be greater than about 30%, for example, between about 30% and 95%, e.g., between about 40% and 60%.

In a further embodiment, the present invention provides catalysts comprising one or more nanowires comprising a core, an interfacial carbide layer and a carbon-based structure formed on the interfacial carbide layer, carbon black and one or more catalyst metals associated with the nanowires and the carbon black (i.e., the nanowires and the carbon black provide a composite support for the catalysts). As discussed throughout, suitably the carbon-based structures comprise at least one nanographitic plate formed on the interfacial carbide layer. Exemplary compositions and characteristics of nanowire cores, interfacial carbide layers, catalyst metals and nanographitic plates are disclosed throughout and can be used in the catalysts of the present invention.

Micro Fuel cells Based on a Silicon Platform

Figure 22:
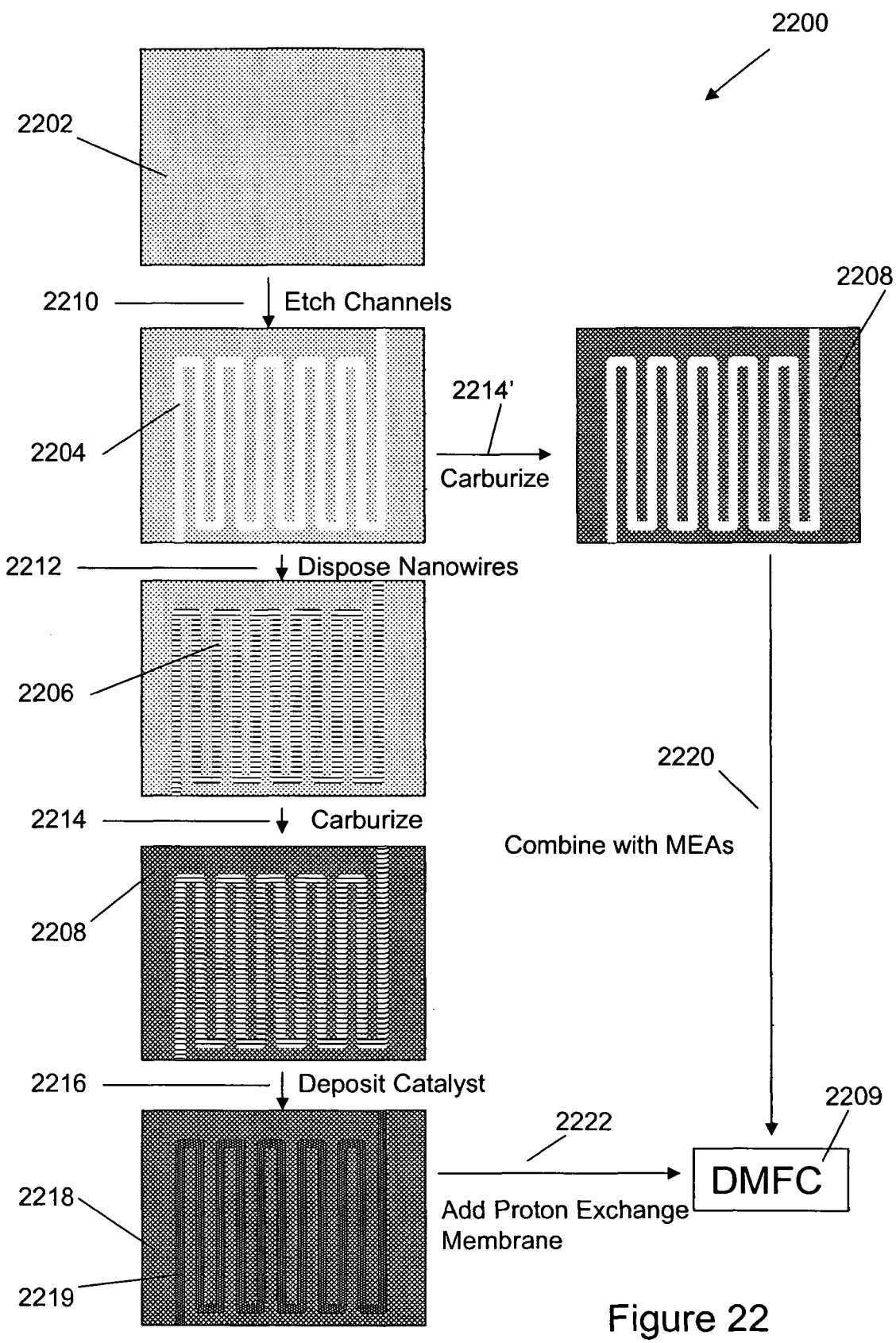
FIG. 22 shows a process for producing micro fuel cells using inorganic wafers in accordance with one embodiment of the present invention.

In another embodiment, the present invention provides micro fuel cells based on a semiconductor wafer platform (e.g., Si) using the nanowires, bird's nest structures and interconnected nanowire networks described throughout. According to the embodiment, an integrated structure comprising a bipolar plate composed of nanographite coated nanowires with catalyst nanoparticles is prepared on an inorganic support wafer, e.g., a semiconductor wafer. For example, as shown in FIG. 22, an inorganic support wafer or semiconductor wafer 2202 (e.g., a highly doped silicon wafer) is etched using a suitable etchant, for example NaOH, in step 2210, thereby producing one or more channels 2204 on a first surface of the wafer. As used herein, the term channel means a grove, cut-out, recess, depression or other similar structure that creates a void in the material of the semiconductor wafer. The semiconductor wafer can be about 1 mm thick, for example a 1 mm thick doped Si wafer. Other thicknesses and semiconductor wafer compositions can also be utilized, as would become apparent to those of ordinary skill in the art. The surfaces of the semiconductor wafer that are etched are generally those that have the greatest surface area, i.e. the faces of the wafer. As shown in FIG. 22, channels 2204 are suitably etched into the surfaces of the semiconductor wafer such that a serpentine, or other suitable formation, is produced. Any number (i.e., 1, 5, 10, 15, 20, etc.) or orientation of channels can be produced in the wafer. Generally, channels 2204 are on the order of a few microns to a few millimeters wide and a few microns to a few millimeters deep. While channels 2204 are shown in FIG. 22 as uniform structures, they can take any application-specific suitable shape or arrangement. By etching both surfaces of the semiconductor wafer 2202, i.e. the largest surfaces that are opposite one another on the wafer, a structure is produced which comprises channels 2204 on opposite sides of the wafer 2202, thereby producing a precursor for a bipolar plate.

In step 2212, nanowires 2206 are then disposed in the channels 2204 left by the etching process. Nanowires 2206 can be disposed in the channels 2204 by either growing nanowires in the channels, or nanowires that have been grown externally from the channels can be harvested from a growth substrate and then deposited in the channels. Any suitable nanowire growth process, such as those described herein or known in the art, can be used to grow the nanowires. For example, metallic catalyst nanoparticles, e.g., Au nanoparticles, can be deposited in the channels 2204, and then Si nanowires can be grown by using a VLS growth process, or other suitable process as described herein or known in the art. Suitably, nanowires 2206 will be disposed in the channels such that ends of the nanowires touch all faces of channels 2204 (i.e., the side(s) and bottom of the channels—if so configured). After nanowires 2206 are disposed in the channels 2204, the surface of the semiconductor wafer 2202 and the nanowires 2206 are contacted with a carbon-containing gas in step 2214 (carburization), thereby converting the surface of wafer 2202 to silicon carbide 2208, e.g., SiC, and also coating the nanowires with a carbide layer, e.g., silicon carbide. Methods for contacting with carbon-comprising gases include those described herein, as well as others known in the art. Further deposition of carbon on the surface of the nanowires results in the growth of graphene layers or sheets, as described herein. In other embodiments, nanowires that have been grown externally from the channels and harvested can first be carburized, and then deposited into the channels formed in the semiconductor wafer. Generally, the wafer will also have been carburized prior to the nanowire deposition, though this can also occur after nanowire deposition.

In step 2216, metal catalysts 2219, e.g., metal catalyst nanoparticles, are deposited on a surface of the nanowires 2206. In suitable embodiments, one surface of wafer 2202 comprises nanowires with deposited anode nanoparticles (e.g., Pt), while the opposite surface comprises nanowires with deposited cathode nanoparticles (e.g., Pt—Ru). Step 2216 can also further comprise incorporation of electrolyte onto the surface of the nanographite coated nanowires. The resulting structure, therefore, is a bipolar wafer 2218 that can now be integrated into MEAs and fuel cells.

In step 2222, bipolar wafer 2218 is combined with proton exchange membranes to produce membrane electrode assemblies that can be used in direct methanol fuel cells. In one embodiment, the anode surface (i.e., the surface of the wafer that comprises nanowires with anode catalysts) of bipolar wafer 2218 is disposed against a proton exchange membrane (e.g., a sulfonated tetrafluorethylene copolymer, such as NAFION®). A second bipolar wafer 2218 is then disposed against the membrane with its cathode surface (i.e., the surface of the wafer that comprises nanowires with cathode catalysts) oppose the anode surface of the first wafer to generate a membrane electrode assembly. This process can be repeated as many times as required, disposing wafers and membranes against each other to generate electrode assemblies. In further embodiments, plates (e.g., graphite, metal, semiconductor or other material) can be placed on the terminal ends of the assembly, thereby generating an enclosed assembly. The electrode assemblies described herein can then be used in micro fuel cells, for example, direct methanol fuel cells 2109.

In another embodiment of the present invention, semiconductor wafer 2202 (e.g., Si wafer) can be etched as described herein in step 2210 to produce a series of channels 2204 in the wafer, suitably on opposite sides/surfaces of the wafer. The wafer can then be carburized in step 2214', thereby generating a carbide coating on the wafer (e.g., SiC). In step 2220, these conducting carbide/graphite coated wafers (e.g., SiC) can then be combined with membrane electrode assemblies (MEA) that have been prepared by conventional methods to produce micro fuel cells, for example direct methanol fuel cells 2209.

Figure 23:
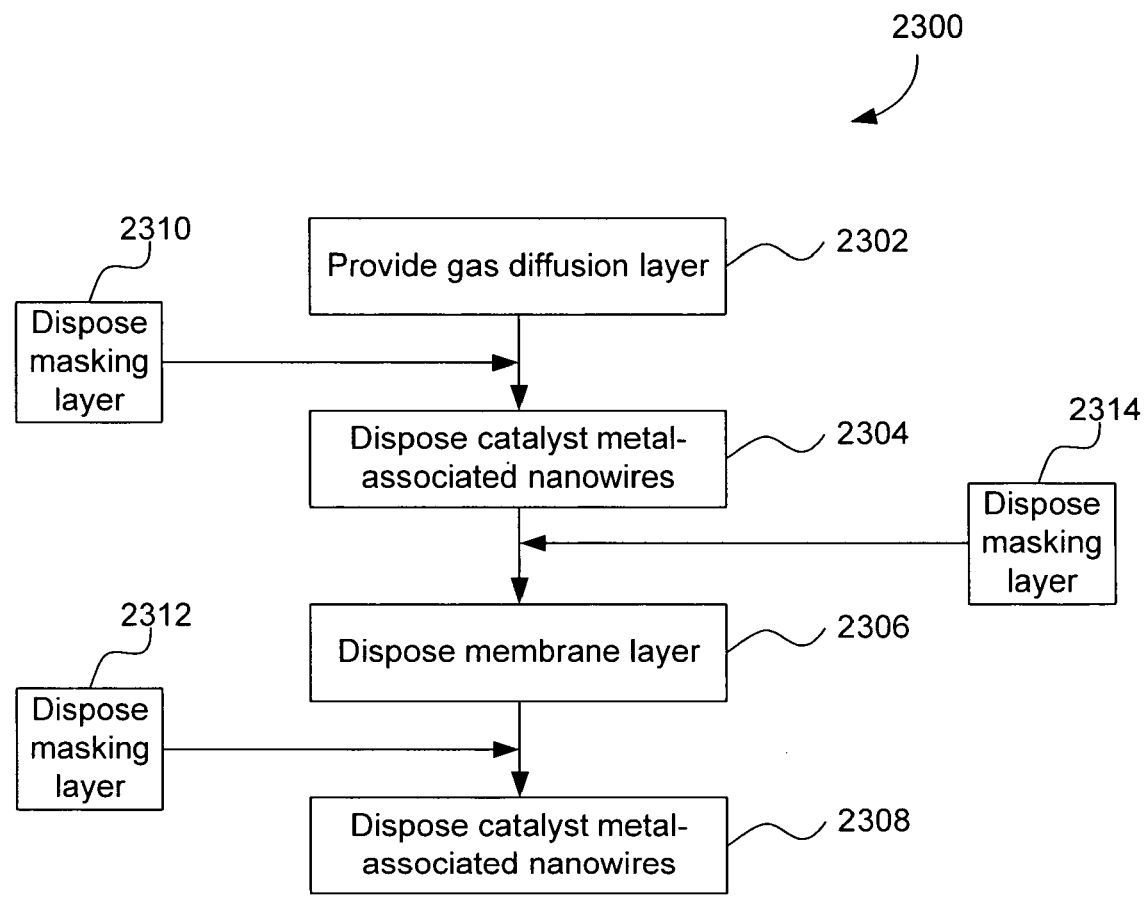
FIG. 23 shows a method for preparing a fuel cell membrane electrode assembly in accordance with one embodiment of the present invention.
Figure 24:
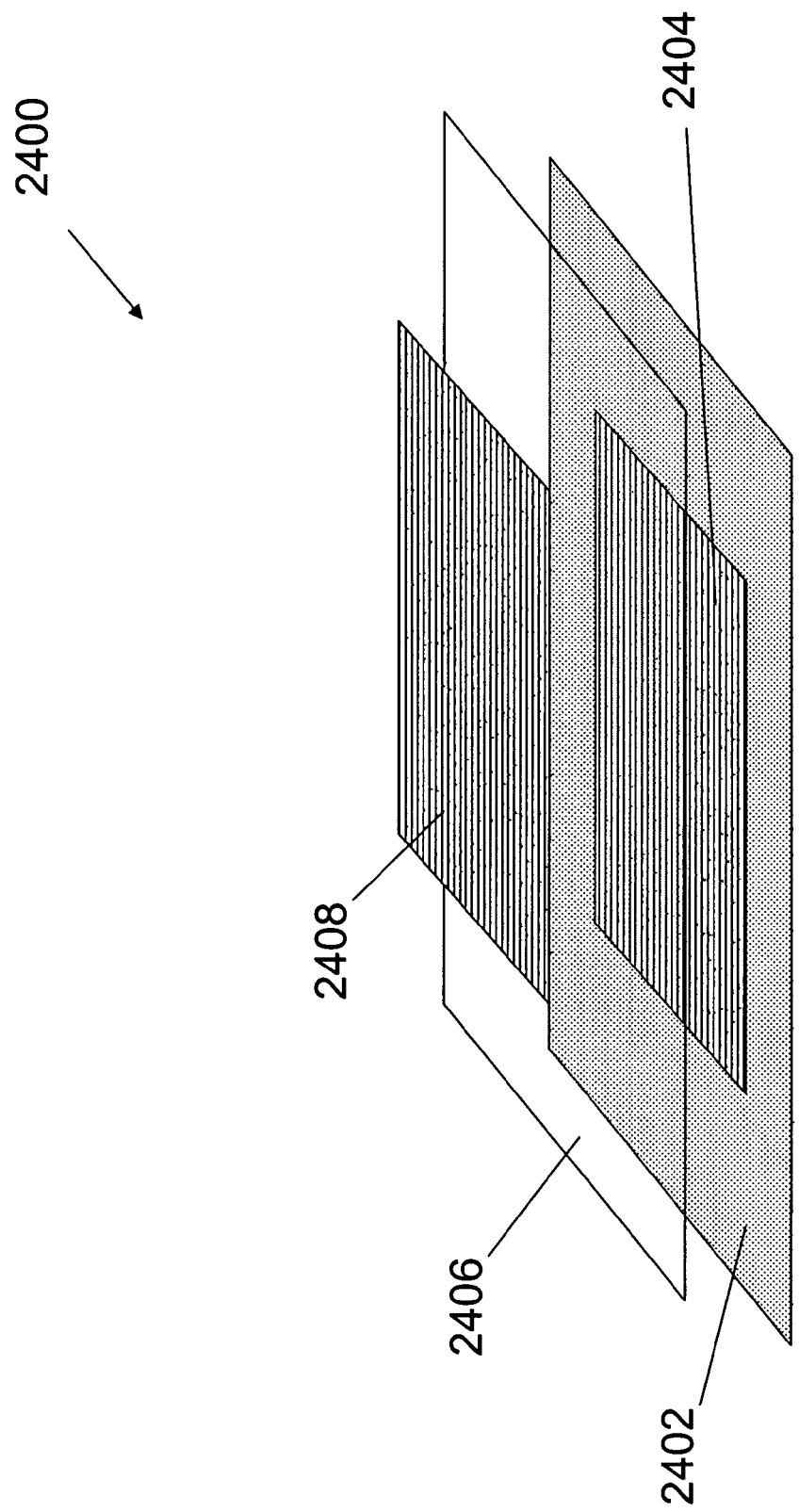
FIG. 24 shows an exemplary four-layer membrane electrode assembly in accordance with one embodiment of the present invention.

Additional methods for preparing fuel cell membrane electrode assemblies are also providing. An exemplary embodiment is represented in flow chart 2300 in FIG. 23, and with reference to FIG. 24, showing a membrane electrode assembly 2400 in accordance with one embodiment of the present invention. As shown in FIG. 23, in step 3202a gas diffusion layer 2402 is provided. Examples of materials suitable for use as gas diffusion layers include, but are not limited to, TEFLON® (DuPont) treated surfaces, such as TEFLON® treated carbon paper or woven cloth (e.g., carbon cloth). In step 2304, a first composition of catalyst metal-associated nanowires 2404 is disposed adjacent the gas diffusion layer 2402. As used herein, the terms "disposed" and "disposed adjacent" are used to mean that the components are arranged next to each other such that the components are capable of interacting with one another so as to act as a membrane electrode assembly. Disposing components adjacent one another, includes, layering, applying, spraying, coating, spreading, or any other form of application of the various components.

In step 2306 of FIG. 23, a membrane layer 2406 is then disposed adjacent the first catalyst metal-associated nanowire composition 2404. Suitably, membrane layer 2406 comprises a proton conducting polymer, such as NAFION® or other sulfonated polymer. Then, in step 2308 of FIG. 23, a second composition of catalyst metal-associated nanowires 2408 is disposed adjacent the membrane layer 2406.

In suitable embodiments, the first and second compositions of catalyst metal-associated nanowires (2404, 2408) comprise solutions of catalyst-associated nanowires, for example nanowire ink solutions. The nanowire solutions of the present invention can also further comprise one or more additional components such as surfactants or polymers (for example, to aid in nanowire dispersion) and/or ionomers, such as NAFION®. Suitably, the concentration of nanowires in the various nanowires solutions are from about 0.01% to about 50% by volume, for example, about 0.1% to about 20% by volume. Suitably, the first and second compositions of catalyst metal-associated nanowires are nanowire solutions which also further comprise one or more ionomers, such as NAFION®.

Exemplary catalyst-associated nanowires for use in the methods of the present invention include those described throughout. Suitably, the first composition of catalyst metal-associated nanowires comprises a solution of anode catalyst metal-associated nanowires, and the second composition of catalyst metal-associated nanowires comprises a solution of cathode catalyst metal-associated nanowires, though the order of the two layers can be reversed. While any method of disposing the catalyst metal-associated nanowires can be used, suitably the nanowires are disposing by spraying a solution of the nanowires onto the various surfaces. Methods for spraying nanowires onto various surfaces are well known in the art, see for example, U.S. Pat. No. 7,135,728, the disclosure of which is incorporated herein by reference. Suitably the spraying methods utilize an ultrasonic bath to prevent aggregation of the nanowires in solution, and a computer-controlled spray nozzle to deliver the nanowire solution to the surfaces. In further embodiments, the spraying methods of the present invention comprise spraying multiple layers of the nanowires (and one or more ionomers), so as to create multiple layers of nanowires in the final MEA.

In additional embodiments, as shown in flowchart 2300 FIG. 23, the membrane electrode assembly preparation methods of the present invention further comprise, in step 2310, disposing a masking layer (e.g., metallic film or foil) adjacent the gas diffusion layer 2402 to cover at least the edges of the gas diffusion layer prior to disposing of the first composition of catalyst metal-associated nanowires (e.g. nanowire solutions comprising ionomers) 2404 in step 2304. A masking layer is not shown in FIG. 24, but suitably the masking layer is prepared such that it covers the edges of gas diffusion layer 2402, but leaves an open, unmasked section in the center of the gas diffusion layer 2402. As shown in FIG. 24, disposing a first composition comprising catalyst metal-associated nanowires (e.g. a nanowire solution comprising ionomers) results in an assembly where the center of the gas diffusion layer is covered by the nanowire composition, but the outer edges of the gas diffusion layer 2402 are not. Then, after disposing the first composition, but prior to disposing the membrane layer 2406 in step 2306, the masking layer is removed in step 2312. Thus, when the membrane layer 2406 is disposed adjacent the first catalyst metal-comprising nanowire composition/layer 2404, the membrane layer 2406 not only is positioned adjacent to the nanowires, but also the gas diffusion layer 2402 at the edges.

In further embodiments, as shown in flowchart 2300 in FIG. 23, in step 2514, a masking layer is disposed adjacent the membrane layer 2406 to cover at least the edges of the membrane layer prior to disposing of the second composition of catalyst metal-associated nanowires 2408 in step 2308. This additional masking layer is not shown in FIG. 24, but suitably the masking layer is prepared such that it covers the edges of membrane layer 2406, but leaves an open, unmasked section in the center of the membrane layer 2406. As shown in FIG. 24, disposing a second composition comprising catalyst metal-associated nanowires (e.g. a nanowire solution comprising ionomers) 2408 results in an assembly where the center of the membrane layer 2406 is covered by the nanowires, but the outer edges of the membrane layer 2406 are not.

Membrane electrode assemblies prepared by the methods of the present invention can be utilized in preparation of various fuel cell electrodes, for example, in fuel cell electrode stacks. The methods of the present invention, suitably the nanowire spray methods, provide a quick and easy manufacturing process for preparing a four-layer membrane electrode assembly.

Figure 25:
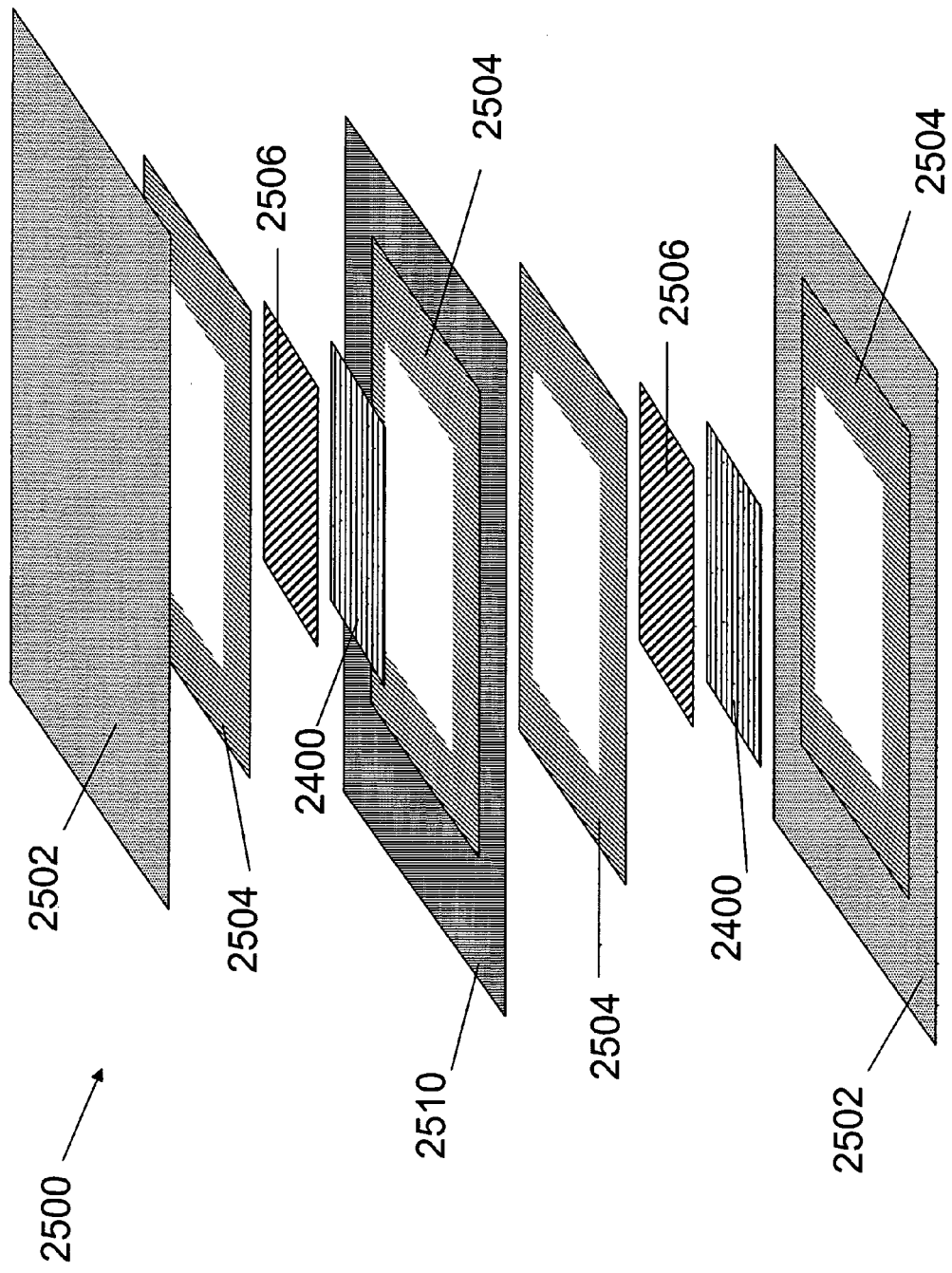
FIG. 25 shows an exemplary fuel cell electrode stack in accordance with one embodiment of the present invention.
Figure 26A:
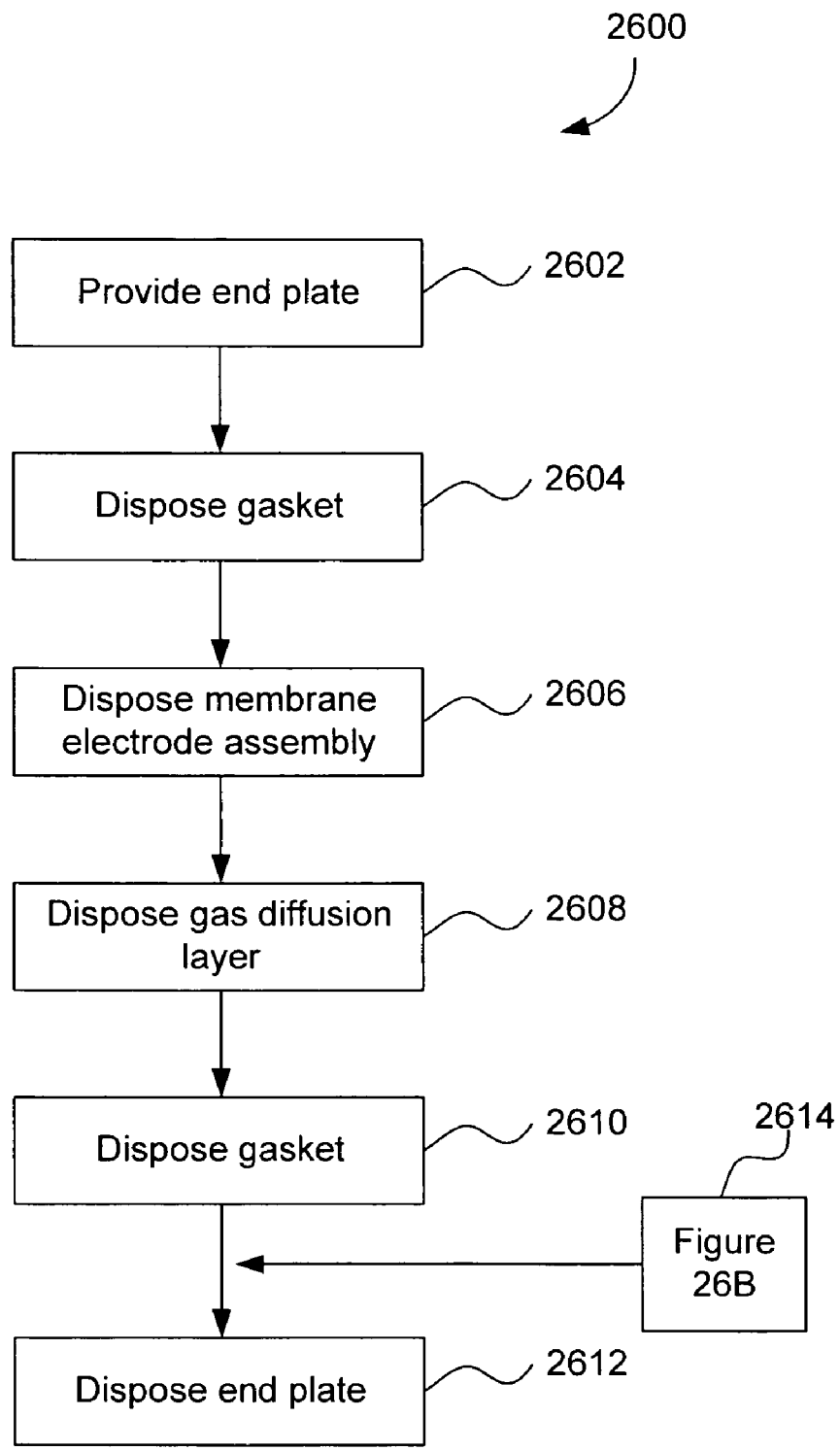
FIG. 26A shows a method for preparing fuel cell electrode stacks in accordance with one embodiment of the present invention.
Figure 26B:
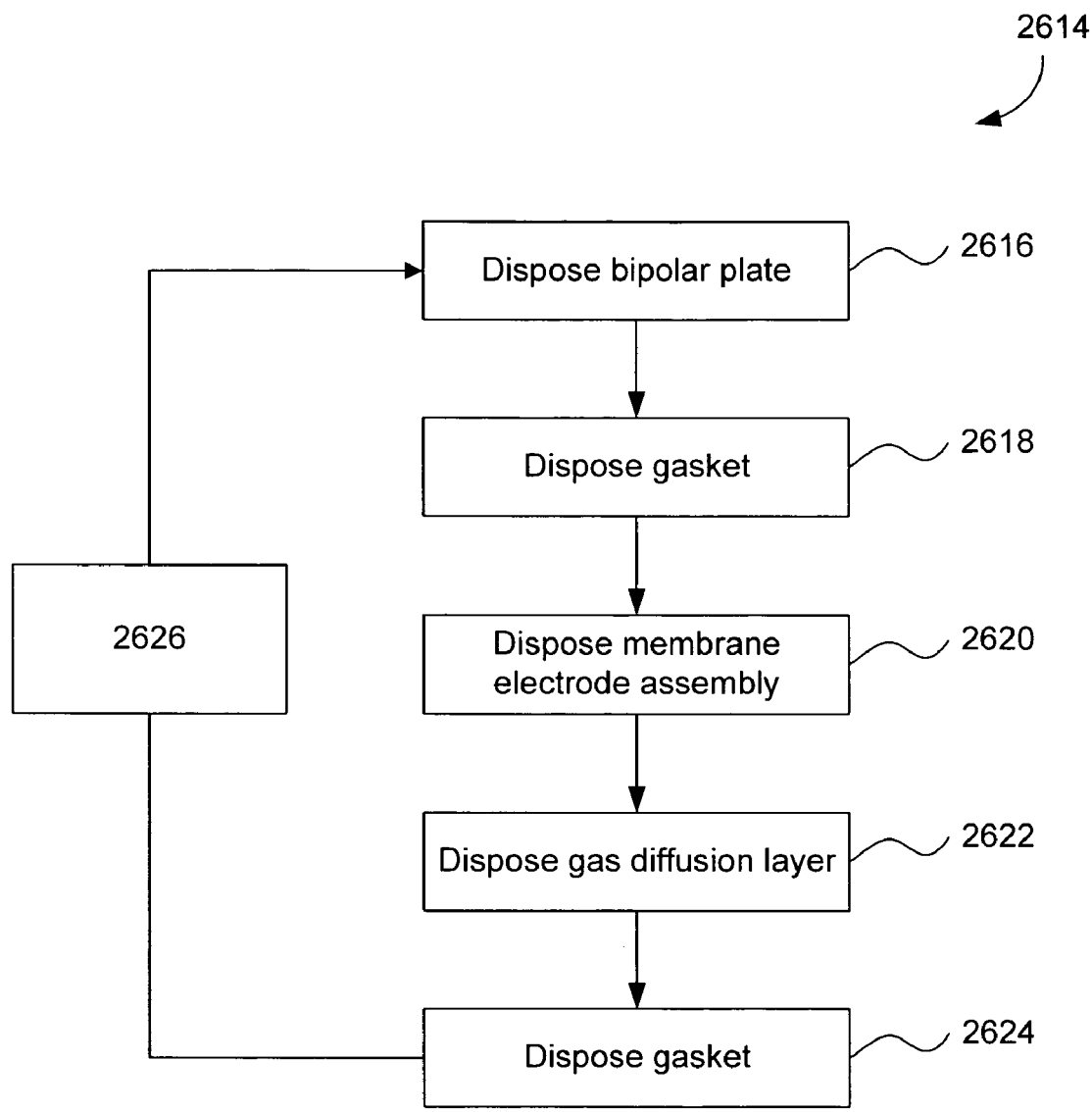
FIG. 26B shows additional methods for preparing fuel cell electrode stacks in accordance with one embodiment of the present invention.

In still further embodiments, the present invention provides methods for preparing a fuel cell electrode stack 2500 utilizing the membrane electrode assemblies disclosed throughout. In an exemplary embodiment, as shown in FIGS. 26A-26B, with reference to FIG. 25, flowchart 2600 provides a method for preparing a fuel cell electrode stack. In step 2602 of FIG. 26A, a first end plate 2502 is provided. As used throughout, end plates include machined graphite or molded conducting polymer composites and other similar materials. In step 2604, a gasket 2504 is disposed adjacent the end plate 2502. Suitably, gasket 2504 will comprise a material that is able to create a seal between end plate 2502 and additional components of the fuel cell stack. As shown in FIG. 25, gasket 2504 suitably has an opening to accommodate the addition of a membrane electrode assembly 2400. Exemplary materials for use as gaskets include, but are not limited to, various polymers and rubbers, such as silicon, MYLAR® (DuPont) laminates, ethylene propylene diene monomer (EPDM) rubber and the like.

In step 2606 of FIG. 26A, a membrane electrode assembly 2400 is disposed adjacent the gasket. While the four-layer membrane electrode assemblies (MEA) (2400) of the present invention are suitably used in the fuel cell electrode stacks of the present invention, other membrane electrode assemblies disclosed throughout and otherwise known in the art can also be used. Following disposition of the MEA, a gas diffusion layer 2506 is then disposed adjacent the MEA in step 2608. In step 2610, an additional gasket 2504 is then disposed adjacent gas diffusion layer 2506. Finally, in step 2612, an end plate 2502 is disposed adjacent gasket 2504 to create the completed fuel cell electrode stack 2500. The fuel cell stack can then be clamped together for further processing. Addition of further components as disclosed throughout and known in the art can then be added to yield a working fuel cell.

In additional embodiments, as shown in FIGS. 26A and 26B, the methods of the present invention can further comprise assembling additional MEA layers (e.g., 2, 3, 4, 5, 6, etc., up to an $n^{th}$ MEA) when preparing fuel cell electrode stacks 2500. That is, any number of MEA layers up to an $n^{th}$, or final desired MEA layer, can be prepared in the fuel cell electrode stacks. For example, following disposition of a second gasket 2504 in step 2610, and prior to disposing a second end plate in step 2612, a bipolar plate 2510 is disposed adjacent the second gasket 2504 in step 2616. Both end plates 2502 and bipolar plate(s) 2510 suitably typically have channels and/or grooves in their surfaces that distribute fuel and oxidant to their respective catalyst electrodes, allow the waste, e.g., water and $CO_2$ to get out, and may also contain conduits for heat transfer. Typically, bipolar plates and end plates are highly electrically conductive and can be made from graphite, metals, conductive polymers, and alloys and composites thereof. Materials such as stainless steel, aluminum alloys, carbon and composites, with or without coatings, are good viable options for bipolar end plates in fuel cells. Bipolar plates and end plates can also be formed from composite materials comprising highly-conductive or semiconducting nanowires incorporated in the composite structure (e.g., metal, conductive polymer etc.). While bipolar plates suitably comprise channels and/or groves on both surfaces, end plates typically only comprise channels and/or groves on the surface that is contact with the fuel cell components (i.e., the internal surface), while the external surface does not comprise such channels or groves.

In step 2618 of FIG. 26B, an additional gasket 2504 is the disposed adjacent the bipolar plate 2510. In step 2620, a second MEA 2400 is then disposed adjacent gasket 2504 (i.e. a third gasket as shown in FIG. 25). This is followed by disposing an additional gas diffusion layer 2606 adjacent MEA 2400 in step 2622. In step 2624, an additional gasket 2504 (i.e., fourth) is then disposed adjacent gas diffusion layer 2506.

As shown in FIG. 26B, in step 2626, steps 2616 through 2624 are then repeated until the $n^{th}$, i.e., final, membrane electrode assembly (2400) has been disposed. By repeating the various steps of FIG. 26B, repeated layers of bipolar plate 2510, gasket 2504, MEA 2400, gas diffusion layer 2506 and gasket 2504 are repeated until the desired number of MEAs (through the $n^{th}$ MEA) are stacked together to form the fuel cell electrode stack. Once the final MEA has been utilized, rather than repeating steps 2616-2624 in step 2626, an end plate 2502 is disposed adjacent the final gasket 2504 in step 2612 in FIG. 26A. The present invention therefore provides methods for repeatedly disposing/layering/stacking the various fuel cell components until the final, desired fuel cell stack is achieved.

The final fuel cell stack can then be clamped together, and fuel impregnated with a suitable electrolyte, for example, an ethylene glycol solution. Addition of further components as disclosed throughout and known in the art can then be added to yield a working fuel cell.

Chromatographic Media

Particles prepared from the interconnected nanowire networks can be used to create chromatographic media. For example, the particles can be used in size exclusion columns by packing the mesoporous particulate material in a column and then adding a solution containing appropriately-sized large and small articles to be separated. Based upon the sizes of the pores, certain smaller articles will be retained by the particles (and the column), while certain larger articles will pass through the packed column. Such columns can be used for separation and sample cleanup, or in conjunction with analytic apparatus, e.g., chromatographs, fluorimeters and the like.

The interconnected nanowire networks are also useful as sample platforms or substrates for matrix-assisted laser desorption ionization (MALDI) time of flight Mass Spectrometry analysis of biomolecules, as well as surface coatings or scaffolds for other biological applications.

The interconnected nanowire networks are also useful as high surface area electrodes for medical devices, for example. In addition to high surface area, the nanowire networks offer advantageous properties such as long term stability, biocompatibility and low polarization over extended periods.

Field Emission Devices

Field emission devices are devices that capitalize on the movement of electrons. A typical field emission device includes at least a cathode, emitter tips, and an anode spaced from the cathode. (See, e.g., U.S. Pat. Nos. 7,009,331, 6,976,897 and 6,911,767; and U.S. Patent Application No. 2006/0066217, the disclosures of each of which are incorporated herein by reference in their entireties). A voltage is applied between the cathode and the anode causing electrons to be emitted from the emitter tips. The electrons travel in the direction from the cathode to the anode. These devices can be used in a variety of applications including, but not limited to, microwave vacuum tube devices (e.g., X-ray tubes), power amplifiers, ion guns, high energy accelerators, free electron lasers, and electron microscopes, and in particular, flat panel displays. Flat panel displays can be used as replacements for conventional cathode ray tubes. Thus, they have application in television and computer monitors.

Conventional emitter tips are made of metal, such as molybdenum, or a semiconductor such as silicon. One of the concerns with using metal emitter tips is that the control voltage required for emission is relatively high, e.g., around 100 V. Moreover, these emitter tips lack uniformity resulting in non-uniform current density between pixels.

More recently, carbon materials, have been used as emitter tips. Diamond has negative or low electron affinity on its hydrogen-terminated surfaces. Carbon nanotubes, also known as carbon fibrils, have also been explored for use in emitter tip technology.

In another embodiment of the present invention, the nanowire structures and interconnected nanowire networks described herein can be used as field emitters and field emission devices. Exemplary field emission elements in accordance with the present invention include, but are not limited to, one or more vertically oriented refractory metal coated nanowires, one or more vertically oriented carbon coated nanowires (e.g., Si nanowires coated with SiC), a plurality of randomly oriented nanowires covered with graphene layers (e.g., Si nanowires coated with SiC and graphene layers) and pieces of nanowires covered with graphene layers, as well as combinations and variations thereof. As used herein, the term field emission element, field emitters and field emitting elements are used interchangeably to refer to structures that allow emission of electrons from their surface.

Figure 27:
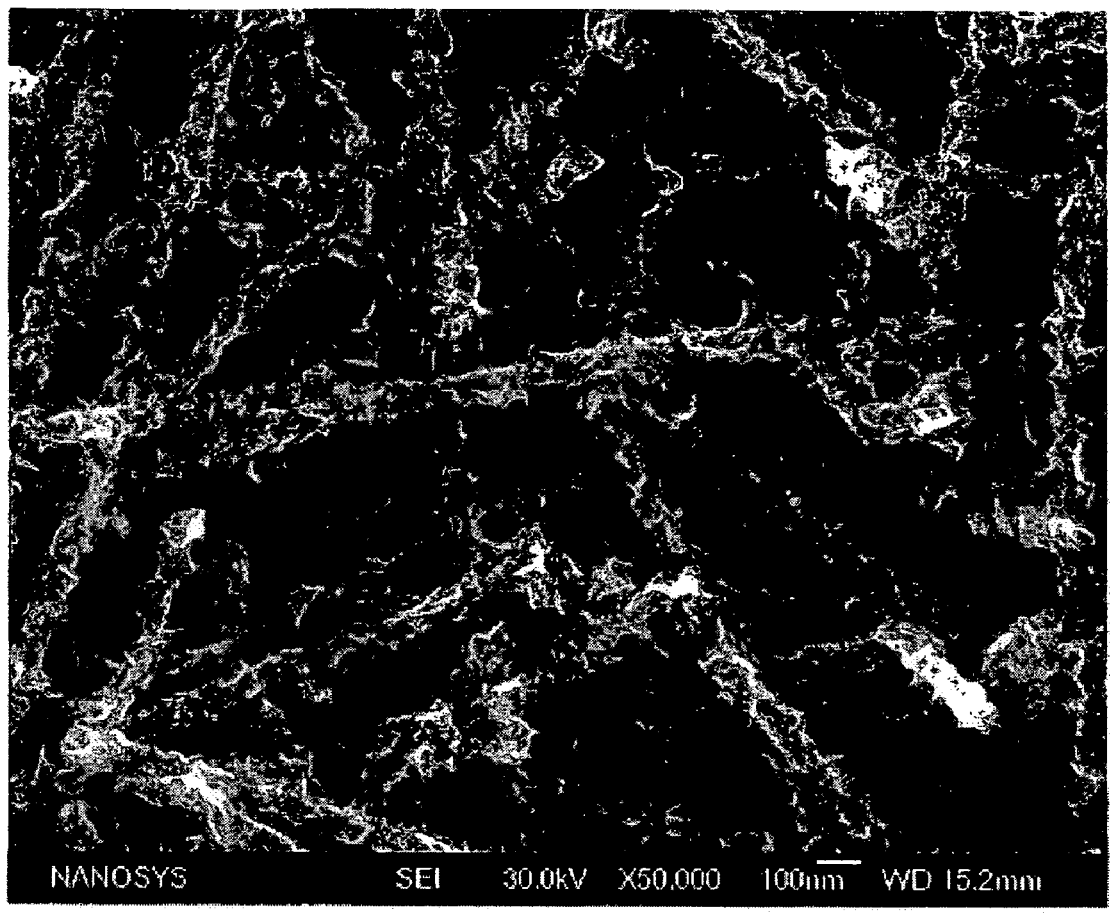
FIG. 27 shows a TEM of graphite-coated nanowires for use as emitting elements in accordance with one embodiment of the present invention.

In suitable embodiments, the field emitters and field emission devices comprise Si nanowires coated with SiC and graphene layers. As shown in FIG. 27, these "barbed" nanowires in a bird's nest configuration comprise a structure much like a tetrapod, in that regardless of the orientation of the wire, carbon graphene layers extend outward and upward away from the nanowires. The thin graphene layers represent a good electron emitter, and the presence of several of these graphene "barbs" extending from all sides of a nanowire element ensure a high level of electron transmission.

By coating a substrate, for example a glass plate, with a plurality of the nanowire structures of the present invention, e.g., a bird's nest configuration, a highly uniform emitter element can be produced in which Si nanowires coated with SiC and graphene layers form a series of highly uniform, extended emission elements.

In another embodiment, refractory metal coated nanowires can also serve as emitting elements. For example, Mo coated nanowires (e.g., Si nanowires). Other metallic coatings can also be applied to the nanowires to allow them to function as emitting elements.

It will be readily apparent to one of ordinary skill in the relevant arts that other suitable modifications and adaptations to the methods and applications described herein can be made without departing from the scope of the invention or any embodiment thereof. Having now described the present invention in detail, the same will be more clearly understood by reference to the following examples, which are included herewith for purposes of illustration only and are not intended to be limiting of the invention.

EXAMPLES

Example 1

Preparation of Nanowire Structures

Silicon nanowires coated with $WO_3$ were heated at 650° C. for 30 minutes, followed by 1250° C. for 6 min in the presence of a flowing gas mixture comprising Ar (430 cc/min), $H_2$ (130 cc/min) and $CH_4$ in Ar (228 cc/min). After the preparation was cooled, an interconnected nanowire network 300 comprising interconnected nanowire structures 100 was formed. The nanowire structures 100 comprising Si nanowire cores 102, carbon based layers 104 (SiC/WC interfacial carbide layers) and carbon-based structures 106 (graphene nanographitic plates) connecting the nanowire structures 100.

Example 2

Deposition of Nanoparticles on Nanowires

Figure 14:
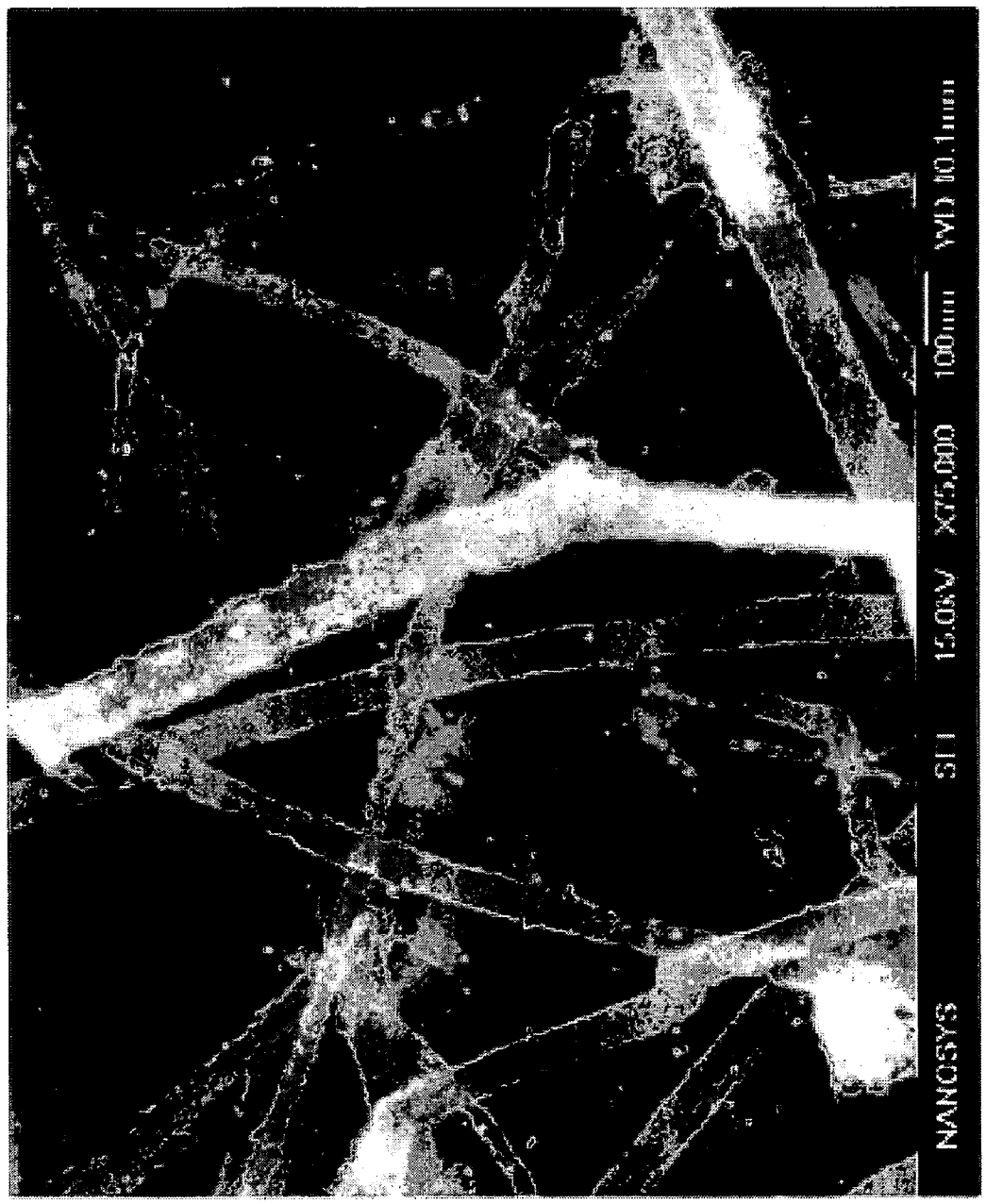
FIG. 14 is a SEM image showing Au catalyst particles deposited on a network of interconnected nanowires.

Approximately 10 mg Si nanowires were dispersed in ethanol by sonication to form a nanowire suspension. An interconnected nanowire network was prepared by vacuum filtration of the nanowire suspension over a polyvinylidene fluoride (PVDF) membrane and vacuum drying, then 2 cc 0.1% polylysine solution was added to the filter funnel to absorb polylysine on the surface of the nanowires. After 5 minutes, all liquid in the funnel was vacuum removed and the nanowire network was separated from the PVDF membrane. After being dried in an oven at 100° Celsius for 15 minutes, the nanowire network was submerged in 10 cc of Au colloid solution (10 nm colloids) and soaked for 20 minutes to absorb the Au nanoparticles on the surface of the nanowires. Finally, the nanowire network was removed from the Au colloid solution, rinsed with isopropyl alcohol (IPA), and dried at 100° Celsius to obtain a nanowire network coated with gold nanoparticles. FIG. 14 shows the SEM image of the Au catalyst nanoparticles deposited on the network of interconnected nanowires.

Example 3

Fabrication of Densely Packed Nanowires

In order to examine methods to increase packing density of nanowires, "bird's-nest" structures of 60 nm silicon nanowires were prepared using various techniques. The results of the methods are represented below in Table 1:

TABLE 1

| Method | Packing Density Relative to Silicon Density |
|---|---|
| As collected on the filter | 6% |
| Stirred with shear mixer | 6.1% |
| Uniaxially pressed | 11.2% |
| Surfactant (Triton X-100) | 8% |
| Die pressed, 40 KPSI | 46.6% |
| Compact Packing (90°) | 78.5% |
| Compact Packing (0°) | 90.7% |

The packing density prepared by filtering the dispersion of 60 nm nanowires was 6%. Stirring the dispersion with a high speed shear mixer prior to filtration did not improve the packing density. A packing density increase of more than 30% was noted by adding surfactant (Triton X-100) to the nanowire dispersion prior to filtration. A significant increase in packing density was observed after application of uniaxial pressure to the nanowires. A packing density of 46.6% was measured from a thin nanowire pellet prepared by die pressing nanowires at 40 KPSI after grinding in a pellet die. Scanning electron microscopy indicated that nanowires were short in this sample, a result of grinding and/or pressing.

Example 4

Fuel Cell Performance Characterization

Results of various performance characterization experiments are presented herein. These results indicate the significant performance improvements created by the use of the nanowire networks of the present invention (i.e., Bird's Nest architecture) both interconnected and not-interconnected in fuel cell applications such as direct methanol fuel cells.

An almost 3-fold increase in methanol oxidation activity relative to commercial carbon black catalysts through a combination of a new catalyst particle material and the unique structural characteristics of the Bird's Nest architecture has been observed. In addition, a 51% increase in kinetic current for $O_2$ reduction compared to carbon black has been measured, indicating a strong influence of support interactions on catalytic efficiency from our unique highly-crystalline nanographite surface coating on the Bird's Nest structure. A 2.5× increase in diffusion efficiency for methanol through the birds nest structure compared to carbon black has been measured, which should allow up to 2.5× higher loading of NAFION® in the catalyst layer without impacting diffusion efficiency; this has the potential to increase proton conductivity in Bird's Nest membrane electrode assembly by up to 2.5× relative to carbon black.

Figure 28:
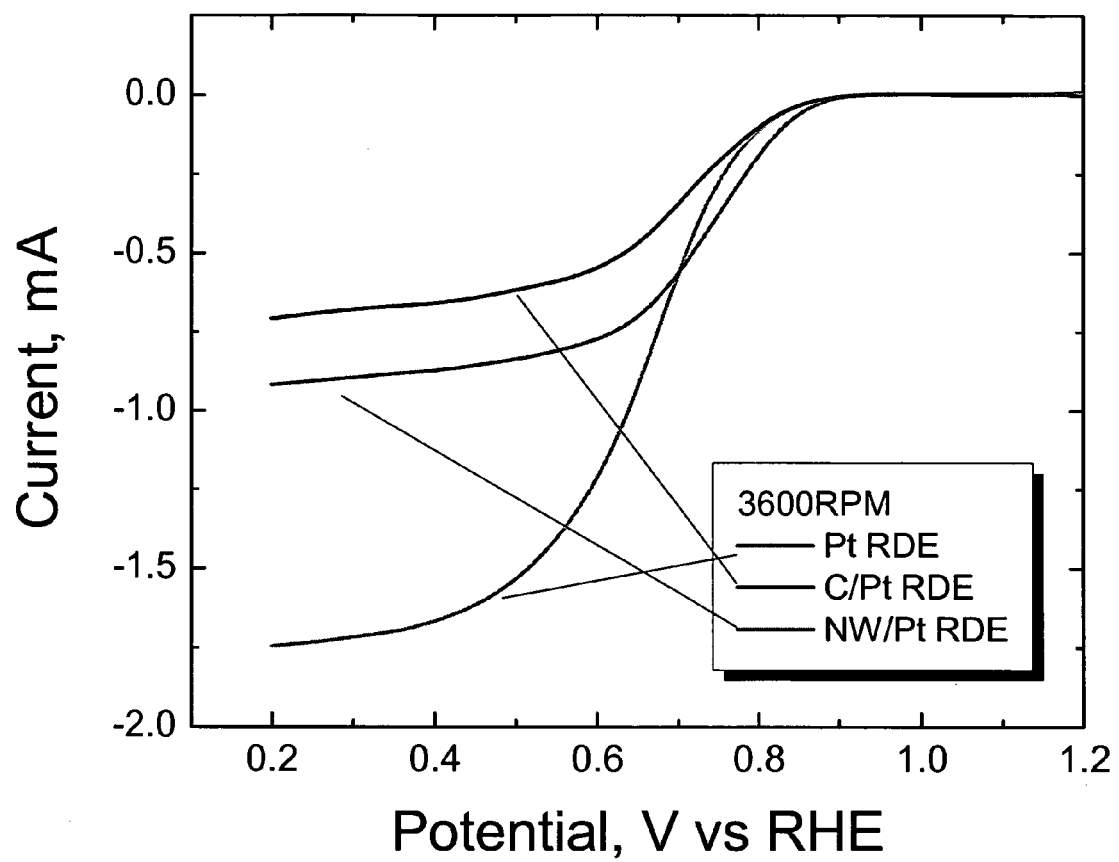
FIG. 28 shows a plot of current versus potential comparing the oxygen reduction activity of three catalyst electrodes.

In order to determine the accessibility/diffusion characteristics of nanowire structures of the present invention, oxygen reduction activity was determined. FIG. 28 shows a plot of current vs. potential comparing a Pt rotating disc electrode (Pt RDE), a carbon layer on the Pt-RDE (C/Pt RDE), and a carbonized Si nanowire layer (i.e., SiC nanowires) placed on the Pt-RDE (NW/Pt RDE). The SiC nanowire layer provides increased access to the Pt electrode (proton accessibility of 86% compared to Pt-RDE), as compared to a carbon layer (proton accessibility of 46% compared to Pt-RDE), resulting in current reduction of only 48% relative to 61% compared to the carbon layer at a potential of 0.3V as shown in FIG. 28.

Figure 29:
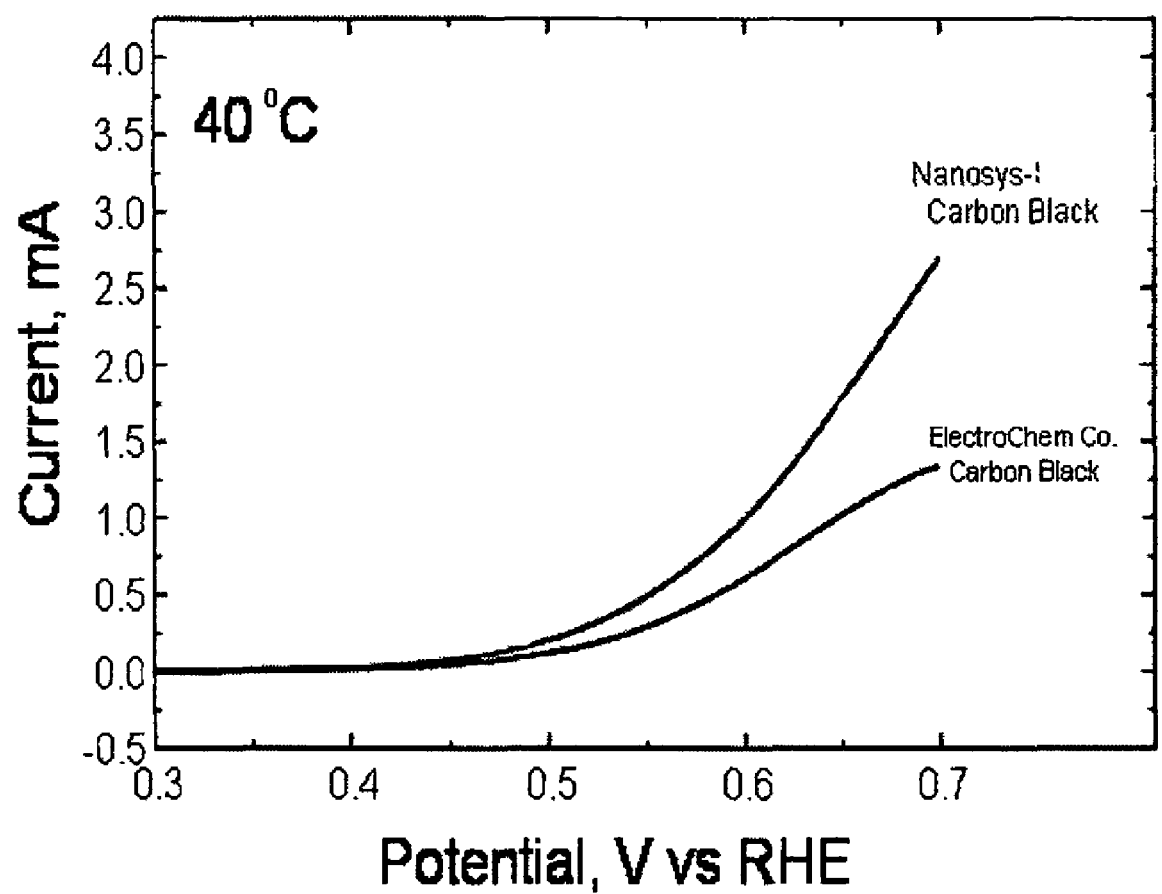
FIG. 29 shows a plot of current versus potential comparing the methanol oxidation activity of commercially available carbon black catalyst and catalyst material prepared according to one embodiment of the present invention.

FIG. 29 shows a representative performance curve for methanol oxidation comparing the current commercial catalyst material on carbon black (manufactured by ElectroChem. Inc., Woburn, Mass.), and the catalyst material of the present invention on a carbon black support. This data indicates an increased catalytic activity of approximately 65% over, resulting from the new catalyst material alone.

Figure 30:
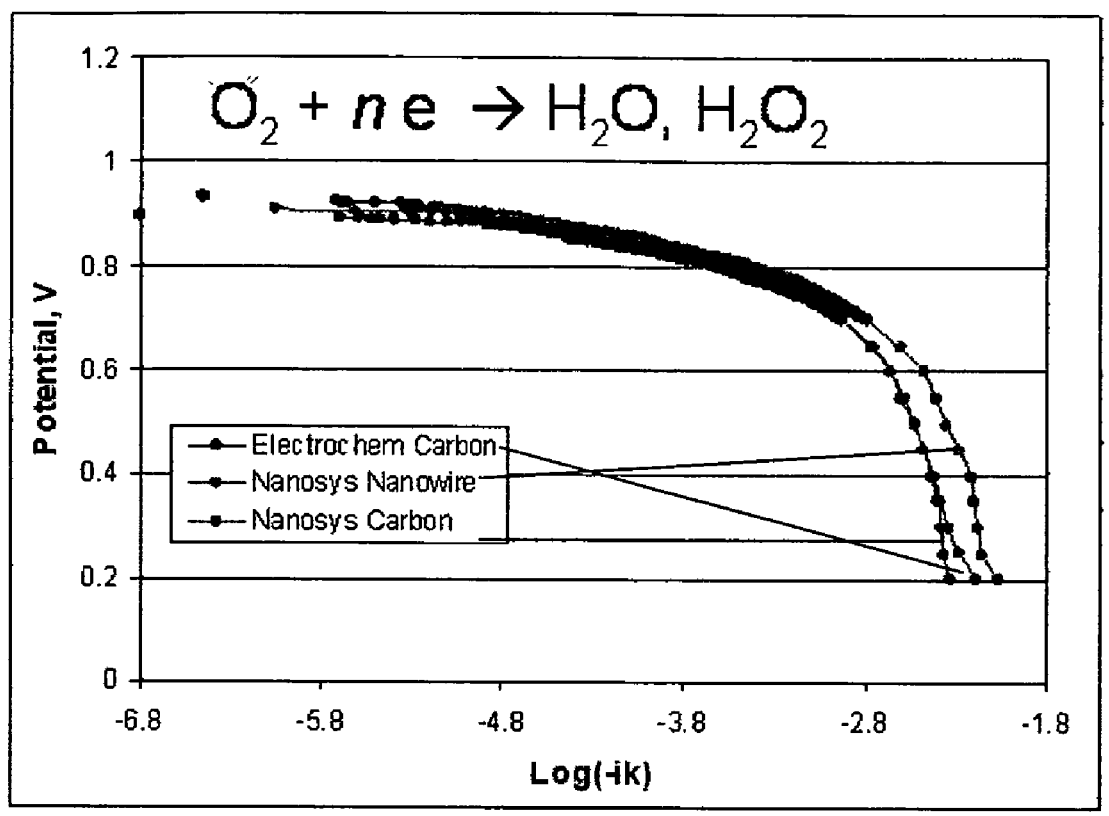
FIG. 30 shows a Tafel plot for oxygen reduction on a bird's nest catalyst prepared in accordance with the present invention, commercially available carbon black catalyst, and carbon-based catalyst prepared in accordance with the present invention.

In addition to the inherent increase in catalytic efficiency of the catalyst particles of the present invention, improved catalytic activity resulting from the interaction of these particles with the unique surface of the nanographite nanowires has also been observed. Kotecky-Levich analysis for oxygen reduction (FIG. 30) on a nanowire Bird's Nest structure in an electrochemical half-cell showed a 51% increase in kinetic current at 0.6V in the Bird's Nest structure over carbon black made with the same catalyst particles. This increase in reaction rate can be explained by an increase in catalytic efficiency resulting from interaction with the nanographite support material.

Measurements of the 3-phase contact surface area for the Bird's Nest MEAs of the present invention show a 3-phase contact density of 676 cm²/mg compared to only 432 cm²/mg for commercially available carbon black MEAs (Electro-Chem. Inc.). This represents a 56% increase in 3-phase contact density in these preliminary Bird's Nest structures. Direct measurement of 3-phase contact showed a total of 758 cm²/mg for the carbon black MEA, a 75% increase relative to commercial carbon black. Correcting for the difference in average particle size between the two catalyst particles, on average, 21% more catalyst particles are available for 3-phase contact from the carbon black using the catalyst particles of the present invention over commercial carbon black catalysts formed by "impregnation" methods.

Figure 31:
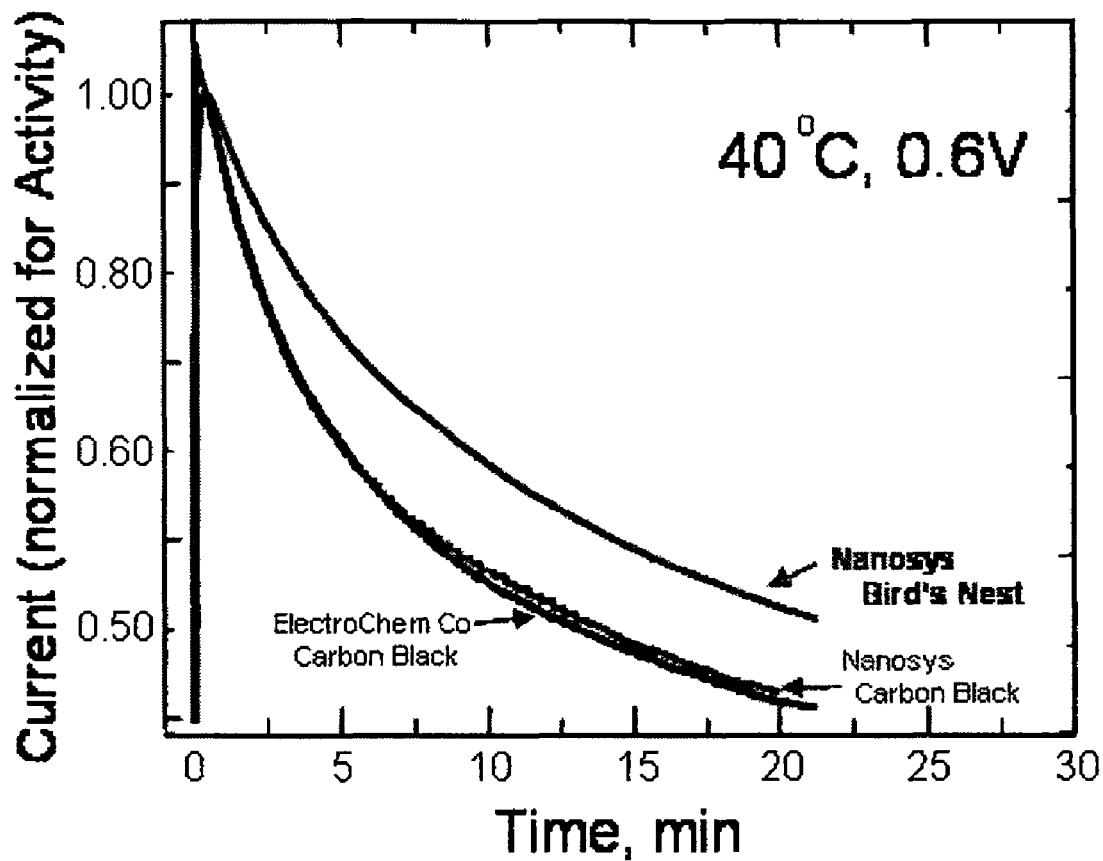
FIG. 31 shows methanol oxidation activity of the bird's nest catalyst structure of the present invention in comparison to commercially available carbon black catalyst and carbon-based catalyst prepared in accordance with the present invention.

FIG. 31 shows methanol oxidation activity in an electrochemical half-cell over a period of 20 minutes for a Bird's Nest nanowire catalyst, a commercial carbon black catalyst and a carbon black catalyst formed using the PtRu anode catalyst material of the present invention. This plot clearly shows an improvement in stability over this time period for the Bird's Nest structure, even compared to the identical catalyst material on carbon black. This appears to be evidence of a purely structural effect on stability, even over time periods as short as 20 minutes.

In contrast to the porous nature of packed particle carbon black, the intrinsically open, non-tortuous network of nanowires in a Bird's Nest structure according to the present invention allows for efficient diffusion of fuel and waste into and away from the catalytic sites. Theoretical modeling of the diffusion characteristics of a bird's nest structure indicates that diffusion of solutions through this type of a network is approximately the same as diffusion in bulk solution. As evidence of this effect, significantly increased catalytic activity for methanol oxidation in electrochemical half-cell measurements between Bird's Nest and carbon black support structures using the same catalyst materials have been observed.

Figure 32:
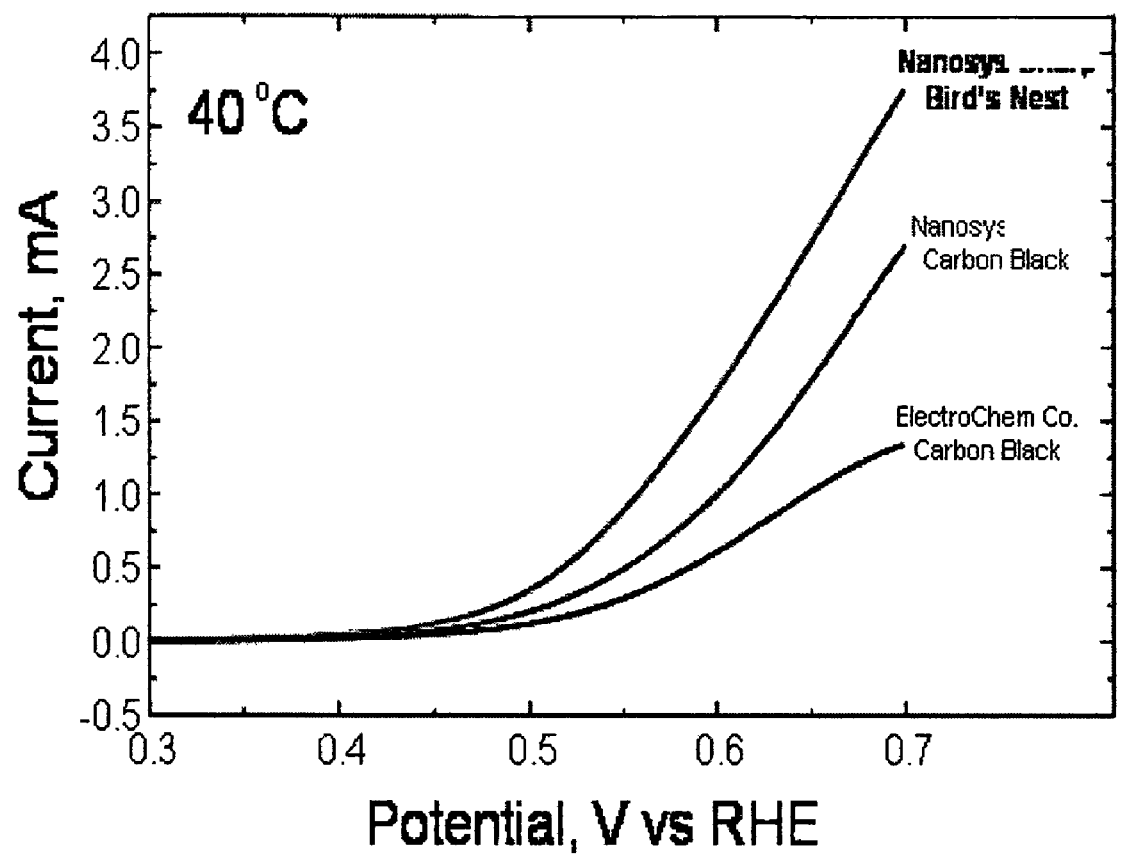
FIG. 32 shows methanol oxidation activity of the catalyst material of the present invention on a bird's nest support and a carbon support, as well as commercially available carbon black catalyst.

FIG. 32 and Table 2 below demonstrate the relative activity of these two structures in addition to commercial carbon black catalyst, displaying the purely structural impact of the Bird's Nest architecture on improved activity. Overall, the current Bird's Nest catalyst layer has almost 3× higher activity for methanol oxidation compared to current commercial carbon black catalyst in these half-cell measurements. This is the result of a combination of increased catalytic activity and diffusion effects.

TABLE 2

|  | Current at 0.6 V | % increase in activity over Commercially-available |
|---|---|---|
| Commercially available carbon black catalyst | 0.6 mA | 1× |
| Carbon black with Catalyst of the present invention | 1 mA | 1.67× |
| Nanowire Bird's Nest with Catalyst of the present invention | 1.7 mA | 2.83× |

Results of the methanol oxidation activity of PtRu anode catalysts are presented in Table 3 below.

TABLE 3

| | | Relative Activity (%) | | | |
|---|---|---|---|---|---|
| | Hydrogen | initial[b] | | 20 min[c] | |
| Sample/Electrode | area (%)[a] | 25° C. | 40° C. | 25° C. | 40° C. |
| Commercial carbon | 100 | 100 | 100 | 100 | 100 |
| Catalysts of the present invention on Carbon | 110 | 138 | 164 | 97 | 167 |
| Catalysts of the present invention on Nanowire | 118 | 274 | 283 | 204 | 278 |

[a]current integration of the cyclic voltammogram in the hydrogen oxidation region;
[b]based on linear potential scan data at 0.6 V;
[c]based on data recorded after 20 min of constant polarization at 0.6 V.

Figure 33:
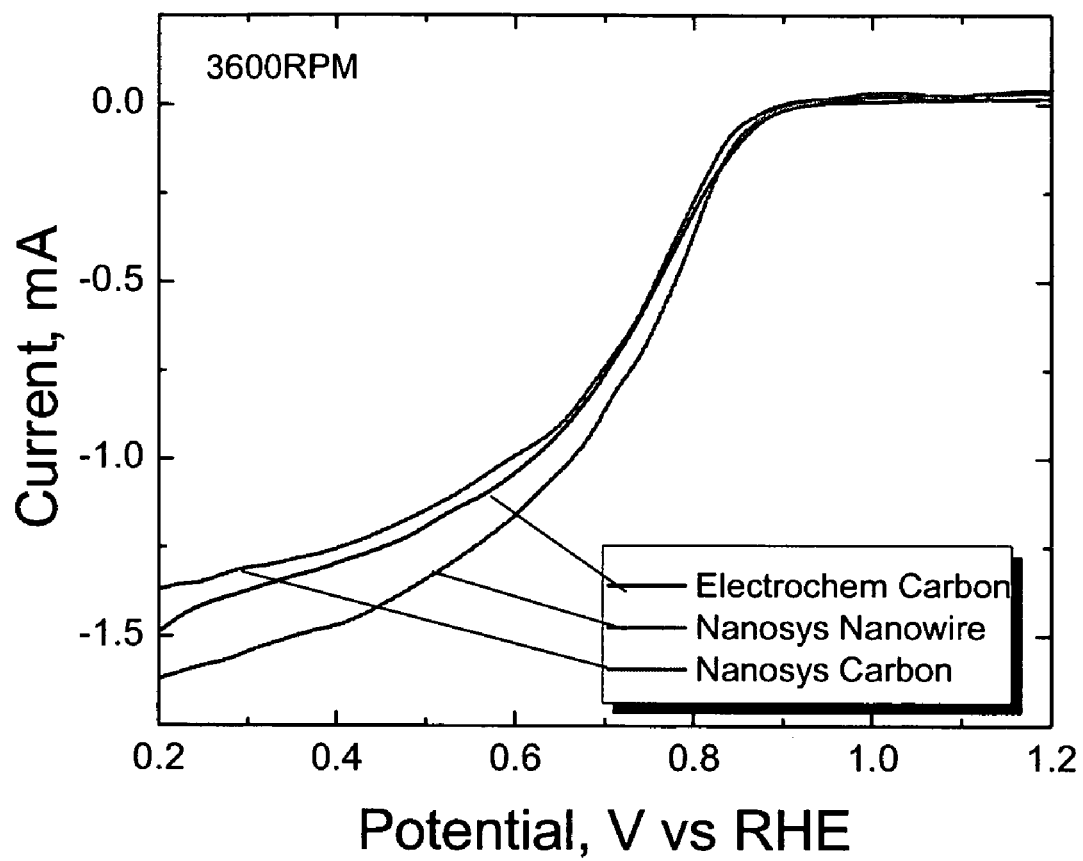
FIG. 33 shows a plot of current versus potential, representing the oxygen reduction activity of a commercially available Pt catalyst (Electrochem Carbon) and Pt catalysts of the present invention on a carbon support and a nanowire support, in accordance with one embodiment of the present invention.

Oxygen reduction activity was also measured using a commercially available platinum catalyst on a carbon support (manufactured by ElectroChem. Inc., Woburn, Mass.), platinum catalysts of the present invention on a carbon support, and platinum catalysts of the present invention on SiC nanowires. FIG. 33 shows a plot of current vs. potential comparing these three Pt catalyst supports. Results of the analysis, summarized below in Table 4, indicate a higher current for the nanowire-supported anode Pt catalyst, resulting in an 18% improvement over the conventional carbon supports.

TABLE 4

| | Hydrogen | Relative Oxygen Reduction Activity (%) | | |
|---|---|---|---|---|
| Sample/Electrode | Area (%)[a] | Total Current[b] | Kinetic Current[c] | Diffusion Current[d] |
| Commercial carbon | 100 | 100 | 100 | 100 |
| Catalysts of the present invention on Carbon | 168 | 96 | 100 | 100 |
| Catalysts of the present invention on Nanowire | 168 | 114 | 151 | 118 |

[a]current integration of the cyclic voltammogram in the hydrogen oxidation region;
[b]linear potential scan in oxygen saturated solution at 3600 RPM, data at 0.6 V;
[c]analysis based on Koutecky-Levich equation, compared at 0.6 V;
[d]analysis based on Koutecky-Levich equation, assuming identical number of electrons transferred for all catalysts Direct measurements of the diffusion efficiency of $O_2$ through Bird's Nest nanowire and carbon black structures determined the average effective pore length for Bird's Nest supports to be 1.1 nm, while for carbon black, it is 2.8 nm, indicating a 2.5× increase in diffusion efficiency through the Bird's Nest structure due to the open, non-tortuous diffusion pathway that is inherent to this structure.

Example 5

Dispersion Improvement of Nanowire Electrodes

Platinum catalyst loading, NAFION® coverage and fuel cell performance were characterized for electrodes comprising: 1) ECCMEA#1: commercially available catalyst nanoparticles and carbon support (manufactured by ElectroChem, Inc., Woburn, Mass.); 2) NSCMEA#1: platinum catalyst prepared according to the present invention disposed on carbon support; and 3) NWMEA#13 and #16: two samples of platinum catalyst prepared according to the present invention disposed on SiC nanowires. Pt loading and NAFION® coverage results are presented below in Table 5:

TABLE 5

|         | Pt Loading (mg/cm$^2$) | NAFION® Coverage (mg-NAFION®/m$^2$) | Pt Area (cm$^2$-Pt) | Pt area/Pt weight (cm$^2$/mg) |
|---------|------------------------|--------------------------------------|---------------------|-------------------------------|
| ECCMEA#1 | 0.256 | 4.56 | 572 | 431 |
| NSCMEA#1 | 0.310 | 4.76 | 1175 | 758 |
| NWMEA#13 | 0.307 | 6.11 | 6662 | 432 |
| NWMEA#16 | 0.300 | 4.93 | 446 | 298 |

Figures 34A, 34B:
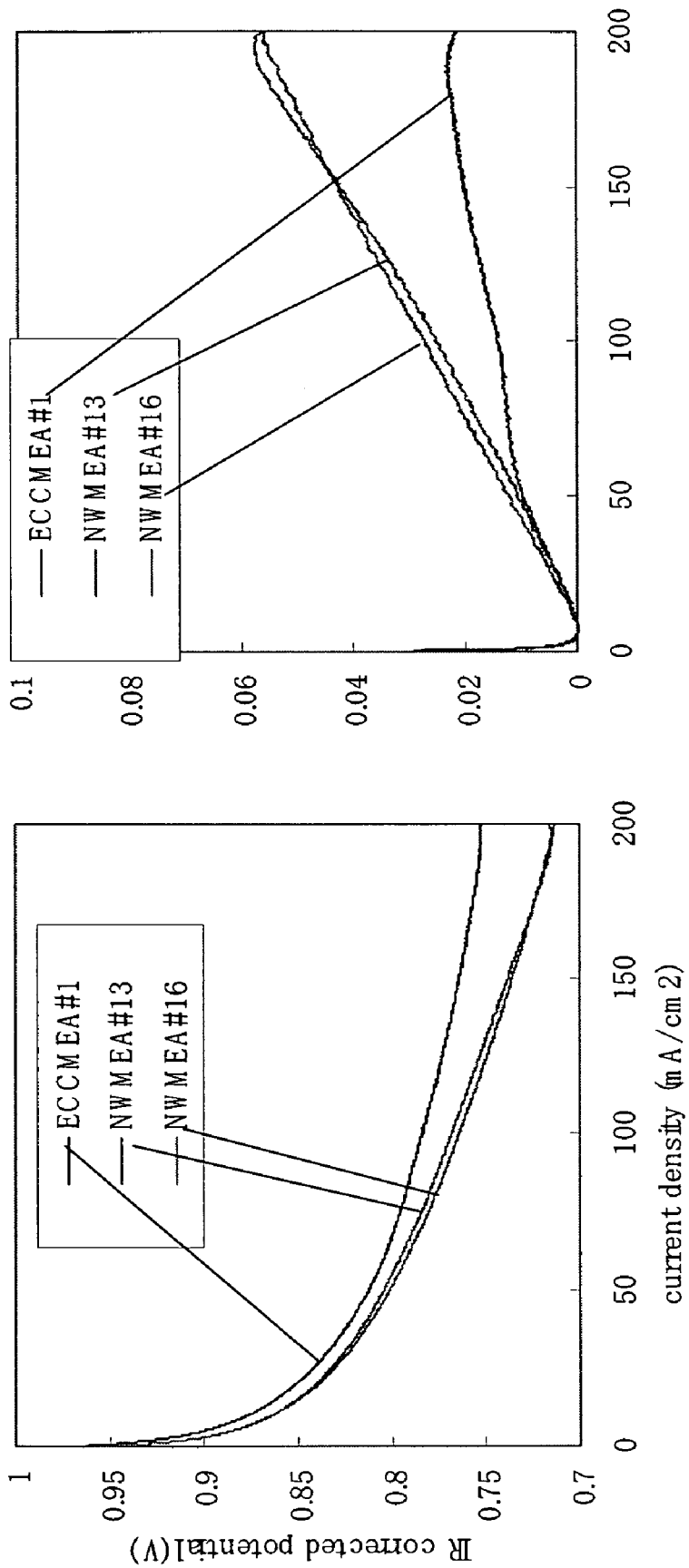
FIG. 34A shows IR corrected potential versus current density representing fuel cell performance of a commercially available membrane electrode assembly (ECCMEA) and two nanowire-supported membrane electrode assemblies in accordance with one embodiment of the present invention.
FIG. 34B shows accessibility loss, with fitting at 30 mA/cm$^2$ for the same assemblies.

FIGS. 34A and 34B represent performance of the electrodes described above showing IR corrected potential versus current density, and accessibility loss (fitting at 3-5 mA/cm$^2$) respectively of the ECCMEA#1, NWMEA#13 and NWMEA#16 electrodes. It should be noted that fuel cell performance, as well as accessibility loss, for the two nanowire supported electrodes are virtually identical.

Figure 35:
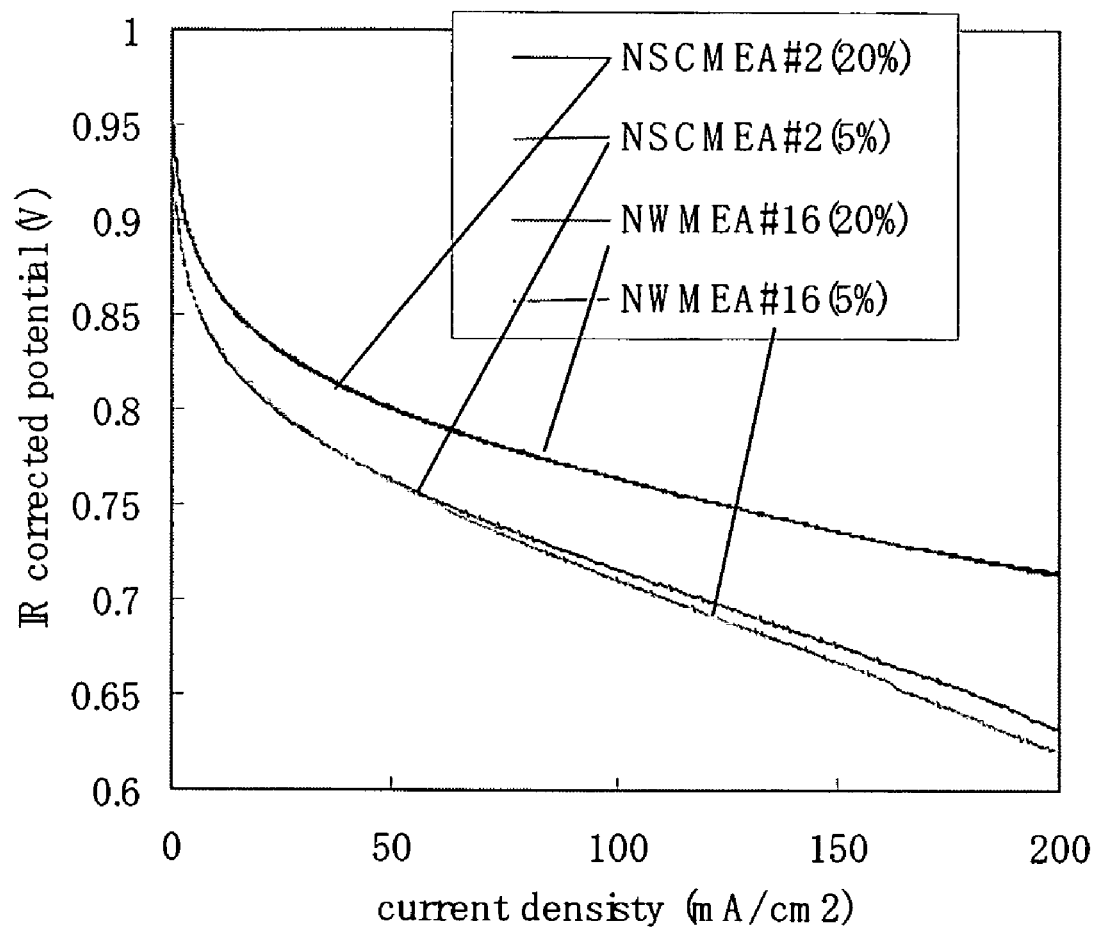
FIG. 35 shows IR corrected potential versus current density comparing the effects of oxygen partial pressure on performance of platinum catalysts of the present invention on carbon supports and nanowire supports.
Figure 36:
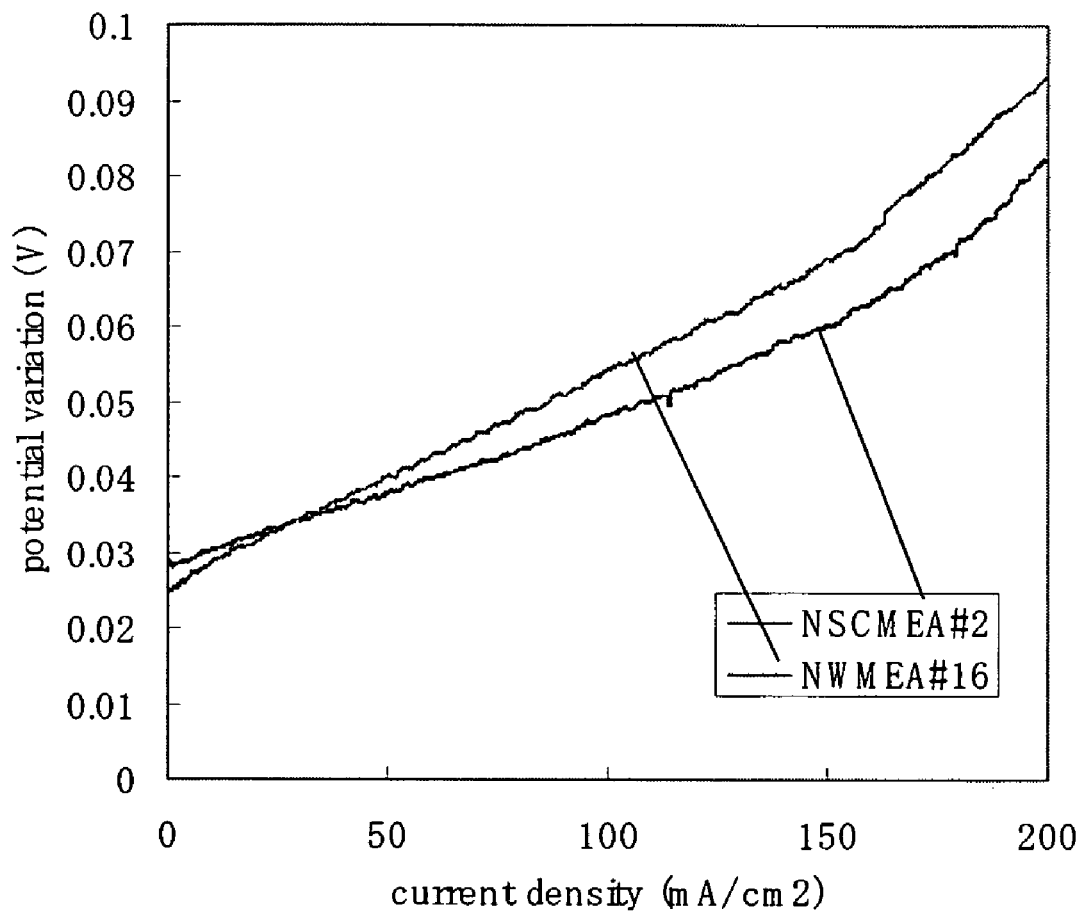
FIG. 36 shows potential variation with current density showing the effects of oxygen pressure variation on performance of platinum catalysts of the present invention on carbon supports and nanowire supports.

FIGS. 35 and 36 of Nanosys presentation represent results of the O$_2$ partial pressure variation for an electrode prepared from Pt catalytic nanoparticles of the present invention disposed on a carbon support (NSCMEA#2) and Pt catalytic nanoparticles of the present invention disposed on SiC nanowires of the present invention (NWMEA#16). The results are also represented in the table below. FIG. 35 represents IR corrected potential characteristics of the electrodes at two different O$_2$ pressures (20% and 5%). FIG. 36 represents the potential variation (V) for the same two samples over a range of current densities. The results of these measurements, as noted below in Table 6, indicate that O$_2$ diffusivity using the nanowire support appears to be equal to, or even better than, the traditional carbon support.

TABLE 6

|          |            | Pt loading (mg/cm$^2$) | NAFION® coverage (mg-NAFION®/m$^2$) | Pt area/Pt weight (cm$^2$/mg) |
|----------|------------|------------------------|--------------------------------------|-------------------------------|
| NSCMEA#2 | Pt/C       | 0.361 | 4.56 | 477 |
| NWMEA#16 | Pt/nanowire | 0.3   | 4.93 | 298 |

Example 6

Characterization of Bird's Nest Electrodes

The following procedure was followed to generate a "bird's nest" nanowire support with Pt catalyst nanoparticles. Si nanowires prepared according the present invention were deposited in a random fashion, so as to form a "Bird's Nest" structure of overlapping nanowires. The nanowire structure was then contacted with a carbon-comprising gas (e.g., CH$_4$) in order to form a carbide layer on the surface of the nanowires, followed by formation of graphene sheets on the surface of the SiC nanowires. Pt catalyst nanoparticles of the present invention were then deposited onto the graphite coated SiC nanowires. Finally, the catalyst nanoparticle/SiC nanowire bird's nest structure was impregnated, or hand painted, with the proton conductor, NAFION®. The resulting electrode was characterized with approximately 11% (wt %) Pt loading onto the SiC nanowires, and approximately 0.15 mg-Pt/cm$^2$ of electrode.

Figure 37:
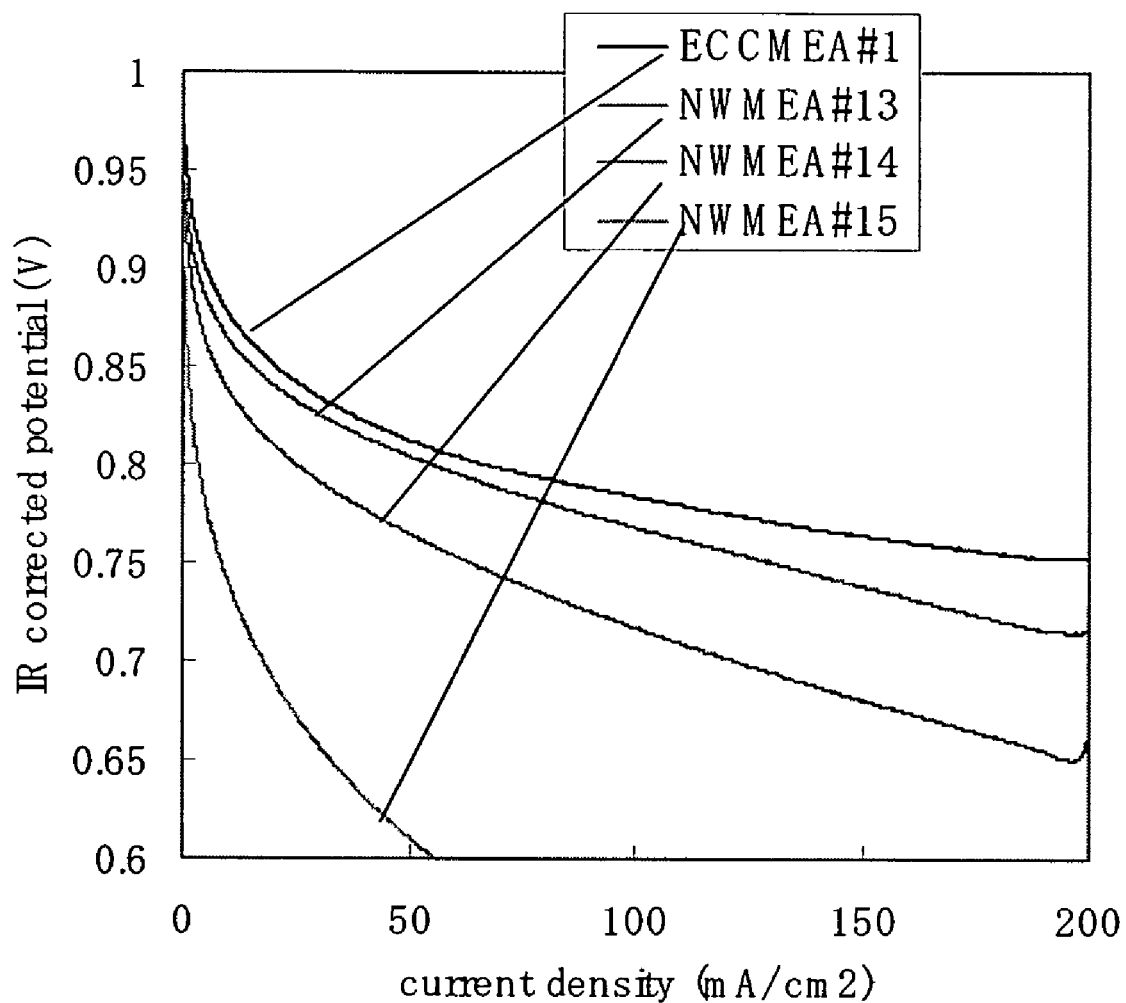
FIG. 37 shows the results of fuel cell performance characteristics, showing IR corrected potential versus current density, comparing commercially available Pt catalysts and Pt catalysts of the present invention on carbon supports and nanowire supports.

FIG. 37 shows the IR corrected potential versus current density measurements for four electrodes. ECCMEA#1: Electrochem® Pt catalyst on carbon substrate; NWMEA#13: Pt catalyst prepared according to the present invention on SiC nanowire bird's nest hand painted with NAFION®; NWMEA#14 and #15: Pt catalyst prepared according to the present invention on SiC nanowire bird's nest impregnated with NAFION®. The results of the characterization are also presented in Table 7 below (NSCMEA#1 represents Pt catalyst prepared according to the present invention on carbon substrate):

TABLE 7

|          |                           | Pt Loading (mg/cm$^2$) | NAFION® Coverage (mg-NAFION®/m$^2$) | Pt area (cm$^2$-Pt) | Pt area/Pt weight (cm$^2$/mg) |
|----------|---------------------------|------------------------|--------------------------------------|---------------------|-------------------------------|
| ECCMEA#1 | Pt/C (Electrochem)        | 0.265 | 4.56 | 572 | 431 |
| NSCMEA#1 | Pt/C                      | 0.31  | 4.76 | 1175 | 758 |
| NWMEA#13 | Hand Paint NAFION®        | 0.307 | 6.11 | 662 | 432 |
| NWMEA#14 | NAFION® Impregnation      | 0.123 | N/A  | 416 | 676 |
| NWMEA#15 | NAFION® Impregnation      | 0.156 | 1.94 | 52  | 67  |

Example 7

Refluxing to Prepare Catalyst Metal-associated Nanowires 290 mg of the nanowire structures of the present invention are dispersed in 20 mL of ethylene glycol. To the dispersion, 51 mL of Pt—Ru colloid solution (3 mg metal/mL) are then added. This solution is then refluxed for 60 minutes.

The solution is then cooled to room temperature and 2M nitric acid is added drop-wise until the solution attains a pH of about 4.0. This solution is then stirred at room temperature for about 4 hours, after which 2M nitric acid is added drop-wise until the solution attains a pH of about 1.0. The solution is then stirred for about 1 hour.

Figure 38:
FIG. 38 shows catalyst-associated nanowires prepared by the reflux methods of the present invention.

The solution is then filtered, and washed three times with deionized water. The resulting nanowire cake is then dispersed in deionized water, filtered, and then washed again. The resulting nanowire cake is then dried at 120° C. under vacuum overnight. The resulting catalyst-associated nanowires can then be dispersed in a solvent for application to various substrates or other uses, or utilized in their dried state. FIG. 38 shows transmission electron micrographs (two magnifications) of catalyst metal-associated nanowires prepared according to the methods of the present invention.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. A nanowire comprising a carbon-based layer, wherein the carbon-based layer is substantially devoid of basal plane carbon.

2. The nanowire of claim 1, wherein the carbon-based layer contains less than about 0.5% basal plane carbon.

3. The nanowire of claim 1, further comprising a core.

4. The nanowire of claim 3, wherein the core comprises a semiconductor material.

5. The nanowire of claim 4, wherein the semiconductor material is selected from the group consisting of Si, B, SiC and GaN.

6. The nanowire of claim 4, wherein the semiconductor material is doped.

7. The nanowire of claim 3, wherein the core and/or the carbon-based layer comprise carbon.

8. The nanowire of claim 3, wherein the core and/or the carbon-based layer consist essentially of carbon.

9. The nanowire of claim 3, wherein the core and/or the carbon-based layer consist of carbon.

10. The nanowire of claim 3, wherein the core comprises carbide.

11. The nanowire of claim 10, wherein the core comprises SiC.

12. The nanowire of claim 3, wherein the core is Si and the carbon-based layer is SiC.

13. The nanowire of claim 3, wherein the core is SiC and the carbon-based layer is carbon.

14. The nanowire of claim 1, wherein the carbon-based layer is between about 1 nm to about 500 nm in thickness.

15. A method of manufacturing a nanowire, comprising:
    (a) heating a nanowire core; and
    (b) contacting the nanowire core with one or more carbon-comprising gases to form a carbon-based layer on the nanowire core, wherein the carbon-based layer is substantially devoid of basal plane carbon.

16. The method of claim 15, wherein said heating is to a temperature of greater than about 600° C.

17. The method of claim 15, wherein said contacting step comprises contacting with a gas comprising carbon monoxide, methane, ethane, propane, butane, ethylene or propylene and optionally further comprises contacting with a gas comprising He, Ne, Ar, Kr, Xe, or $H_2$.

18. A method of manufacturing a nanowire, comprising:
    (a) heating a nanowire core;
    (b) contacting the nanowire core with one or more carbon-comprising gases to faun a carbon-based layer on the nanowire core; and
    (c) forming a precursor coating selected from the group consisting of $TiO_2$, $ZrO_2$, $HfO_2$, $Nb_2O_3$, $Ta_2O_5$, $MoO_3$ and $WO_3$ on the nanowire core prior to the heating step.

19. A method for preparing a fuel cell electrode comprising:
    providing a semiconductor wafer having a first surface and a second surface;
    forming one or more channels on the first surface and the second surface;
    disposing one or more nanowires in the channels in the first and second surfaces;
    contacting the nanowires and the first and second surfaces with one or more carbon-comprising gases to form a carbon-based layer on the nanowires and the first and second surfaces; and
    disposing one or more metal catalysts on the nanowires.

20. The method of claim 19, wherein said forming of one or more channels comprises etching.

21. The method of claim 20, wherein said etching comprises etching with NaOH.

22. The method of claim 19, wherein said disposing of one or more nanowires comprises growing nanowires in the channels.

23. The method of claim 19, wherein the disposing of one or more metal catalysts on the nanowires comprises depositing one or more Pt nanoparticles on nanowires on the first surface and PtRu nanoparticles on nanowires on the second surface.

24. A fuel cell electrode prepared by the method of claim 19.

* * * * *

UNITED STATES PATENT AND TRADEMARK OFFICE
CERTIFICATE OF CORRECTION

| | | |
|---|---|---|
| PATENT NO. | : 7,939,218 B2 | Page 1 of 1 |
| APPLICATION NO. | : 11/601842 | |
| DATED | : May 10, 2011 | |
| INVENTOR(S) | : Chunming Niu | |

It is certified that error appears in the above-identified patent and that said Letters Patent is hereby corrected as shown below:

Column 48, line 6, please delete "faun" and insert --form--.

Signed and Sealed this
Twenty-first Day of June, 2011

David J. Kappos
*Director of the United States Patent and Trademark Office*